(12) United States Patent
Capper et al.

(10) Patent No.: US 10,350,486 B1
(45) Date of Patent: Jul. 16, 2019

(54) VIDEO MOTION CAPTURE FOR WIRELESS GAMING

(71) Applicants: David G. Capper, Novato, CA (US);
 Andrew S. Filo, Cupertino, CA (US)

(72) Inventors: David G. Capper, Novato, CA (US);
 Andrew S. Filo, Cupertino, CA (US)

( * ) Notice: Subject to any disclaimer, the term of this patent is extended or adjusted under 35 U.S.C. 154(b) by 65 days.

(21) Appl. No.: 13/906,249

(22) Filed: May 30, 2013

Related U.S. Application Data

(60) Division of application No. 13/673,776, filed on Nov. 9, 2012, now Pat. No. 10,086,262, which is a continuation-in-part of application No. 12/617,633, filed on Nov. 12, 2009, now Pat. No. 9,383,814.

(60) Provisional application No. 61/558,393, filed on Nov. 10, 2011, provisional application No. 61/600,476, filed on Feb. 17, 2012, provisional application No. 61/718,104, filed on Oct. 24, 2012, provisional application No. 61/113,933, filed on Nov. 12, 2008.

(51) Int. Cl.
 *A63F 13/00* (2014.01)
 *A63F 13/20* (2014.01)

(52) U.S. Cl.
 CPC .................................. *A63F 13/06* (2013.01)

(58) Field of Classification Search
 CPC .................. A63F 2300/1012; A63F 13/06
 See application file for complete search history.

(56) References Cited

U.S. PATENT DOCUMENTS

| | | |
|---|---|---|
| 1,222,377 A | 4/1917 | Flint |
| 3,504,334 A | 3/1970 | Turnage |
| 3,792,243 A | 2/1974 | Appel et al. |
| 3,838,212 A | 9/1974 | Whetstone et al. |
| 3,886,361 A | 5/1975 | Wester |
| 4,111,421 A | 9/1978 | Mierzwinski |

(Continued)

FOREIGN PATENT DOCUMENTS

| | | |
|---|---|---|
| CA | 2232528 | 9/1999 |
| DE | 19506129 | 8/1996 |

(Continued)

OTHER PUBLICATIONS

"Q&A: Gesture Tek Talks Xbox 360 Camera Innovation," Gamasutra, accessed Feb. 1, 2012, <http://www.gamasutra.com/php-bin/news_index.php?story=11215>.

(Continued)

*Primary Examiner* — Tramar Y Harper
*Assistant Examiner* — Jeffrey K Wong
(74) *Attorney, Agent, or Firm* — Haverstock & Owens LLP

(57) ABSTRACT

Embodiments of the present invention embody motion detection via a camera for mobile platform video gaming and exercise, in either integrated or separately attachable components. The system includes an oral care device. The oral care device, such as a toothbrush, includes one or more targets. Each target designates a specific area of the toothbrush, such as back side, a front side, a brush head or a brush end. A target can be a color or a tag, and can be removably coupled or integrally formed with the toothbrush. The system also includes an application configured to detect the targets, to determine that a property of any of the targets has changed. Based on at least the determination, the application is configured to monitor progress of brushing and to control an element in the application.

21 Claims, 41 Drawing Sheets

(56) References Cited

U.S. PATENT DOCUMENTS

| | | |
|---|---|---|
| 4,137,651 A | 2/1979 | Pardes et al. |
| 4,210,329 A | 7/1980 | Steiger et al. |
| 4,309,781 A | 1/1982 | Lissau |
| 4,317,005 A | 2/1982 | de Bruyne |
| 4,414,537 A | 11/1983 | Grimes |
| 4,450,599 A | 5/1984 | Scheller et al. |
| 4,476,604 A | 10/1984 | White et al. |
| 4,517,559 A | 5/1985 | Deitch et al. |
| 4,521,772 A | 6/1985 | Lyon |
| 4,521,870 A | 6/1985 | Babbel et al. |
| 4,524,348 A | 6/1985 | Leftwitz |
| 4,542,291 A | 9/1985 | Zimmerman |
| 4,545,583 A | 10/1985 | Pearman et al. |
| 4,550,250 A | 10/1985 | Mueller et al. |
| 4,564,928 A | 1/1986 | Glenn et al. |
| 4,565,999 A | 1/1986 | King et al. |
| 4,578,674 A | 3/1986 | Baker et al. |
| 4,654,648 A | 3/1987 | Herrington et al. |
| 4,682,159 A | 7/1987 | Davison |
| 4,713,545 A | 12/1987 | Norrgren et al. |
| 4,771,344 A | 9/1988 | Fallacaro et al. |
| 4,782,328 A | 11/1988 | Denlinger |
| 4,791,416 A | 12/1988 | Adler |
| 4,796,019 A | 1/1989 | Auerbach |
| 4,799,687 A | 1/1989 | Davis et al. |
| 4,837,430 A | 6/1989 | Hasegawa |
| 4,910,464 A | 3/1990 | Trett et al. |
| 4,924,216 A | 5/1990 | Leung |
| RE33,662 E | 8/1991 | Blair et al. |
| 5,191,461 A | 3/1993 | Cranshaw et al. |
| 5,282,291 A | 2/1994 | Spieler et al. |
| 5,288,078 A | 2/1994 | Capper et al. |
| 5,331,707 A | 7/1994 | Irizarry |
| 5,384,652 A | 1/1995 | Allen et al. |
| 5,521,616 A | 5/1996 | Capper et al. |
| 5,534,917 A | 7/1996 | MacDougall |
| 6,345,406 B1 | 2/2002 | Dodd |
| 6,353,428 B1 | 3/2002 | Maggioni et al. |
| 6,397,424 B1 | 6/2002 | Leung |
| 6,674,895 B2 | 1/2004 | Rafii |
| 6,786,732 B2 | 9/2004 | Savill et al. |
| 7,058,204 B2 | 6/2006 | Hildreth et al. |
| 7,190,263 B2 | 3/2007 | McKay et al. |
| 7,227,526 B2 | 6/2007 | Hildreth et al. |
| 7,259,747 B2 | 8/2007 | Bell |
| 7,348,963 B2 | 3/2008 | Bell |
| 7,379,563 B2 | 5/2008 | Shamaie |
| 7,379,566 B2 | 5/2008 | Hildreth |
| 7,389,591 B2 | 6/2008 | Jaiswal et al. |
| 7,421,093 B2 | 9/2008 | Hildreth et al. |
| 7,430,312 B2 | 9/2008 | Gu |
| 7,555,142 B2 | 6/2009 | Hildreth et al. |
| 7,570,805 B2 | 8/2009 | Gu |
| 7,574,020 B2 | 8/2009 | Shamaie |
| 7,576,727 B2 | 8/2009 | Bell |
| 7,710,391 B2 | 5/2010 | Bell et al. |
| 7,777,899 B1 | 8/2010 | Hildreth |
| 7,778,942 B2 | 8/2010 | Naito |
| 7,809,167 B2 | 10/2010 | Bell |
| 7,822,267 B2 | 10/2010 | Gu |
| 7,827,698 B2 | 11/2010 | Jaiswal et al. |
| 7,834,846 B1 | 11/2010 | Bell |
| 7,848,542 B2 | 12/2010 | Hildreth |
| 7,853,041 B2 | 12/2010 | Shamaie |
| 7,878,586 B2 | 2/2011 | Kneller et al. |
| 7,898,522 B2 | 3/2011 | Hildreth et al. |
| 7,920,179 B2 | 4/2011 | Thorn |
| 7,944,685 B2 | 5/2011 | Nabais Nobre |
| 7,953,271 B2 | 5/2011 | Gu |
| 7,957,554 B1 | 6/2011 | Silver et al. |
| 8,015,718 B2 | 9/2011 | Jaiswal et al. |
| 8,035,612 B2 | 10/2011 | Bell et al. |
| 8,035,614 B2 | 10/2011 | Bell et al. |
| 8,035,624 B2 | 10/2011 | Bell et al. |
| 8,068,641 B1 | 11/2011 | Hildreth |
| 8,068,693 B2 | 11/2011 | Sorek et al. |
| 8,081,822 B1 | 12/2011 | Bell |
| 8,094,873 B2 | 1/2012 | Kelosky et al. |
| 8,098,277 B1 | 1/2012 | Bell |
| 8,110,178 B2 | 2/2012 | Fujikawa et al. |
| 8,116,518 B2 | 2/2012 | Shamaie et al. |
| 8,146,020 B2 | 3/2012 | Clarkson |
| 8,157,652 B2 | 4/2012 | Nguyen et al. |
| 8,170,281 B2 | 5/2012 | Shamaie |
| 8,218,858 B2 | 7/2012 | Gu |
| 8,544,131 B2 | 10/2013 | Braun et al. |
| 8,832,895 B2 | 9/2014 | Jungnickel et al. |
| 2004/0000017 A1 | 1/2004 | Kumagai |
| 2004/0046736 A1* | 3/2004 | Pryor .................. A63F 13/02 |
| | | 345/156 |
| 2004/0187889 A1 | 9/2004 | Kemp |
| 2004/0214642 A1 | 10/2004 | Beck |
| 2005/0066461 A1 | 3/2005 | Chang |
| 2005/0108841 A1 | 5/2005 | Edwards |
| 2006/0232662 A1 | 10/2006 | Otaka et al. |
| 2007/0197261 A1 | 8/2007 | Humbel |
| 2007/0261185 A1 | 11/2007 | Guney et al. |
| 2007/0270221 A1* | 11/2007 | Park .................. A46B 15/0002 |
| | | 463/37 |
| 2008/0018595 A1 | 1/2008 | Hildreth et al. |
| 2008/0019589 A1* | 1/2008 | Yoon .................. G06K 9/00355 |
| | | 382/165 |
| 2008/0166022 A1 | 7/2008 | Hildreth |
| 2008/0208517 A1 | 8/2008 | Shamaie |
| 2008/0219502 A1 | 9/2008 | Shamaie |
| 2008/0267521 A1 | 10/2008 | Gao et al. |
| 2008/0273755 A1 | 11/2008 | Hildreth |
| 2008/0280676 A1 | 11/2008 | Distanik et al. |
| 2008/0281633 A1 | 11/2008 | Burdea et al. |
| 2009/0027337 A1 | 1/2009 | Hildreth |
| 2009/0031240 A1 | 1/2009 | Hildreth |
| 2009/0051648 A1 | 2/2009 | Shamaie et al. |
| 2009/0052785 A1 | 2/2009 | Shamaie |
| 2009/0079813 A1* | 3/2009 | Hildreth .................. H04N 7/147 |
| | | 348/14.03 |
| 2009/0085724 A1 | 4/2009 | Naressi |
| 2009/0109036 A1 | 4/2009 | Schalla et al. |
| 2009/0124379 A1 | 5/2009 | Wells |
| 2009/0133051 A1 | 5/2009 | Hildreth |
| 2009/0138805 A1 | 5/2009 | Hildreth |
| 2009/0217211 A1 | 8/2009 | Hildreth et al. |
| 2009/0315740 A1 | 12/2009 | Hildreth et al. |
| 2010/0039379 A1 | 2/2010 | Hildreth |
| 2010/0040292 A1 | 2/2010 | Clarkson |
| 2010/0066667 A1 | 3/2010 | MacDougall et al. |
| 2010/0066763 A1 | 3/2010 | MacDougall et al. |
| 2010/0091110 A1 | 4/2010 | Hildreth |
| 2010/0170052 A1 | 7/2010 | Ortins et al. |
| 2010/0259474 A1 | 10/2010 | Hildreth |
| 2010/0277075 A1 | 11/2010 | Rees |
| 2010/0281636 A1 | 11/2010 | Ortins et al. |
| 2010/0295946 A1 | 11/2010 | Reed et al. |
| 2010/0306685 A1 | 12/2010 | Giaimo et al. |
| 2010/0315491 A1 | 12/2010 | Carter et al. |
| 2011/0038530 A1 | 2/2011 | Gu |
| 2011/0068227 A1 | 3/2011 | Kneller et al. |
| 2011/0074974 A1 | 3/2011 | Hildreth |
| 2011/0080490 A1 | 4/2011 | Clarkson et al. |
| 2011/0197132 A1 | 8/2011 | Escoda et al. |
| 2011/0210943 A1 | 9/2011 | Zaliva |
| 2011/0242344 A1 | 10/2011 | Elwell et al. |
| 2011/0247156 A1 | 10/2011 | Schmid et al. |
| 2011/0260998 A1 | 10/2011 | Ludwig |
| 2012/0007821 A1 | 1/2012 | Zaliva |
| 2012/0016960 A1 | 1/2012 | Gelb et al. |
| 2012/0040758 A1 | 2/2012 | Hosverth |
| 2012/0049453 A1* | 3/2012 | Morichau-Beauchant .................. |
| | | A63F 3/00214 |
| | | 273/236 |
| 2012/0198640 A1 | 8/2012 | Jungnickel et al. |
| 2013/0239104 A1 | 9/2013 | Savant et al. |

(56) References Cited

U.S. PATENT DOCUMENTS

| | | | |
|---|---|---|---|
| 2014/0036092 A1* | 2/2014 | Chen | H04N 5/235 |
| | | | 348/175 |
| 2014/0066209 A1 | 3/2014 | Annambhotla | |
| 2014/0213333 A1 | 7/2014 | Hanes | |

FOREIGN PATENT DOCUMENTS

| | | |
|---|---|---|
| JP | 60-069728 | 4/1985 |
| JP | 62-014528 | 1/1987 |
| JP | 63-167534 | 7/1988 |
| JP | 07-236519 | 9/1995 |
| JP | 09-322824 | 12/1997 |
| JP | 2004-105246 | 4/2004 |

OTHER PUBLICATIONS

Foley, James D., "Interfaces for Advance Computing," Oct. 1987, p. 127-135, Scientific America.

Office Action dated Oct. 19, 2015, U.S. Appl. No. 13/779,658, filed Feb. 27, 2013, Capper et al., 12 pages.

Final Office Action dated Mar. 3, 2016, U.S. Appl. No. 13/673,776, filed Nov. 9, 2012, Capper et al., 25 pages.

Office Action dated Feb. 23, 2016, U.S. Appl. No. 13/779,658, filed Feb. 27, 2013, Capper et al., 18 pages.

Final Office Action dated Dec. 20, 2016, U.S. Appl. No. 13/673,776, filed Nov. 9, 2012, Capper et al., 11 pages.

Office Action dated Jul. 27, 2016, U.S. Appl. No. 13/779,658, filed Feb. 27, 2013, Capper et al., 28 pages.

Non-Final Office Action dated Aug. 2, 2016, U.S. Appl. No. 13/673,776, filed Nov. 9, 2012, Capper et al., 23 pages.

* cited by examiner

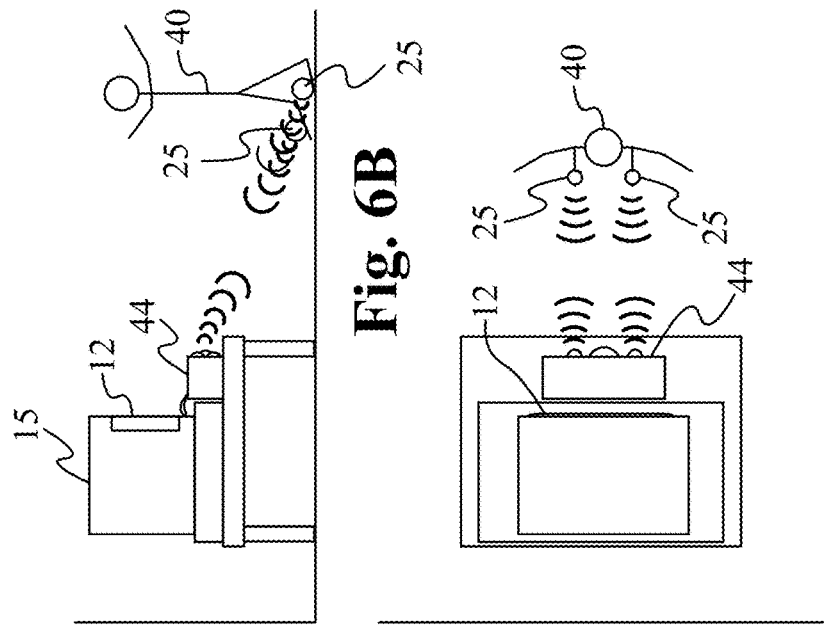
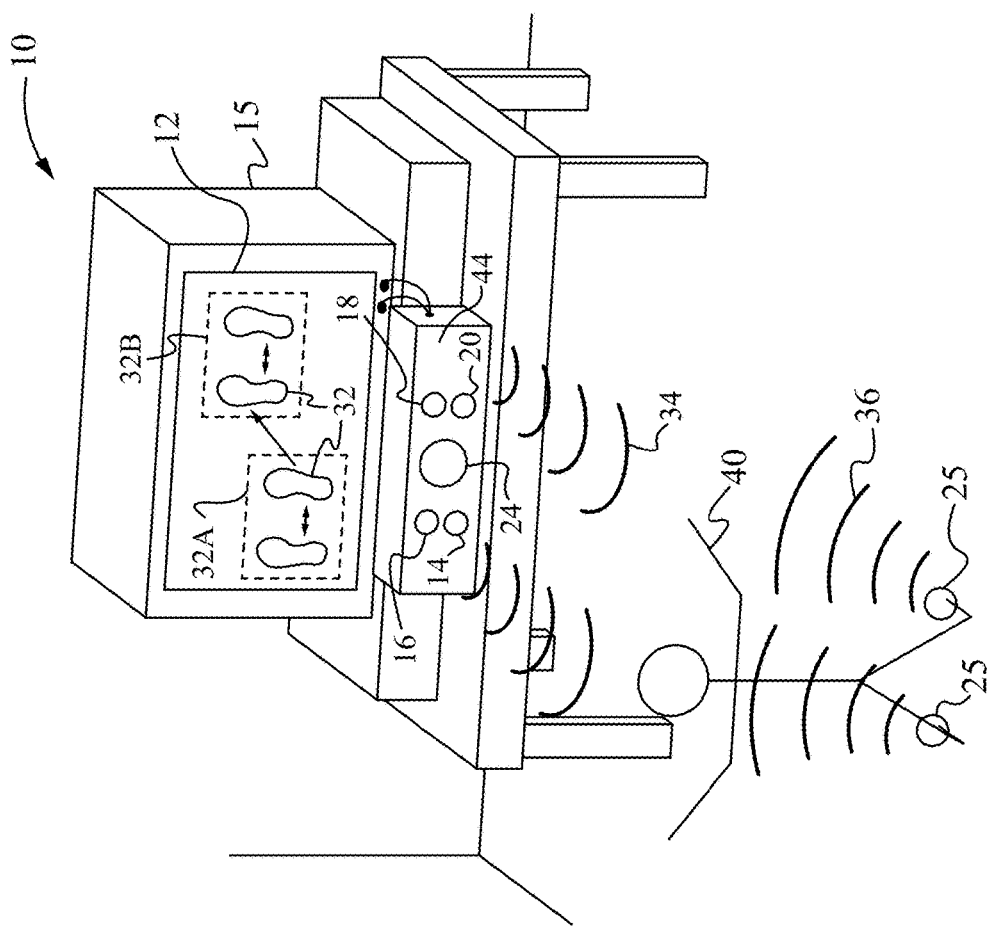

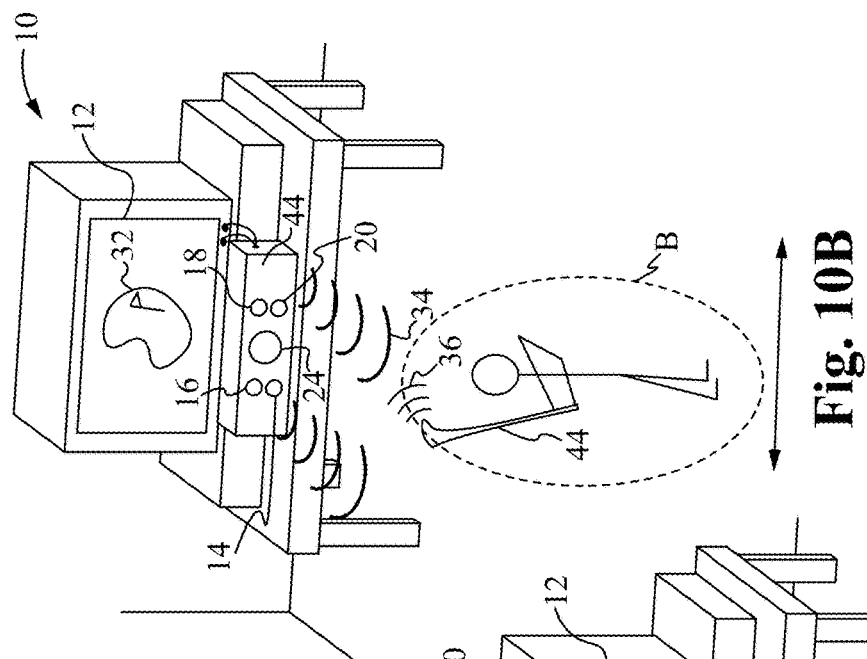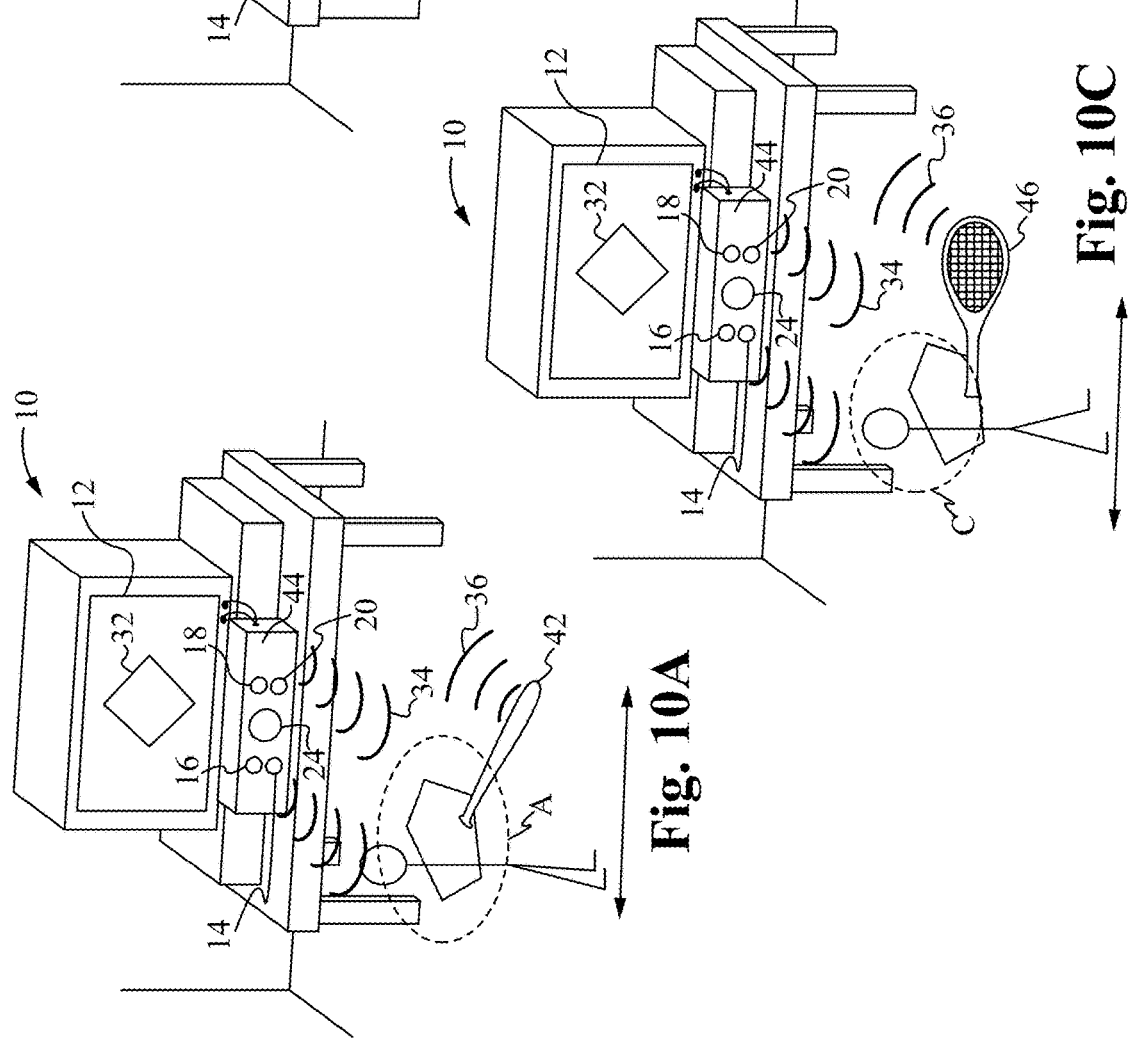

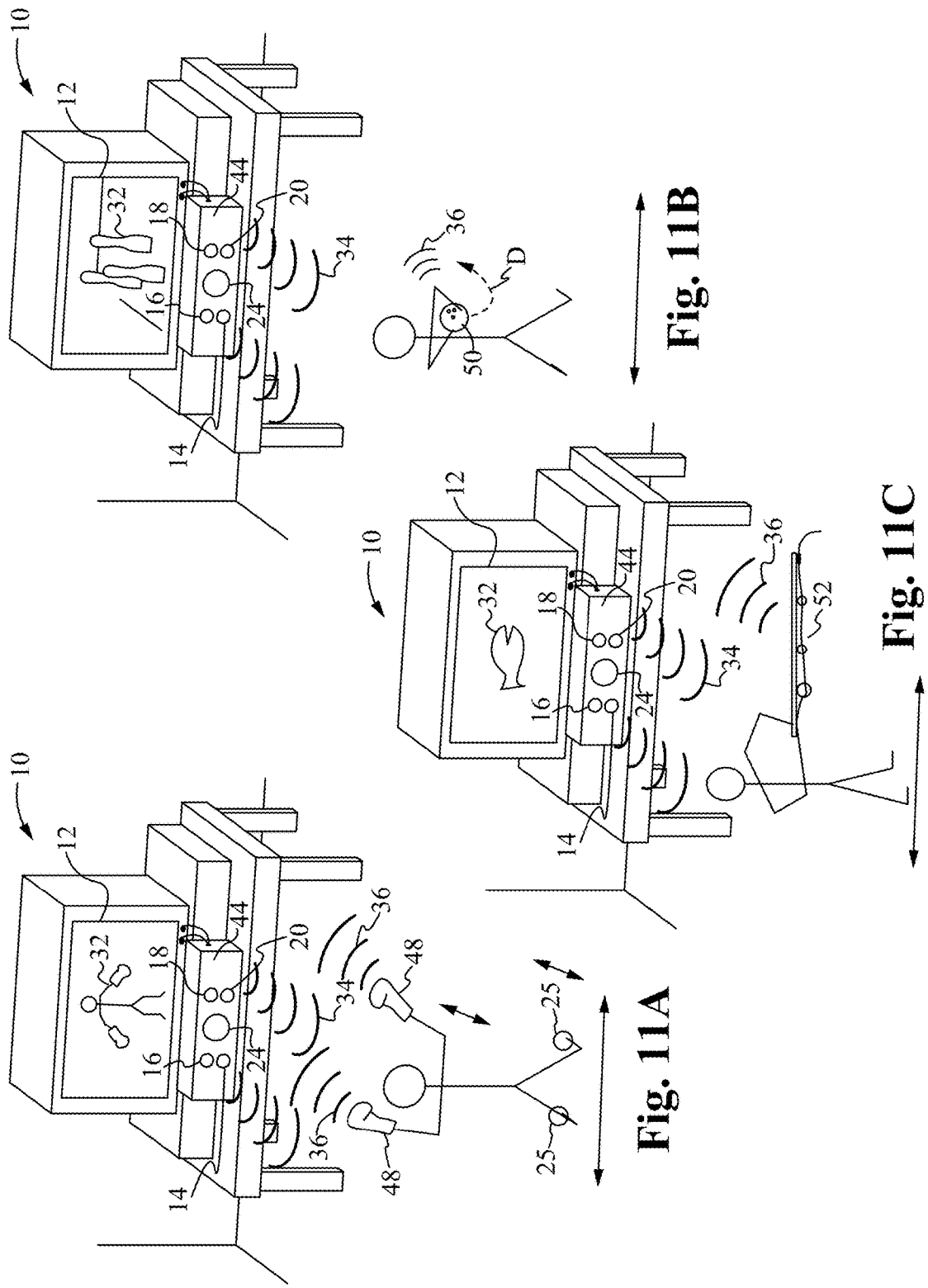

position and distance for retro reflector
as tracked by mobile device
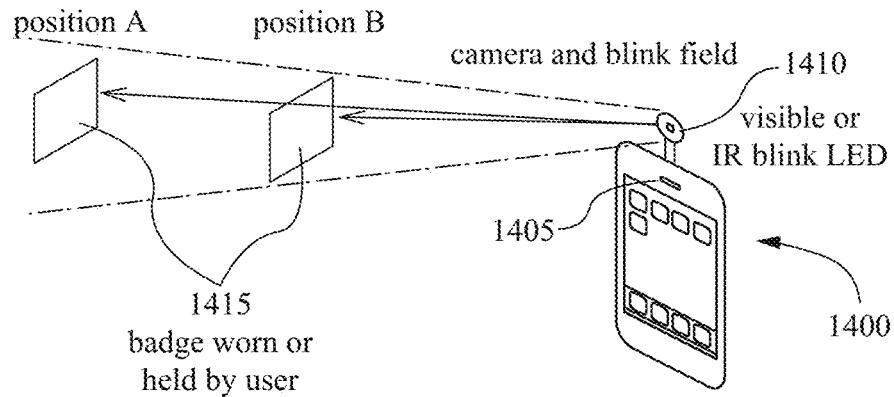
X, Y, and Z information
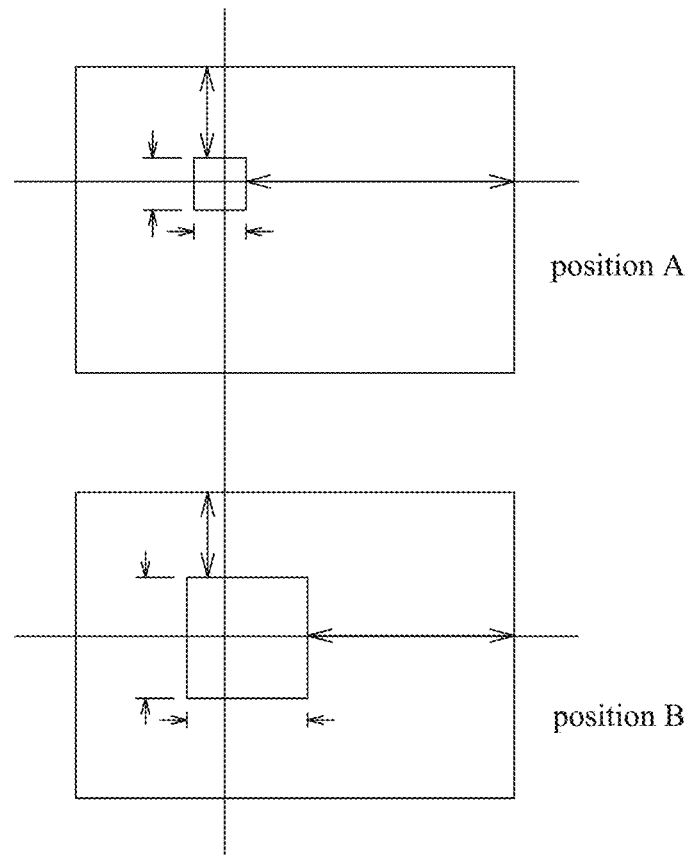
Fig. 14A

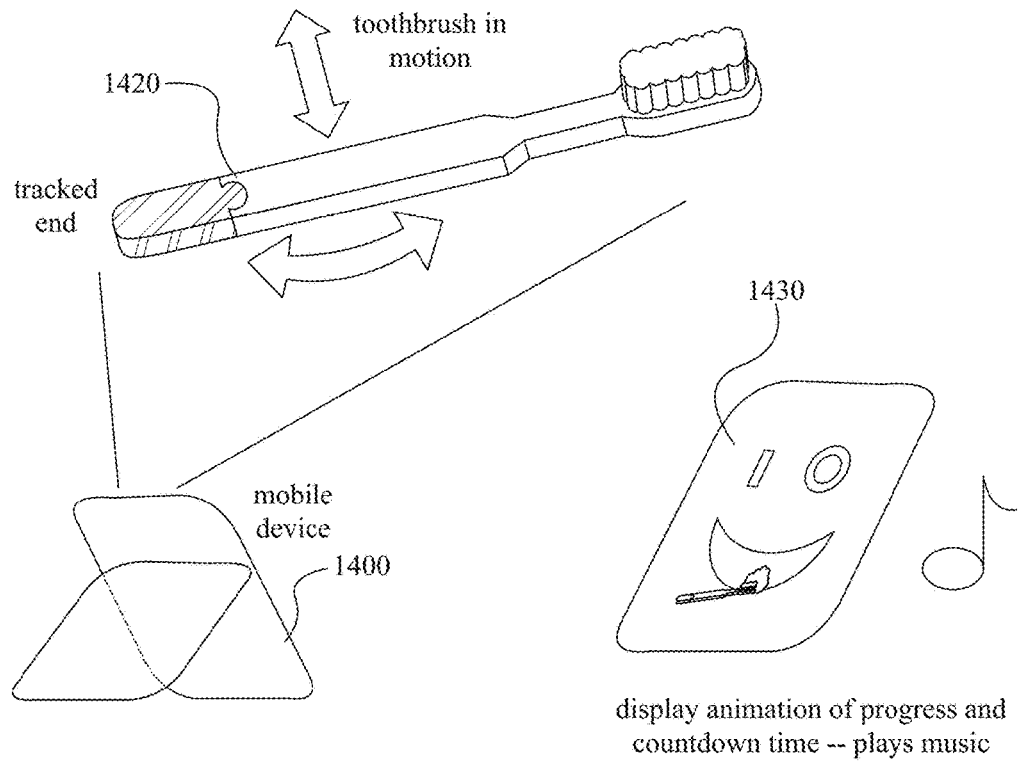
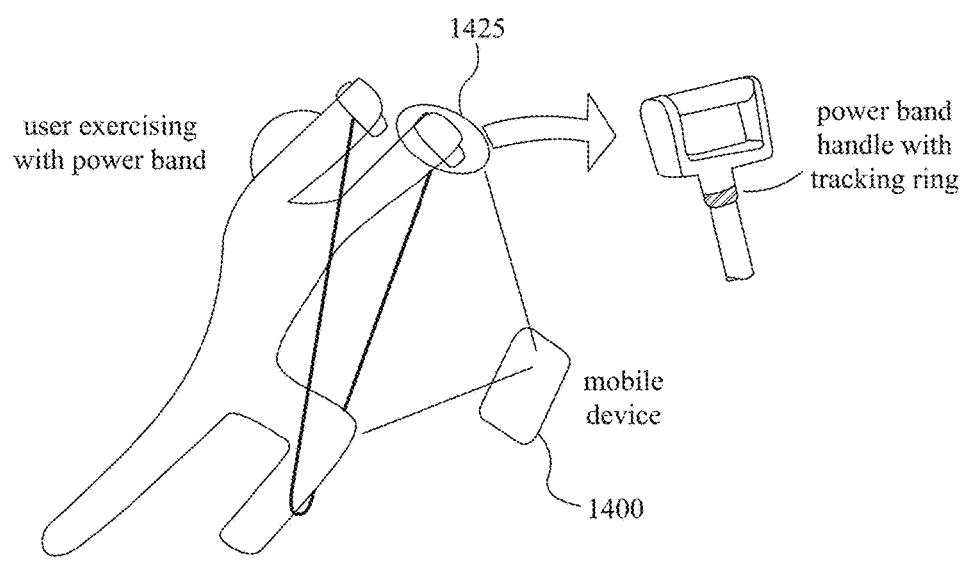
Fig. 14B fixed front faced camera tilts parallel to the ground added camera (via port)

Optical Camera Enhancements

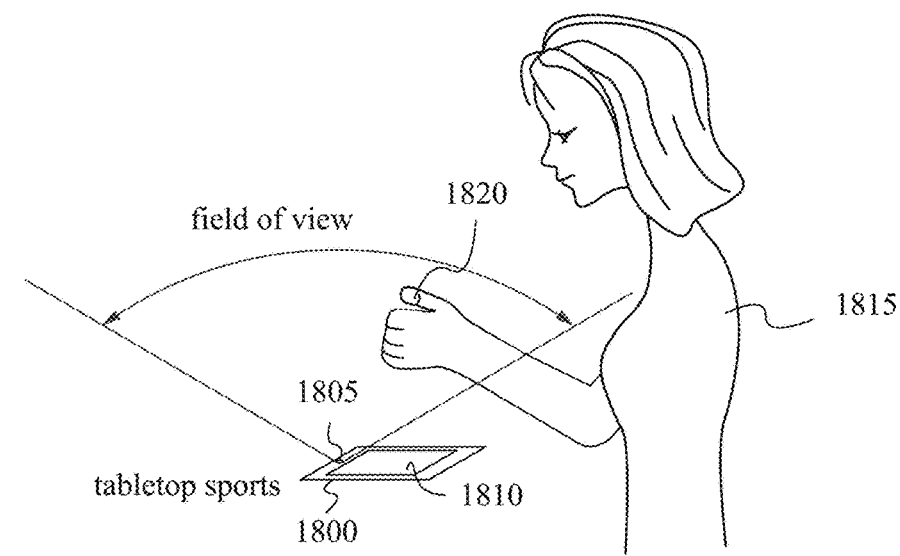
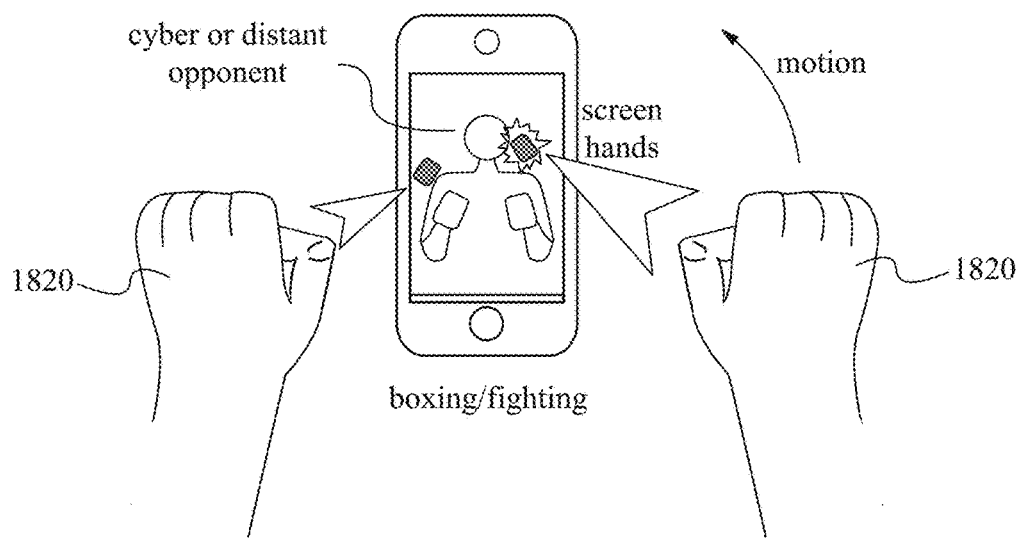
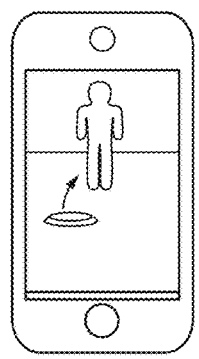
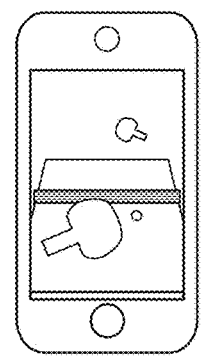
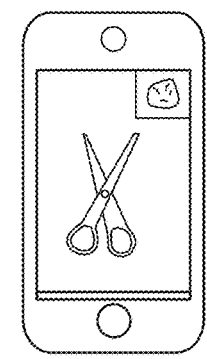
Fig. 18

Dynamic Chroma Gain Correlation

DCGC uses real time color information from the natural lighting conditions to track objects of interest by their color. This eliminates variation due to camera performance, room lighting and sun position during game play. The Chroma scale is mounted on an adjustable clip that promotes horizontal and vertical use.

Color Interaction with
Mobile Device
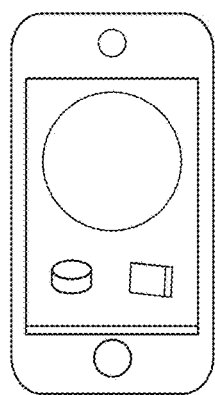
phone shows
face circle
color in toys or other objects and
trigger mobile device interaction
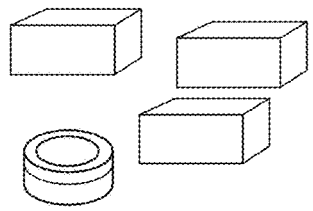
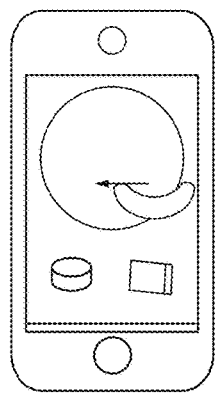
make a smile
and align
to face
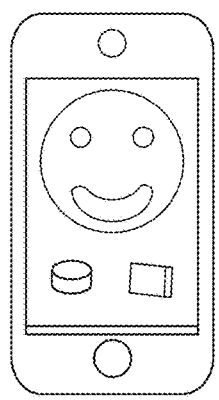
mobile device
recognizes
smile, adds eyes
and makes
interactions
doh or toy bricks can
make items for interaction
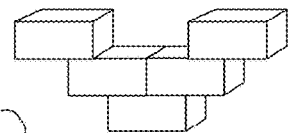
Fig. 23 when colored band is stretched, the size and shape change

Interactive Brush Tracking

Waterproof Tags Clip on Brush tag examples:   music   game   brush

App Examples
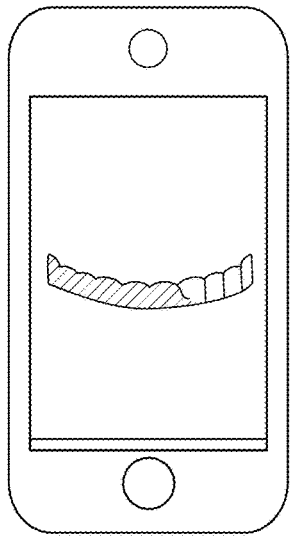
As the user brushes, it can show a progress map and play music
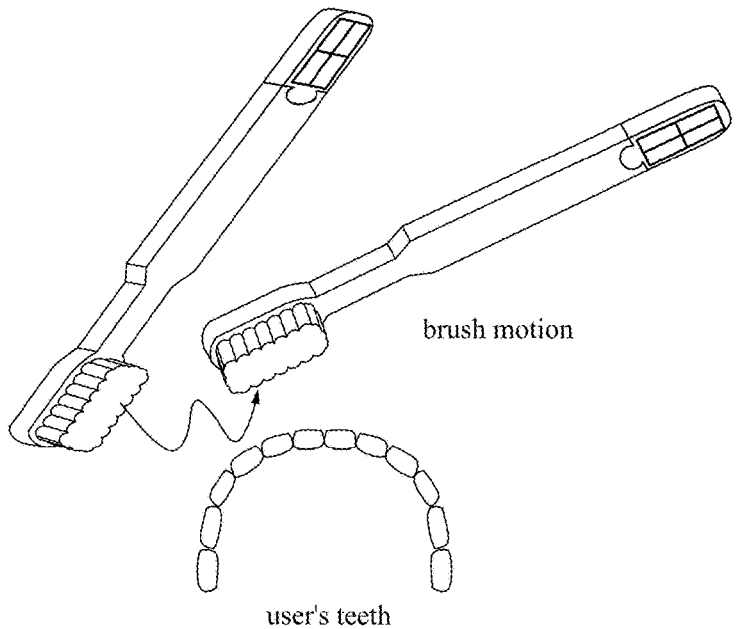
brush motion
user's teeth
Fig. 27A
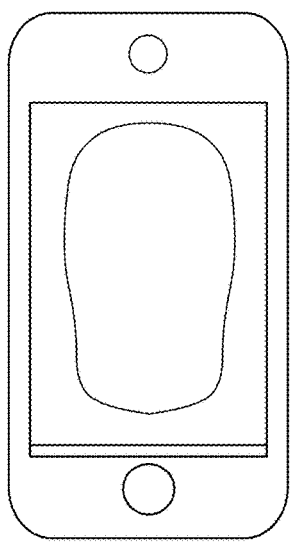 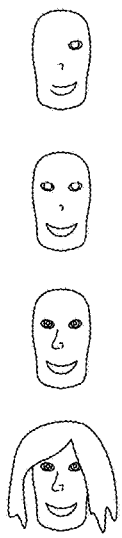
Example of game: As child brushes different areas of her mouth the different facial features of a character will appear. If the child is not completely brushing, a voice prompt will help guide them.
Fig. 27B

VIDEO MOTION CAPTURE FOR WIRELESS GAMING

RELATED APPLICATION

This patent application is a divisional of the co-pending U.S. patent application Ser. No. 13/673,776, filed Nov. 9, 2012, entitled "VIDEO MOTION CAPTURE FOR WIRELESS GAMING," which claims priority under 35 U.S.C. § 119(e) of the U.S. Provisional Patent Application Ser. No. 61/558,393, filed Nov. 10, 2011, and titled "VIDEO MOTION DETECTION FOR MOBILE GAMING," and of the U.S. Provisional Patent Application Ser. No. 61/600,476, filed on Feb. 17, 2012, and titled "METHODS AND DEVICES TO IMPROVE DETECTION AND TRACKING OF OBJECTS BASED ON COLOR AND RELATED APPLICATIONS," and of the U.S. Provisional Patent Application Ser. No. 61/718,104, filed on Oct. 24, 2012, and titled "METHODS AND DEVICES TO IMPROVE DETECTION AND TRACKING OF OBJECTS USING AUGMENTED REALITY AND RELATED APPLICATION," which are all hereby incorporated by reference.

This co-pending U.S. patent application Ser. No. 13/673,776, filed Nov. 9, 2012, entitled "VIDEO MOTION CAPTURE FOR WIRELESS GAMING," a continuation in part of the co-pending U.S. patent application Ser. No. 12/617,633, filed Nov. 12, 2009, entitled "PLUG AND PLAY WIRELESS VIDEO GAME," which claims priority under 35 U.S.C. § 119(e) of the U.S. Provisional Patent Application Ser. No. 61/113,933, filed Nov. 12, 2008, and titled "PLUG AND PLAY WIRELESS VIDEO GAME," which are all hereby incorporated by reference.

FIELD OF THE INVENTION

The present invention is related to video and mobile games, especially in the field of oral care. More specifically, the present invention relates to video motion capture for wireless gaming, such as a tooth brushing application.

BACKGROUND

Electronic video games have enjoyed large acceptance in the marketplace. Video games have incorporated wireless configurations to increase their ease and enjoyment. Conventional wireless video games require a user to stand near the console and limit the types of motion that the game can detect. Also, conventional video games require a user to hold one or more active elements that increase the cost of the video device. The user registers a motion in the game by performing a preset motion. One drawback with such an approach is the user lacks ease in switching between different types of activities that are included within the video game. Many additional game components must be stored when the game is not in use. Another drawback is that game play is limited to the predetermined number of motions. The game cannot recognize feet placement or hand motion except in precisely defined positions, nor can the game recognize or incorporate movement as a game play feature. Still other games require the user to carry or hold an electronic controller with buttons or with accelerometers and radio transmitters. Such complex controllers can increase the complexity and price of a game and requires the user to interact with the game in an artificial and unnatural way.

An ideal video game control device would merely sense the position of each of the user's feet or hands without requiring the user to hold additional active components such as those that use expensive radio frequency oscillators. Further, the device can determine an activity of the user by sensing the type of user movement performed. Such a device would be extremely easy for the user to operate. Further, such a device would greatly simplify and enhance the playing of video games.

SUMMARY OF THE INVENTION

Embodiments of the present invention embody motion detection via a camera for mobile platform video gaming and exercise, in either integrated or separately attachable components. The system includes an oral care device. The oral care device, such as a toothbrush, includes one or more targets. Each target designates a specific area of the toothbrush, such as back side, a front side, a brush head or a brush end. A target can be a color or a tag, and can be removably coupled or integrally formed with the toothbrush. The system also includes an application configured to detect the targets, to determine that a property of any of the targets has changed. Based on at least the determination, the application is configured to monitor progress of brushing and to control an element in the application.

In one aspect, a toothbrush having a stem is provided. The improvement includes a marker located at a portion of the stem and configured to aid in tracking a brushing trajectory. In some embodiments, the marker is a passive marker. The passive marker can be colored or reflective.

In some embodiments, the portion of the stem includes the tip of the stem. The marker is integrally formed or removably coupled with the portion of the stem.

In another aspect, a toothbrush is provided. The toothbrush includes a first portion and a second portion. Both the first portion and the second portion are marked for tracking. In some embodiments, the second portion is marked differently from the first portion for separate tracking.

In some embodiments, each portion is marked using color or a tag. The tag can be an augmented reality (AR) marker, a bar code, or a quick response (AR) code.

In some embodiments, the first portion includes a brush head, and the second portion includes a brush end. When the toothbrush is in a first position, the first portion and the second portion are visible. And, when the toothbrush in a second position, only the second portion is visible. Alternatively, the first portion includes a front side of a brush end, and the second portion includes a backside of the brush end.

In some embodiments, an angle, orientation, location, dimensions or a combination thereof, of each portion is detected by a brushing application to monitor progress of brushing.

In yet another aspect, a non-transitory computer-readable medium is provided. The non-transitory computer-readable medium stores instructions that, when executed by a computing device, cause the computing device to perform a method. The method includes recognizing a target on an oral care device appearing in an image. In some embodiments, the target is a color or a tag. The target typically includes an initial set of characteristics. The characteristics include at least one of angle, orientation, location, and dimensions of the target.

The method also includes tracking the target to determine a second set of characteristics. In some embodiments, tracking the target includes generating a target box for the target, constraining the image to the target box, and extracting information form the target box. In some embodiments, the tracking the target further includes displaying one or more media, and using the extracted information to drive entertainment using The method also includes triggering an event based on the second set of characteristics.

In yet another aspect, a system is provided. The system includes at least one target and an oral care device including the at least one target. In some embodiments, each target designates a specific area of the oral care device.

The system also includes a self-contained electronic device storing instructions that, when executed by the electronic device, cause the electronic device to perform a method. In some embodiments, the self-contained electronic device is a network enabled handheld device that includes a camera to capture an image of the oral care device including the at least one target.

The method includes detecting the at least one target, determining that a property of the at least one target has changed, and based on at least the determination, controlling an element in the application. The property is an angle, orientation, location, and dimensions of the at least one target.

In some embodiments, the method also includes recognizing at least one facial feature. In some embodiments, controlling an element in the application is also based on the at least one facial feature.

In some embodiments, the method also includes implementing a motivation program configured to motivate good oral hygiene. The motivation program can use points, such as reward points for brushing thoroughly.

In some embodiments, the method also includes sharing brushing progress over a network In yet another aspect, a self-contained device is provided. The self-contained device includes a camera including a field of view, at least one light source for illuminating the field of view, a memory storing instructions, and a processing component coupled to the memory. The processing component configured for processing the instructions.

The at least one light source is typically affixed in a position relative to the camera such that neither the at least one light source nor the camera needs to be aligned prior to usage. The at least one light source emits at least one of visible light and invisible light.

The instructions are for detecting and tracking at least one object within the field of view. In some embodiments, the instructions are also for controlling at least one element of an application. In some embodiments, the instructions are also for analyzing motion to determine long term patterns of game play.

BRIEF DESCRIPTION OF THE DRAWINGS

The novel features of the invention are set forth in the appended claims. However, for purpose of explanation, several embodiments of the invention are set forth in the following figures.

FIG. 6A shows a perspective view of a video game device according to an embodiment of the present invention.

FIGS. 6B and 6C show side and top views, respectively, of a video game device according to an embodiment of the present invention.

FIG. 10A shows a perspective view of a baseball video game device according to an embodiment of the present invention.

FIG. 10B shows a perspective view of a golf video game device according to an embodiment of the present invention.

FIG. 10C shows a perspective view of a tennis video game device according to an embodiment of the present invention.

FIG. 11A shows a perspective view of a kick boxing video game device according to an embodiment of the present invention.

FIG. 11B shows a perspective view of a bowling video game device according to an embodiment of the present invention.

FIG. 11C shows a perspective view of a fishing video game device according to an embodiment of the present invention.

FIG. 14A shows a mobile device for identifying elements according to an embodiment of the invention.

FIG. 14B shows exemplary accessories used during game play according to an embodiment of the invention.

FIG. 18 shows exemplary table top games according to an embodiment of the invention.

FIG. 23 shows exemplary interactive game using other common colored toys or objects according to an embodiment of the invention.

FIGS. 27A-27B show another exemplary tooth brushing applications according to an embodiment of the invention.

DETAILED DESCRIPTION

In the following description, numerous details and alternatives are set forth for purpose of explanation. However, one of ordinary skill in the art will realize that the invention can be practiced without the use of these specific details. In other instances, well-known structures and devices are shown in block diagram form in order not to obscure the description of the invention with unnecessary detail.

Prior art mobile device applications or games lack physical activity in their operation. Those that do, rely on the user to move the device to record activity and without screen interaction as a safety concern. Embodiments of the present invention embody video motion detection via a camera for mobile platform video gaming and exercise, in either integrated or separately attachable components. Stated differently, the video motion detection means can be integrally manufactured with a mobile device, or video motion detection means can be separately provided and configured for specific commercially available mobile devices.

Figure 1:
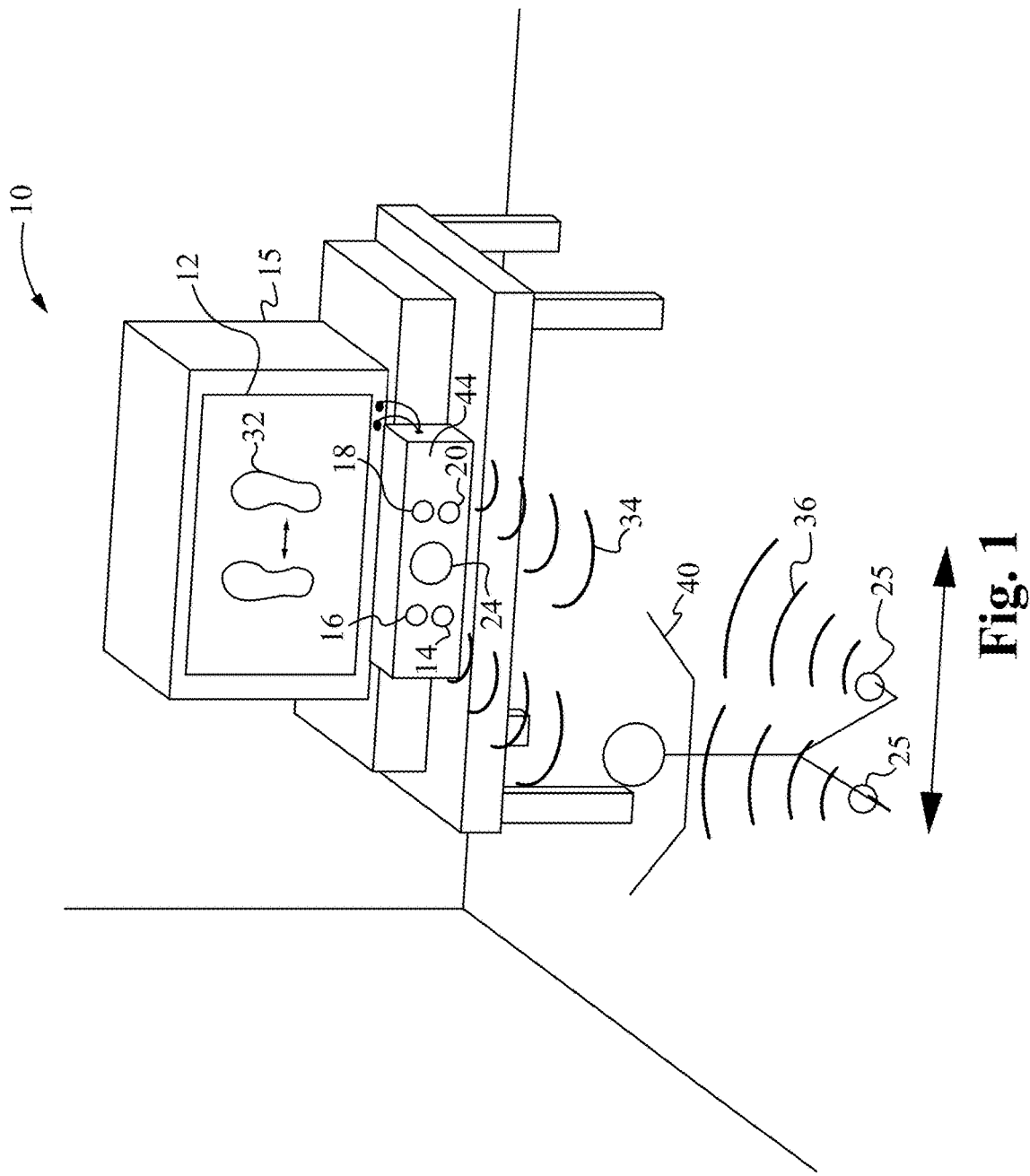
FIG. 1 shows a perspective view of a video game according to an embodiment of the present invention.
Figures 2, 3:
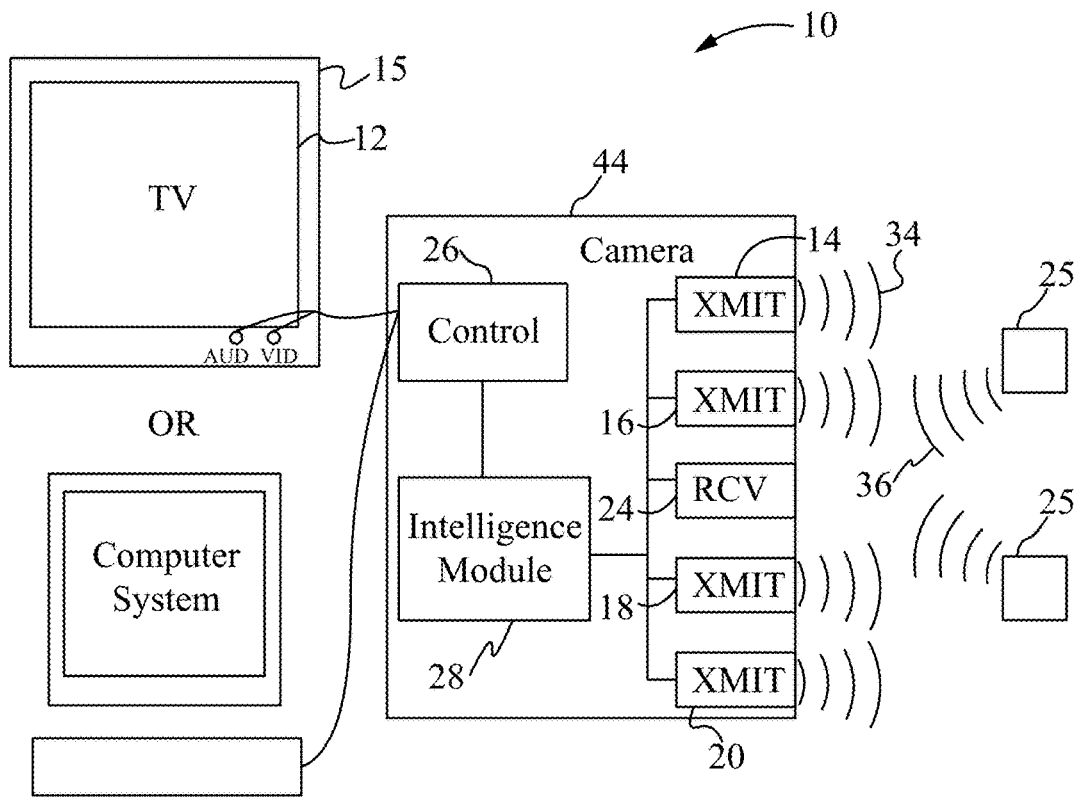
FIG. 2 is a functional block diagram of a video game device according to an embodiment of the present invention.
FIG. 3 shows an array of detectors according to an embodiment of the present invention.

FIG. 1 shows a first embodiment of the present invention. A video game device 10 having a display screen 12 of a display device 15 and a console 44 is shown. In the preferred embodiment, there are two light (e.g., optical) transmitters, though more can alternatively be used. In an exemplary, embodiment, a plurality of light transmitters 14, 16, 18, 20 form a light transmitter array. A light receiver or detection array 24 is centrally located between the transmitters 14, 16, 18, 20. The optical transmitters 14, 16, 18, 20 can be infrared transmitters, though other types of light transmitters (e.g., visible and non-visible), other optical transmitters, or other kinds of energy radiators can also be used. The detection array 24 can be a charge coupled device (CCD) and can include a lens. It will be apparent to those of ordinary skill in the art that other detectors can be used, in other configurations. Each transmitter 14, 16, 18, 20 and the detection array 24 is coupled to a control circuit 26 via an intelligence module 28 (FIG. 2). The intelligence module 28 is coupled to the control circuit 26 to facilitate detection of a user motion or activity. The control circuit 26 is included in the console 44 to control a sensed user position as an image or a cursor on the screen 12. Retroreflective "badges" or retroreflectors 25 are coupled to the feet or ankles of a player 40 or other part of the body. The retroreflectors 25 can include clips or buckles to mount to the user's shoes or can be on a Velcro® strap and mounted around the user's ankles. The retroreflectors 25 act as retroreflectors of light radiation that is transmitted by the transmitters 14, 16, 18, 20. In one embodiment, the video game device 10 can be plug and play. The plug and play video game device 10 does not require an extensive set up or programming by the user. The video game device 10 is operable by simply plugging into an audio and video jack of the display device 15 such as a television or audio and video jacks of a VCR, DVD player, or computer input.

In FIG. 1, the feet of the user 40 are shown to move first to the left and then in the right direction. If the video game device 10 is operating in a conventional display mode, the image of the user's feet will traverse a path on the screen 12 mimicking (illustrated at 32) the path traversed by the movement of the user's feet. In an exemplary embodiment, the image appears as footprints 32 on the screen 12.

FIG. 2 shows a more detailed view of the transmitters 14, 16, 18, 20, the detection array 24 and the retroreflectors 25. As in all the figures, identical labels refer to identical components. In an exemplary embodiment, the transmitters 14, 16, 18, 20 are light emitting diodes (LEDs) and the detection array is an array of CCD receivers, such as used in some digital cameras, or an array of photo transistors. In addition, FIG. 2 shows a representation of the transmitted light radiation 34 and the reflected radiation 36. The radiation 34 is transmitted from the transmitters 14, 16, 18, 20. The radiation 34 is transmitted in all directions. For certain applications, the transmitted radiation can be columnized using lenses. Some portion of the transmitted radiation 34 will strike the retroreflectors 25. That portion of the radiation 34 striking the retroreflectors 25 will be reflected, also in all directions. Using the array of transmitters 14, 16, 18, 20 in combination with the detection array 24 allows determination of distance and movement of the retroreflectors 25 within three dimensional space. Such information facilitates the operation of certain video games.

The strength of reflected radiation must exceed background radiation levels.

Preferably, the detection array 24 is configured as a two dimensional array of receiver detectors, such as an array of CCD devices. In some embodiments, there can be receive optics positioned over the detection array 24. The detection array 24 can be positioned to view an area of a surface, such as the floor. A user wearing retroreflectors 25 within the field of view on the floor will reflect radiation from the retroreflectors 25 to the detection array 24. Certain elements in the detection array 24 will correspond to certain positions within the field of view on the floor. When a user's foot wearing a retroreflector 25 is in a location in the field of view, light radiation will be reflected and impinge on the corresponding elements in the detection array 24. In this way, the detection array 24 can operate in a manner analogous to a digital camera. It will be appreciated that the detection array 24 can be configured to identify a user's foot when the sensed radiation exceeds a predetermined threshold for each of the elements in the detection array 24.

The intelligence module 28 can detect a wide range of user motions or activities. The intelligence module 28 comprises a microprocessor configured to interact with the transmitters 14, 16, 18, 20 and the detection array 24. The intelligence module 28 interprets reflected radiation from the retroreflectors 25 and determines the user motion. The intelligence module 28 is configured to mimic an "intuitive" controller since multiple user activities can be determined. For example, the user can simulate a baseball swing and the intelligence module 28 determines the user motion to be a baseball swing. Alternatively, the user can simulate a golf swing and the intelligence module 28 determines the user motion to be a golf swing. The intelligence module 28 can be configured to distinguish the action of the user to be a baseball swing or a golf swing. The intelligence module 28 can determine patterns of reflected radiation received from the detection array 24 since certain elements in the detection array 24 correspond to certain positions within the three dimensional field of view of the detection array 24. The intelligence module 28 can also determine the strength of reflected radiation and detect if the user motion is mostly a vertical motion as in a golf swing or a horizontal motion as in a baseball swing.

FIG. 3 shows the receiver 24 in accordance with one embodiment of the invention, formed from an array of detectors 200. In one embodiment, each of the detectors 200 is a charge coupled device, such that the array of detectors 200 functions as a camera. As shown in FIG. 3, each detector is labeled by an alpha-numeric character denoting its row and column. For example, the detector labeled "A3" is in the first row ("A") and the third column. Similarly, the detector labeled "F8" detector is in the sixth row and eighth column.

Figure 4A:
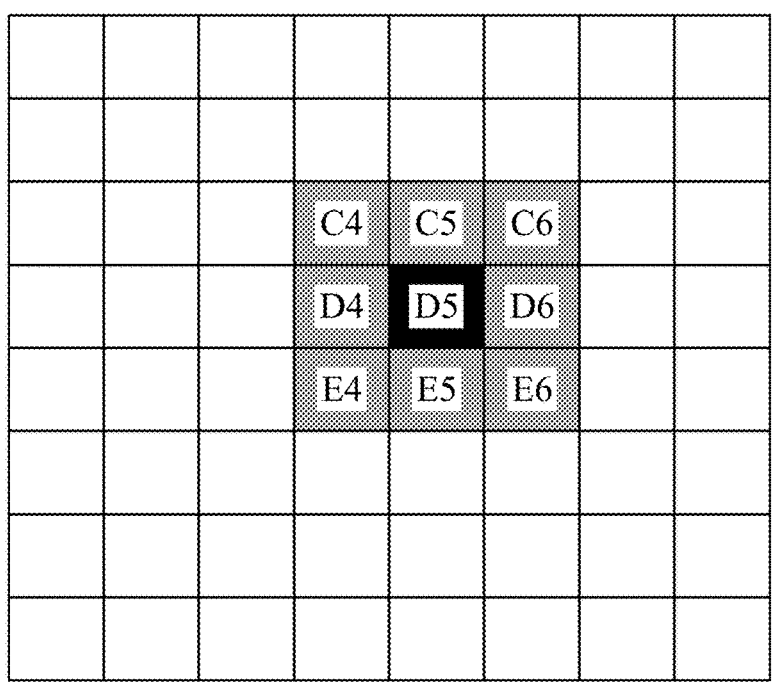
FIGS. 4A-4B show the array of detectors in FIG. 3, tracking a moving object.
Figure 4B:
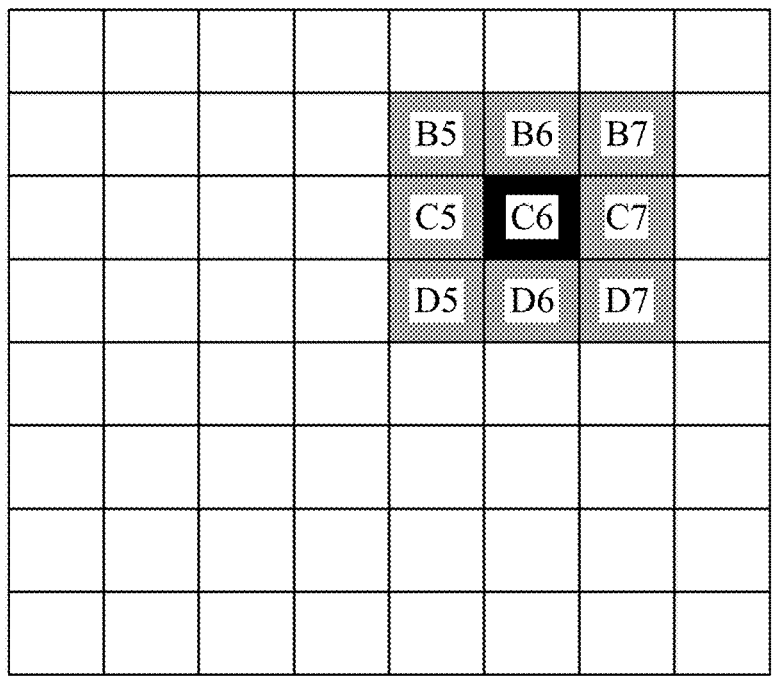

FIGS. 4A and 4B show the array of detectors 200 receiving radiation reflected from a moving object. To make FIGS. 4A and 4B easier to read, only those labels necessary to explain the drawings are included. As shown by the relative shadings in FIG. 4A, the detector D5 receives the most radiation (e.g., illumination) reflected from the object. The detectors C4-C6, D4, D6, and E4-6 receive less radiation, and the remaining detectors receive none at all. At a later time, shown by FIG. 4B, with the object still being irradiated, the detector C5 receives the most radiation reflected from the object. The detectors B5-B7, C5, C7, and D5-D7 receive less radiation, and the remaining detectors receive none at all. This relative "movement" of radiation indicates that the object has moved in a direction corresponding to movement from D5 to C6. Referring to FIG. 6A below, this movement is "reproduced" by moving the feet images 32 from location 32A to 32B.

While the array of detectors 200 is an 8×8 square, detectors of other sizes and configurations can also be used. Some examples includes larger square arrays, such as 256× 256 array; smaller square arrays, such as 4×4; rectangular arrays; other uniform arrays, as well as non-uniform arrays. Those skilled in the art will recognize that different size and different configuration arrays can be selected to fit the application at hand.

Figure 5:
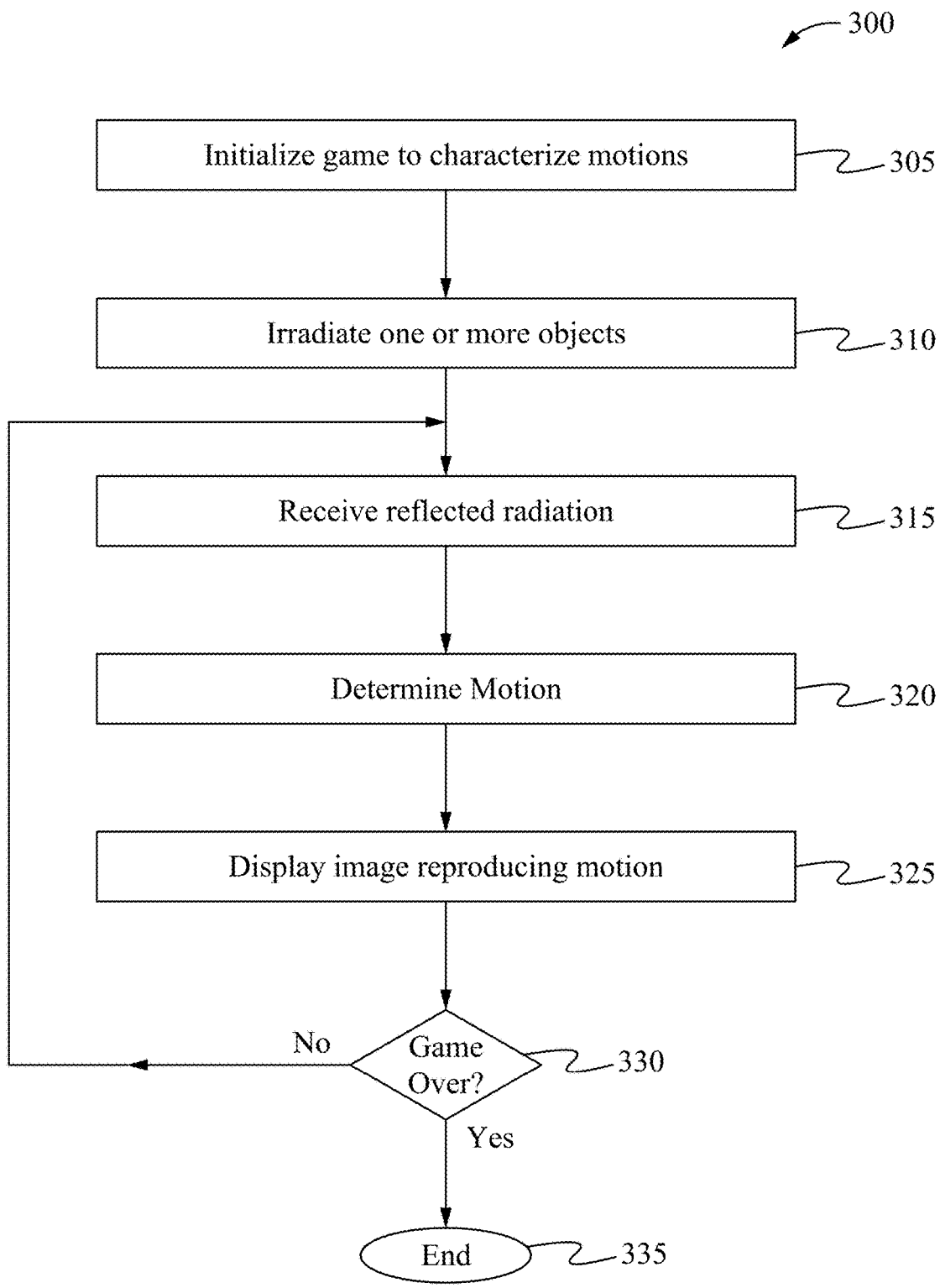
FIG. 5 shows the steps of a method for reproducing the motion of an object according to one embodiment of the invention.

FIG. 5 shows the steps 300 of tracking and reproducing motion in a game device in accordance with one embodiment of the invention. In the step 305, a game device is initialized to characterize motions. For example, if the game device is used to track and display moving feet, the user motions are "characterized by" and translated to moving feet. The game device is now ready for playing.

Referring to the device 10 of FIG. 1 to explain the steps 300: In the step 310 radiation is transmitted from the transmitters 14, 16, 18, 20, reflected off the retroreflectors 25, and, in the step 315, received at the receiver 24. In this example, the retroreflectors are attached to feet. When the steps 310 and 315 are performed sequentially, the motion of the feet are determined in the step 320. In the step 325, an image corresponding to the moving feet are displayed on the screen 12.

In the step 330, the method determines whether the game is finished. If the game is finished, the method proceeds to the step 335, where the game ends. Otherwise, the method loops back to the step 315.

Referring to FIGS. 2 and 5, in one embodiment each of the steps 300 is performed in either the control circuit 26 or the intelligence module 28. In one embodiment, the control circuit 26 and the intelligence module 28 include a computer-readable medium containing computer readable instructions executed by a processor to perform the steps 300.

The steps 300 are only exemplary. Some steps can be added, some steps can be deleted, and the steps can be performed in different orders than the one shown.

The retroreflectors 25 located within the volume of space sensed by embodiments of the present invention will be represented on the display screen 12 at a particular location. As the retroreflectors 25 move and are positioned in a new location the relative analogue change in position will be displayed on the screen 12. More precise position identification can be obtained through the use of precision components, such as optical lenses and circuitry.

In an exemplary embodiment of the present invention, it is desirable for the video game device 10 to sense the location of more than one object. Each of the players feet can be sensed separately. In FIGS. 6A-6C, the player 40 is positioned in order to see the display 12. The display 12 is controlled in the usual manner as describe above by the video game device 10 which in some circumstances may be a personal computer. The display 12 can show, among other things, a caricature of the player as a dancer in a venue.

The video game device 10 separately identifies a left foot movement and a right foot movement. It can sense forward, backward and sideways movement. When utilizing embodiments of the present invention, the location of each foot of the player 40 can be uniquely determined by having a retroreflector 25 attached to each foot of the player 40.

When utilizing embodiments of the present invention with this game, the control circuitry 26 can be set to register movement of the retroreflectors 25 after a particular threshold of reflected signal is received. This signifies that the player's feet are at least as close as some predefined limit to the detection array 24. In the event that the player's feet are farther from the detection array 24 than allowable to achieve the appropriate threshold, no foot movement is indicated on the game screen 12. When the player's feet and the retroreflectors 25 approach the detection array 24 sufficiently close that the threshold is crossed, the display screen 12 will then indicate movement of the player's left or right foot.

The transmitters 14, 16, 18, 20 and the detection array 24 can be used to sense the reflected signal from the retroreflectors 25 and avoid the problem of having a left foot being misinterpreted as a right foot. Accordingly, the video game device 10 can distinguish the player's left foot from her right foot using kinematic rules whereby assumptions are made. These include assuming that at least one foot is always on the ground in static states and dynamic states with the exception of jumps.

Figure 7A:
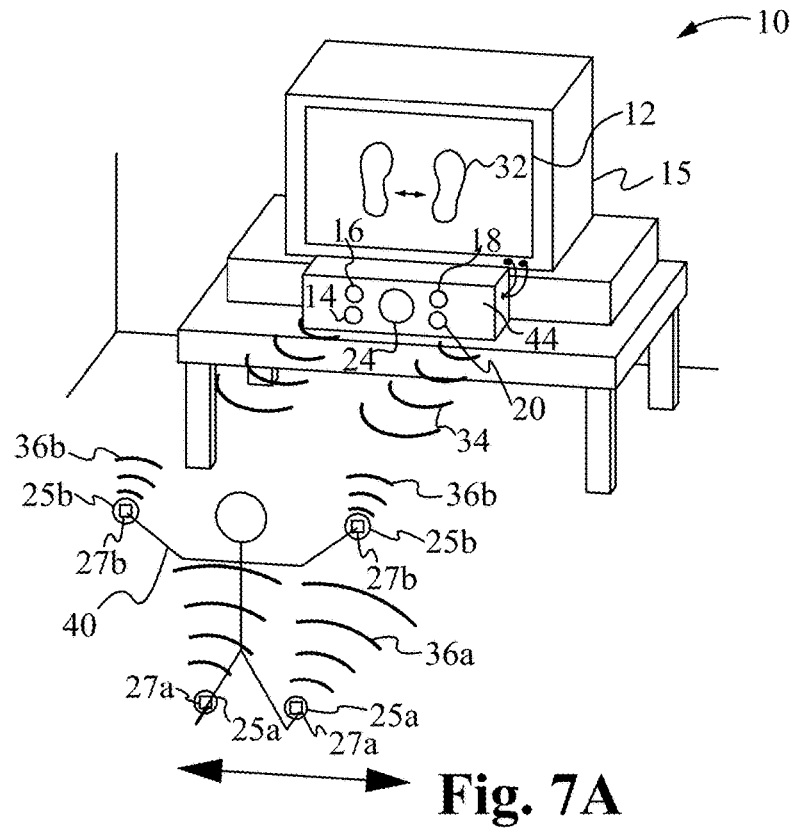
FIG. 7A shows a perspective view of a video game device according to an alternative embodiment of the present invention.
Figure 7B:
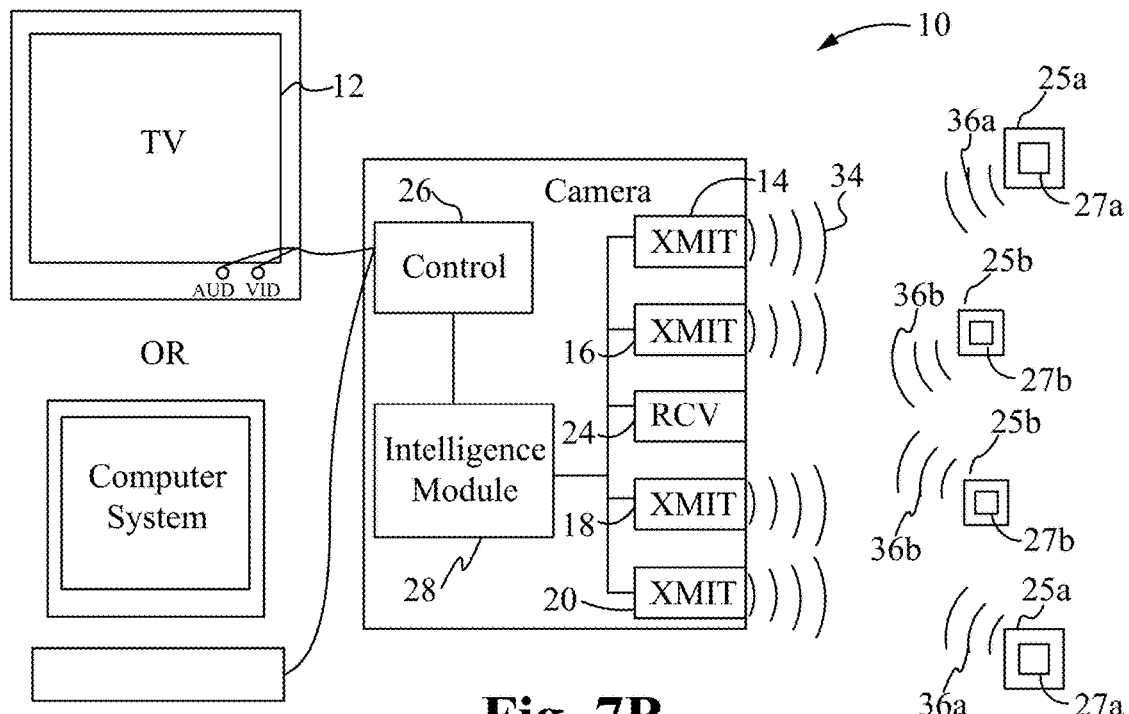
FIG. 7B is a functional block diagram of a video game device according to an alternative embodiment of the present invention.

FIGS. 7A and 7B show an alternative embodiment of the video game device 10. The video game device 10 includes the light transmitters 14, 16, 18, 20, the detection array 24 and a first pair of retroreflectors 25a on the user's feet and a second pair of retroreflectors 25b on the user's hands. Each of the first and second pair of retroreflectors 25a, 25b can include a filter element 27a, 27b respectively. In an exemplary embodiment, the transmitters 14, 16, 18, 20 are infrared light emitting diodes (LEDs) and the detection array is an array of CCD receivers, such as used in some digital cameras, or an array of photo transistors. In addition, FIGS. 7A and 7B show a representation of the transmitted radiation 34 and the reflected radiation 36a and 36b. The radiation 34 is transmitted from the transmitters 14, 16, 18, 20. The radiation is transmitted in all directions. Some portion of the transmitted radiation 34 will strike the first pair of retroreflectors 25a and the second pair of retroreflectors 25b. That portion of the radiation striking the first and second pair of retroreflectors 25a, 25b will be reflected, also in all directions. Using the array of transmitters 14, 16, 18, 20 in combination with the detection array 24 allows determination of distance and movement of the first and second pair of retroreflectors 25 within three dimensional space.

The detection array 24 can be positioned to view an area, such as the three dimensional space in front of the video display device 12. A user 40 wearing the first and second pair of retroreflectors 25a, 25b within the field of view in the area will reflect light radiation from the retroreflectors 25a, 25b to the detection array 24. Certain elements in the detection array 24 will correspond to certain positions within the field of view in the area. When a user's feet wearing the retroreflectors 25a or the user's hands wearing the retroreflectors 25b are in a location in the field of view, radiation will be reflected and impinge on the corresponding elements in the detection array 24. In this way, the detection array 24 can operate in a manner analogous to a digital camera. It will be appreciated that the detection array 24 can be configured to identify a user's feet or hands when the sensed reflected radiation exceeds a predetermined threshold for each of the elements in the detection array 24.

The intelligence module 28 interprets reflected radiation from the first and second pairs of retroreflectors 25a, 25b and determines the user motion. The intelligence module 28 is configured to mimic an intuitive controller since multiple user activities can be determined. For example, the user can simulate a baseball swing and the intelligence module 28 determines the user motion to be a baseball swing. The intelligence module 28 can determine patterns of reflected radiation received from the detection array 24 since certain elements in the detection array correspond to certain positions within the three dimensional field of view of the detection array 24. The intelligence module 28 and the control circuit 26 are configured to detect and determine if reflected radiation 36a is from the first pair of retroreflectors 25a or reflected radiation 36b is from the second pair of retroreflectors 25b. Identifying the source of reflected radiation 36a, 36b can be facilitated with the filter elements 27a, 27b. The filter elements 27a, 27b can be active or passive devices that modify the transmitted radiation 34. Alternatively, the intelligence module 28 and the control circuit 26 can similarly be configured to distinguish the movement of the user's right hand from the left hand or the right foot from the left foot.

Figure 8A:
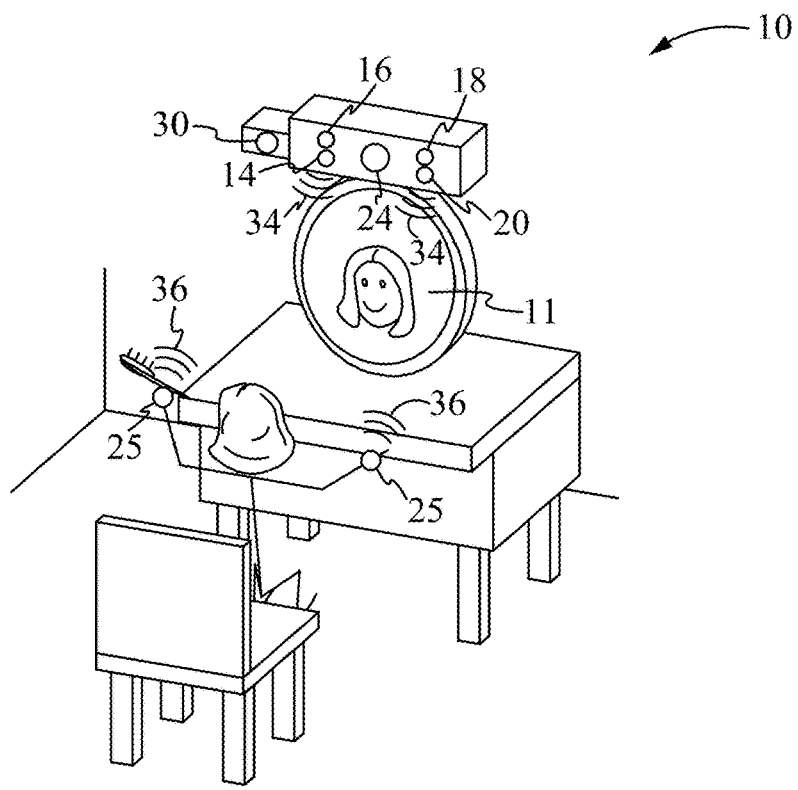
FIG. 8A shows a perspective view of a video game device according to another embodiment of the present invention.
Figure 8B:
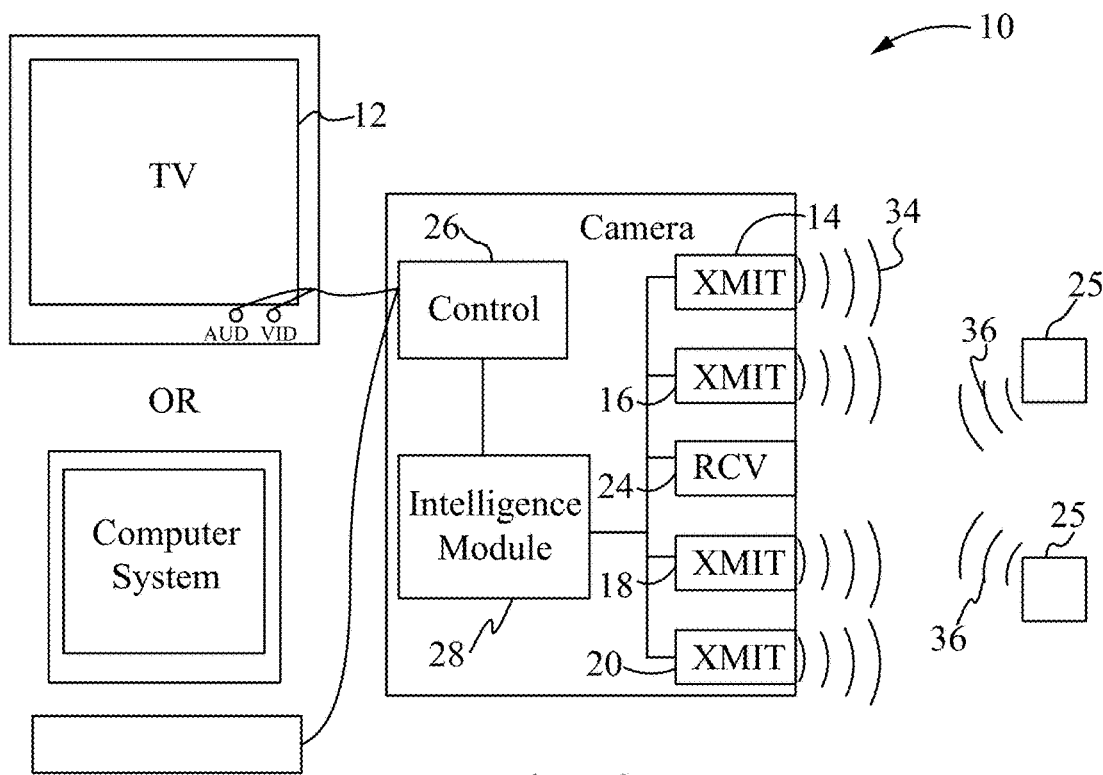
FIG. 8B shows a functional block diagram of a video game device according to another embodiment of the present invention.

FIGS. 8A and 8B show an alternative embodiment of the video game device 10. The video game device 10 includes the light transmitters 14, 16, 18, 20, the detection array 24 and retroreflectors 25. An audio device 30 such as a speaker is also included. In an alternative embodiment, each of the retroreflectors 25 can include a filter element as in the previous embodiment. In an exemplary embodiment, the transmitters 14, 16, 18, 20 are light emitting diodes (LEDs) and the detection array is an array of CCD receivers such as in some digital cameras or an array of photo transistors. In addition, FIGS. 8A and 8B show a representation of the transmitted radiation 34 and the reflected radiation 36. The radiation 34 is transmitted from the light transmitters 14, 16, 18, 20. The radiation is transmitted in all directions. Some portion of the transmitted radiation 34 will strike the retroreflectors 25. That portion of the radiation striking the retroreflectors 25 will be reflected, also in all directions. Using the array of transmitters 14, 16, 18, 20 in combination with the detection array 24 allows determination of distance and movement of the first and second pair retroreflectors 25 within three dimensional space.

The detection array 24 can be positioned to receive radiation within an area, such as the three dimensional space in front of a display device configured as a pretend mirror 11. In some embodiments, the display device is a magic mirror or an augmented reality mirror that generates an overlay of a image(s) over live video image in real time. A user wearing the retroreflectors 25 within the field in the area will reflect radiation from the retroreflectors 25 to the detection array 24. Certain elements in the detection array 24 will correspond to certain positions within the field of view in the area. When a user's hands wearing the retroreflectors 25 are in a location in the field of view, light radiation will be reflected and impinge on the corresponding elements in the detection array 24. In this way, the detection array 24 can operate in a manner analogous to a digital camera. It will be appreciated that the detection array 24 can be configured to identify a user's hands when the sensed radiation exceeds a predetermined threshold for each of the elements in the detection array 24.

The intelligence module 28 interprets reflected radiation from the retroreflectors 25 and determines the user motion. The intelligence module 28 is configured to mimic an intuitive controller since multiple user activities can be determined. The intelligence module 28 can determine patterns of reflected radiation received from the detection array 24 since certain elements in the detection array correspond to certain positions within the three dimensional field of view of the detection array 24. The intelligence module 28 and the control circuit 26 can be configured to distinguish the movement of the user's right hand from left hand. For example, the user's hand motion can be determined as a grooming activity such as combing of the hair or brushing the teeth. In this way, the video gaming device can facilitate learning proper grooming habits as a grooming game.

Figure 9A:
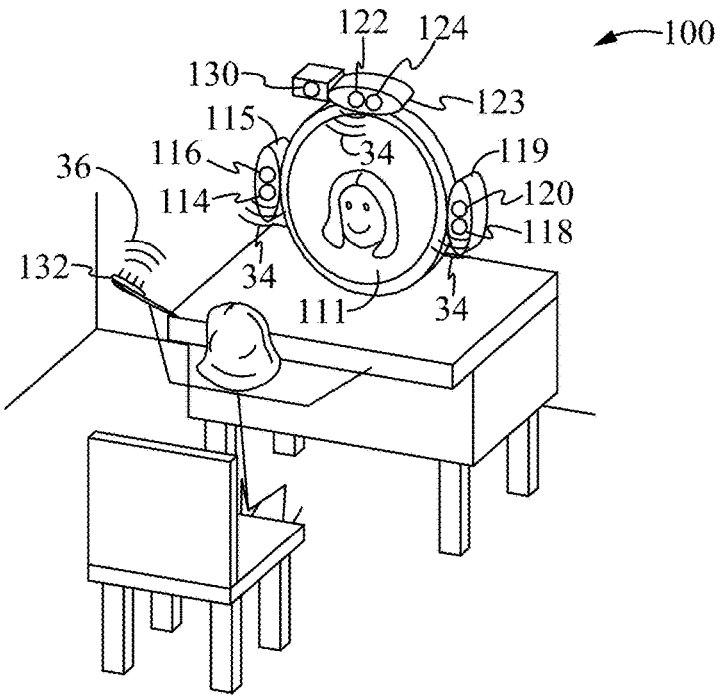
FIG. 9A shows a perspective view of a video game device according to yet another embodiment of the present invention.
Figure 9B:
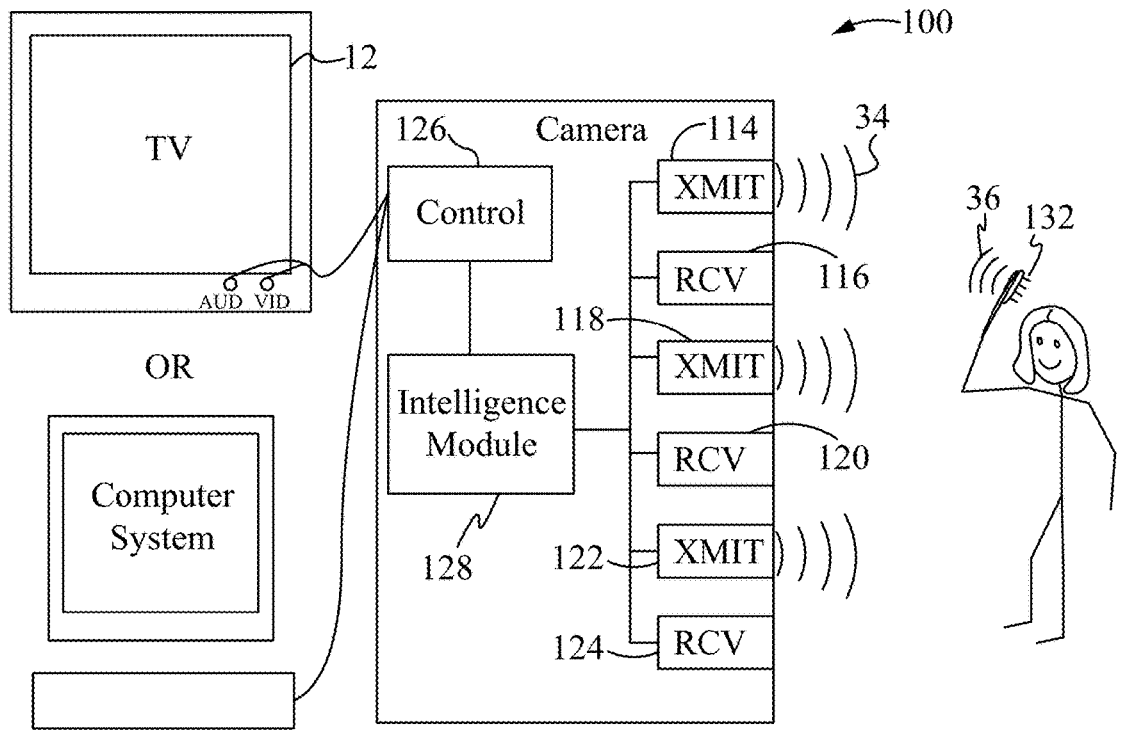
FIG. 9B shows a functional block diagram of a video game device according to yet another embodiment of the present invention.

FIGS. 9A and 9B show an alternative embodiment of the video game device 100 for playing a grooming game. The video game device 100 includes light transmitters 114, 118, 122 and the light receivers 116, 120, 124. An audio device 130 such as a speaker is also included. The light transmitter and receiver pairs 114, 116, 118, 120 and 122, 124 form transceivers 115, 119 and 123 respectively. FIGS. 9A and 9B show a representation of the transmitted light radiation 34 and the reflected radiation 36. The light radiation 34 is transmitted from the transmitters 114, 120, 122. The radiation is transmitted in all directions. Some portion of the transmitted radiation 34 will strike the user's body, for example the user's hand and a brush 132. That portion of the radiation striking the brush 132 will be reflected, also in all directions. Using the array of light transmitters 114, 118, 122 in combination with the light receivers 116, 120, 124 allows determination of distance and movement of the user's body and the brush 132 within three dimensional space. It will be appreciated that the brush 132 can be identified when the sensed light radiation exceeds a predetermined threshold for each of the light receivers 116, 118, 124.

The intelligence module 128 interprets reflected radiation from the user motion. The intelligence module 128 can determine patterns of reflected radiation received from the transceivers 115, 119, 123 within the three dimensional field of view. The intelligence module 128 and the control circuit 126 can be configured to distinguish the movement of the user's right hand from left hand. In an alternative embodiment, the brush 132 can include a filter element as in previous embodiments. In still another embodiment, the user can wear retroreflectors as in previous embodiments.

In an alternative embodiment, a cooking game with multiple venues can be substituted for the grooming game of the previous embodiment. In another embodiment, driving a car or flying a plane can be simulated using a device in accordance with the present invention. In still another embodiment, electronic devices such as personal computers or DVDs can be controlled by determining a user's movement as certain commands.

Figure 10D:
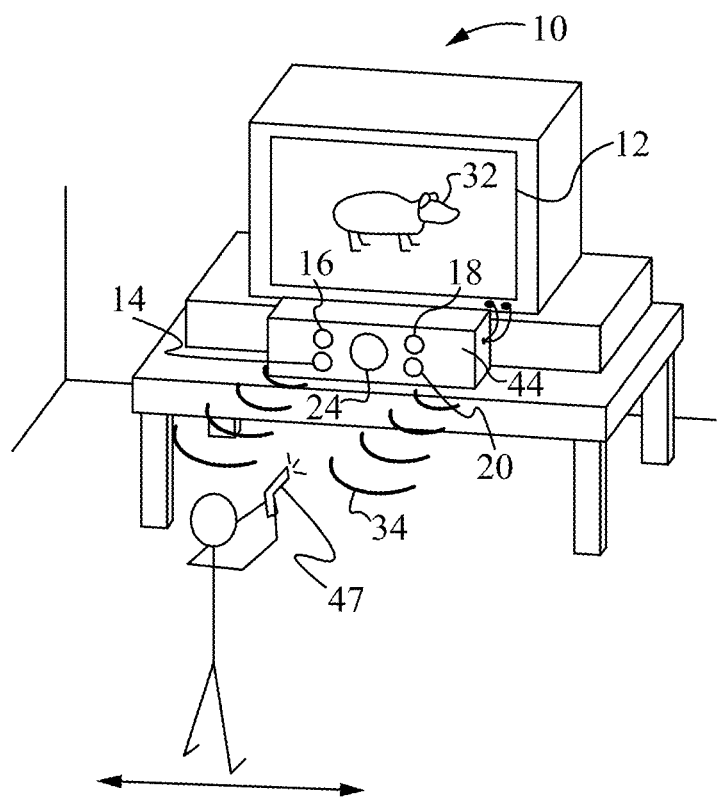
FIG. 10D shows a perspective view of a shooting video game device according to an embodiment of the present invention.

FIGS. 10A-10D show alternative embodiments of the video game device 10 of FIG. 2. As shown in FIG. 10A, the device 10 includes light transmitters 14, 16, 18, 20, the detection array 24 and the game piece or bat 42. A representation is shown of the transmitted light radiation 34 and the reflected radiation 36. The radiation 34 is transmitted from the transmitters 14, 16, 18, 20. The radiation 34 is transmitted in all directions. For certain applications, the transmitted radiation 34 can be columnized using lenses. Some portion of the transmitted radiation 34 will strike the bat 42. That portion of the radiation striking the bat 42 will be reflected, also in all directions. Using the array of transmitters 14, 16, 18, 20 in combination with the detection array 24 allows determination of distance and movement of the bat 42 within three dimensional space.

In some embodiments, there can be receive optics positioned over the detection array 24. The detection array 24 can be positioned to view an area in front of the detection array 24. A user holding the bat 42 within the field of view will reflect light radiation from the bat 42 to the detection array 24. Certain elements in the detection array 24 will correspond to certain positions within the field of view. When the bat 42 is in a location in the field of view, radiation will be reflected and impinge on the corresponding elements in the detection array 24. In this way, the detection array 24 can operate in a manner analogous to a digital camera. It will be appreciated that the detection array 24 can be configured to identify the bat 42 when the sensed radiation exceeds a predetermined threshold for each of the elements in the detection array 24.

The intelligence module 28 in the console 44 interprets reflected radiation from the bat 42 and determines the user motion. The intelligence module 28 is configured to mimic an "intuitive" controller since multiple user activities can be determined. The intelligence module 28 can determine the strength of reflected radiation and detect if the user motion is mostly a vertical motion as in a golf swing or a horizontal motion as in a baseball swing. The intelligence module 28 interprets and determines a swing arc "A" to be a baseball swing and registers a response on the display 12 by manipulating the cursor or presentation 32.

FIG. 10B shows the device 10 including light transmitters 14, 16, 18, 20, the detection array 24 and the game piece or golf club 44. A representation is shown of the transmitted radiation 34 and the reflected radiation 36. The light radiation 34 is transmitted from the transmitters 14, 16, 18, 20. The radiation is transmitted in all directions. Some portion of the transmitted radiation 34 will strike the golf club 44. That portion of the radiation striking the golf club 44 will be reflected, also in all directions. Using the array of transmitters 14, 16, 18, 20 in combination with the detection array 24 allows determination of distance and movement of the golf club 44 within three dimensional space.

In some embodiments, there can be receive optics positioned over the detection array 24. The detection array 24 can be positioned to view an area in front of the detection array 24. A user holding the golf club 44 within the field of view will reflect light radiation from the golf club 44 to the detection array 24. Certain elements in the detection array 24 will correspond to certain positions within the field of view. When the golf club 44 is in a location in the field of view, radiation will be reflected and impinge on the corresponding elements in the detection array 24. In this way, the detection array 24 can operate in a manner analogous to a digital camera. It will be appreciated that the detection array 24 can be configured to identify the golf club 44 when the sensed radiation exceeds a predetermined threshold for each of the elements in the detection array 24.

The intelligence module 28 in the console 44 interprets reflected radiation from the golf club 44 and determines the user motion. The intelligence module 28 is configured to mimic an "intuitive" controller since multiple user activities can be determined. The intelligence module 28 can determine the strength of reflected radiation and detect if the user motion is mostly a vertical motion as in a golf swing or a horizontal motion as in a baseball swing. The intelligence module 28 interprets and determines a swing arc "B" to be a golf swing and registers a response on the display 12 by manipulating the cursor or presentation 32.

FIG. 10C, shows an alternative embodiment including a game piece or tennis racket 46. Again, radiation is transmitted from the transmitters 14, 16, 18, 20, reflected off the tennis racket 46, and received at the detection array 24. The intelligence module 28 in the console 44 determines the user motion along a swing arc 'C' to be a tennis swing and registers a response on the display 12 by manipulating the cursor or presentation 32. FIG. 10D, shows an alternative embodiment including a gun game piece 47. Again, radiation is transmitted from the transmitters 14, 16, 18, 20, reflected off the gun game piece 47, and received at the detection array 24. The intelligence module 28 in the console 44 determines the user motion "tracking" the hunting target 32. In one embodiment, the user jerks the gun 47 to signify a shot. The detection array 24 and intelligence module 28 together recognize this motion as a shot. Based on the aim determined from the detection array 24, the intelligence module 28 determines whether the target 32 was struck. In another embodiment, the gun game piece 47 generates an audible noise when its trigger is pulled to signify a shot. In still another embodiment, the gun game piece 47 includes other means recognized by the intelligence module to indicate a shot. The gun game piece 47 can itself reflect radiation or it can include a retroreflector that reflects radiation. Alternatively, a retroreflector can be attached directly to a user's hand to reflect radiation in accordance with embodiments of the invention.

FIGS. 11A-11C similarly show additional embodiments of the video game device 10 of FIG. 2. FIG. 11A, shows an alternative embodiment including a game piece or boxing gloves 48. Some embodiments can include retroreflectors 25. The intelligence module 28 in the console 44 determines the user motion to be a punch or jab and registers a response on the display 12 by manipulating the cursor or presentation 32. For example, in a kick boxing game either a hand motion or a foot motion could register as a blow to the opponent. FIG. 11B, shows an alternative embodiment including a game piece or bowling ball 50. The intelligence module 28 in the console 44 determines the user motion along the swing arc "D" to be a throw of the bowling ball 50 and registers a response on the display 12 by manipulating the cursor or presentation 32. For example, in a bowling game a motion of the bowling ball 50 could register as a strike or other combination. FIG. 11C, shows an alternative embodiment including a game piece or fishing rod 52. The intelligence module 28 determines the user motion to be a cast of the fishing line and registers a response on the display 12 by manipulating the cursor or presentation 32. In the embodiments of FIGS. 11A-C, radiation is transmitted from the transmitters 14, 16, 18, 20, reflected off the boxing gloves and retroreflectors 25 (FIG. 11A), bowling ball 50 (FIG. 11B), a fishing rod 52 (FIG. 11C), respectively, and received at the receiver 24, and processed as described in the other embodiments above.

Figure 12A:
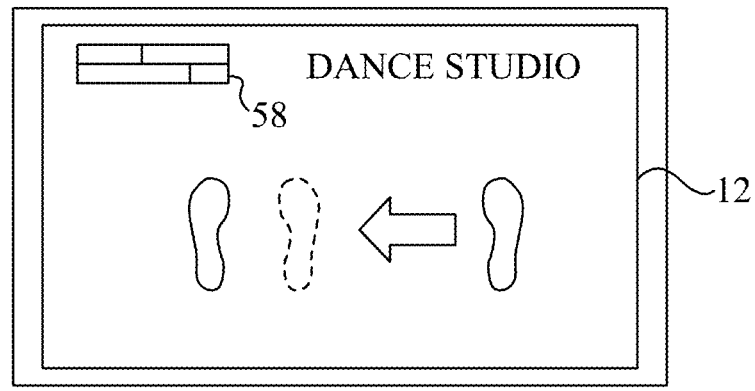
FIG. 12A illustrates playing a video game device according to an embodiment of the present invention.
Figure 12B:
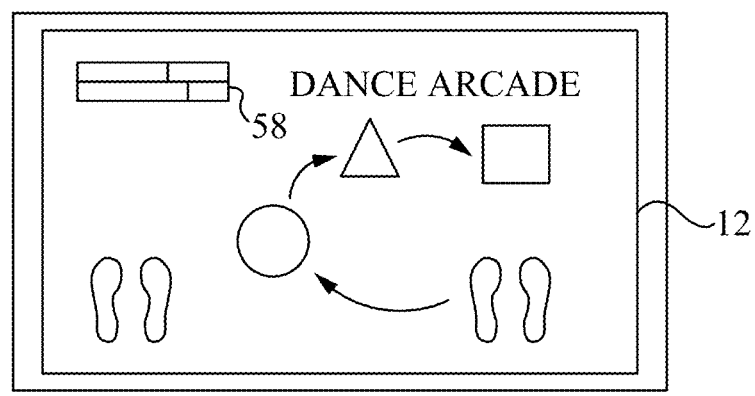
FIG. 12B illustrates playing a video game device according to an alternative embodiment of the present invention.

FIG. 12A shows one embodiment of a method of playing a video game. Referring to FIGS. 1 and 12A, the player 40 simply plugs the console 44 into her TV, attaches the retroreflectors 25 to her feet and literally steps into the game, using her body as the game controller. As the player 40 moves her feet, their movements will be mirrored by their 'virtual footprints' on the screen 12. To play, the player 40 can follow actual footprint icons as they appear on the screen 12 to the beat of the music. The pace and difficulty level of the dance moves can gradually increase and the player 40 will be scored on her accuracy. The player 40 can track her accuracy by observing an accuracy meter 58 on the screen 12. The video game device 10 can include energetic, fast-paced graphics and multiple levels of game play for each song. As the player 40 improves her skills, she can unlock additional levels of game play and new dance venues. In one embodiment, the player 40 can enjoy a game alone. Alternatively, the player 40 can challenge an additional player to face off arcade-style (FIG. 12B). To face off arcade style, the player 40 passes the retroreflectors 25 to the additional player. Alternatively, both players 40 can wear retroreflectors and dance within the field of view of the detection array 24. The video game device 10 will keep track of each player's score.

Figure 12C:
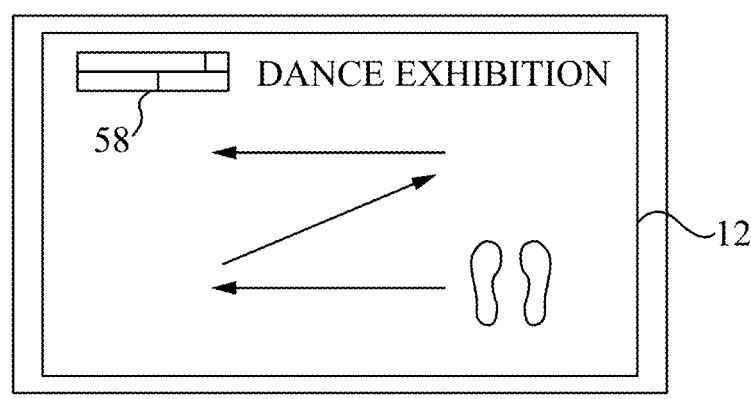
FIG. 12C illustrates playing a video game device according to yet another embodiment of the present invention.
Figure 12D:
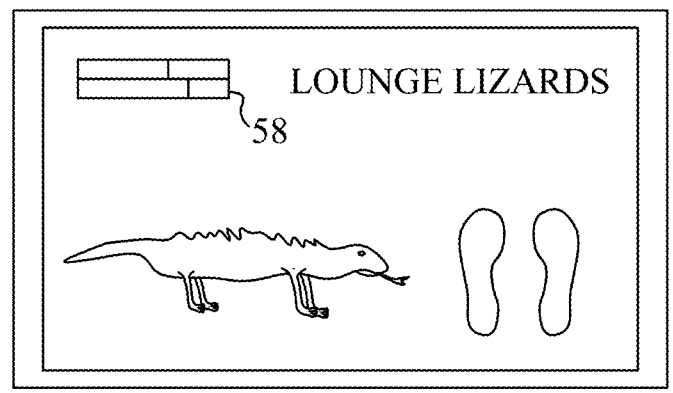
FIG. 12D illustrates playing a video game device according to an embodiment of the present invention.

FIG. 12C shows an alternate embodiment of a method of playing a video game. The player 40 is challenged to follow along in an additional dance venue. The player 40 plugs the console 44 into a TV, attaches the wireless retroreflectors 25 to her feet and literally steps into the game. The player 40 uses her body as the game controller. As the player moves her feet, their movements will be mirrored by the virtual footprints on the screen 12. To play, the player 40 can follow actual footprint icons as they appear on the screen 12 to recall an assortment of unique dance moves. The pace and difficulty level of the footprint icons can gradually increase and the player 40 will be scored on her accuracy. The player 40 can track her accuracy by observing an accuracy meter 58 on the screen 12. The video game device 10 can include energetic, fast-paced graphics and multiple levels of game play for each venue. As the player 40 improves her skills, she can unlock additional levels of game play and new lounge venues. FIG. 12D shows an alternative embodiment of a method of playing a video game, in which the player 40 is challenged to escape from a notorious lounge filled with lizard-type characters. The player 40 plugs the console 44 into a TV, attaches the wireless retroreflectors 25 to her feet and literally steps into the game. The player 40 uses her body as the game controller. As the player moves her feet, their movements will be mirrored by their virtual footprints on the screen 12. To play, the player 40 can follow actual footprint icons as they appear on the screen 12 to the beat of the music and to escape the lizard-type characters. The pace and difficulty level of the footprint icons will gradually increase and the player 40 will be scored on her accuracy. The video game device 10 can include energetic, fast-paced graphics and three levels of game play for each venue. As the player 40 improves her skills, she can unlock additional levels of game play and new lounge venues. In one embodiment, the player 40 can enjoy a game alone. Alternatively, the player 40 can challenge an additional player to face off arcade-style. The video game device 10 will keep track of each player's score.

Figure 12E:
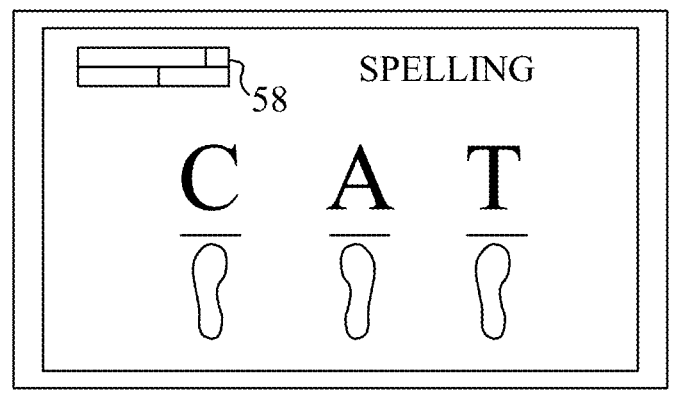
FIG. 12E illustrates playing a video game device according to an alternative embodiment of the present invention.

FIG. 12E shows an alternative embodiment of a method of playing a video game, in which the player 40 is challenged to spell interesting words. The player 40 plugs the console into a TV, attaches the wireless retroreflectors 25 to her feet and literally steps into the game. The player 40 uses her body as the game controller. As the player moves her feet, her movements will be mirrored by the virtual footprints on the screen 12. To play, the player 40 can follow actual footprint icons as they appear on the screen to the beat of the music and to choose the proper letters as they appear on the screen 12. In one embodiment, the letters can scroll across the display 12 until the player 40 chooses the letter with proper placement of the retroreflectors 25. Alternatively, the letters can appear to fly into the scene and continue flying until being selected by the player 40 with proper movement of the retroreflectors 25. The pace and difficulty level of the footprint icons will gradually increase and the player 40 will be scored on her accuracy. The video game device 10 can include energetic, fast-paced graphics and three levels of game play for each venue. As the player 40 improves her skills, she can unlock additional levels of game play and new venues for spelling. In one embodiment, the player 40 can enjoy a game alone. Alternatively, the player 40 can challenge an additional player to face off arcade-style. The video game device 10 will keep track of each player's score.

Figure 12F:
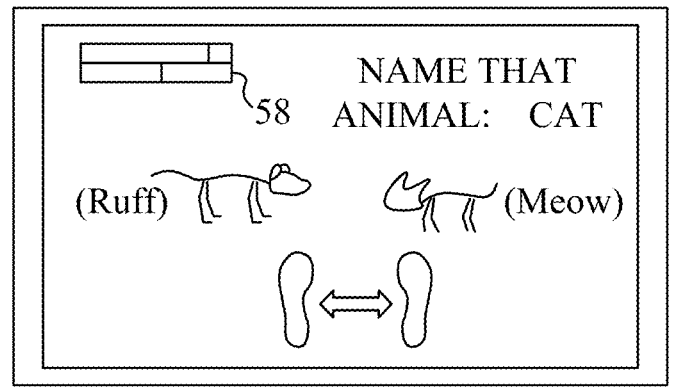
FIG. 12F illustrates playing a video game device according to yet another embodiment of the present invention.

FIG. 12F shows an alternative embodiment of a method of playing a video game, in which the player 40 is challenged to name interesting objects. The player 40 plugs the console into a TV, attaches the wireless retroreflectors 25 to her feet and literally steps into the game. The player 40 uses her body as the game controller. As the player moves her feet, their movements will be mirrored by their virtual footprints on the screen 12. To play, the player 40 can follow actual footprint icons as they appear on the screen 12 to the beat of the music and to choose the proper objects as they appear on the screen 12. In one embodiment, the object can scroll across the display 12 until the player 40 chooses the object with proper placement of the retroreflectors 25.

Alternatively, the objects can appear to fly into the scene and continue flying until being selected by the player 40 with proper movement of the retroreflectors 25. The pace and difficulty level of the footprint icons will gradually increase and the player 40 will be scored on her accuracy. The video game device 10 can include energetic, fast-paced graphics and three levels of game play for each venue. As the player 40 improves her skills, she can unlock additional levels of game play and new venues for spelling. In one embodiment, the player 40 can enjoy a game alone. Alternatively, the player 40 can challenge an additional player to face off arcade-style. The video game device 10 will keep track of each player's score.

Still other embodiments exploit the fact that when flesh is close to an optical receiver (e.g., within one foot or less), the reflective nature of flesh approximates that of a retroreflector. In these embodiments, flesh, such as an exposed hand or foot, can substitute for a retroreflector. This permits a user's hands to be images for gaming and control applications. As one example, players use a computer to compete against one another in the game Rock, Scissors, Paper. The gestures for rock, scissors, and paper are all visually different enough for a computer to robustly recognize their shapes and process them in real time.

Figure 13A:
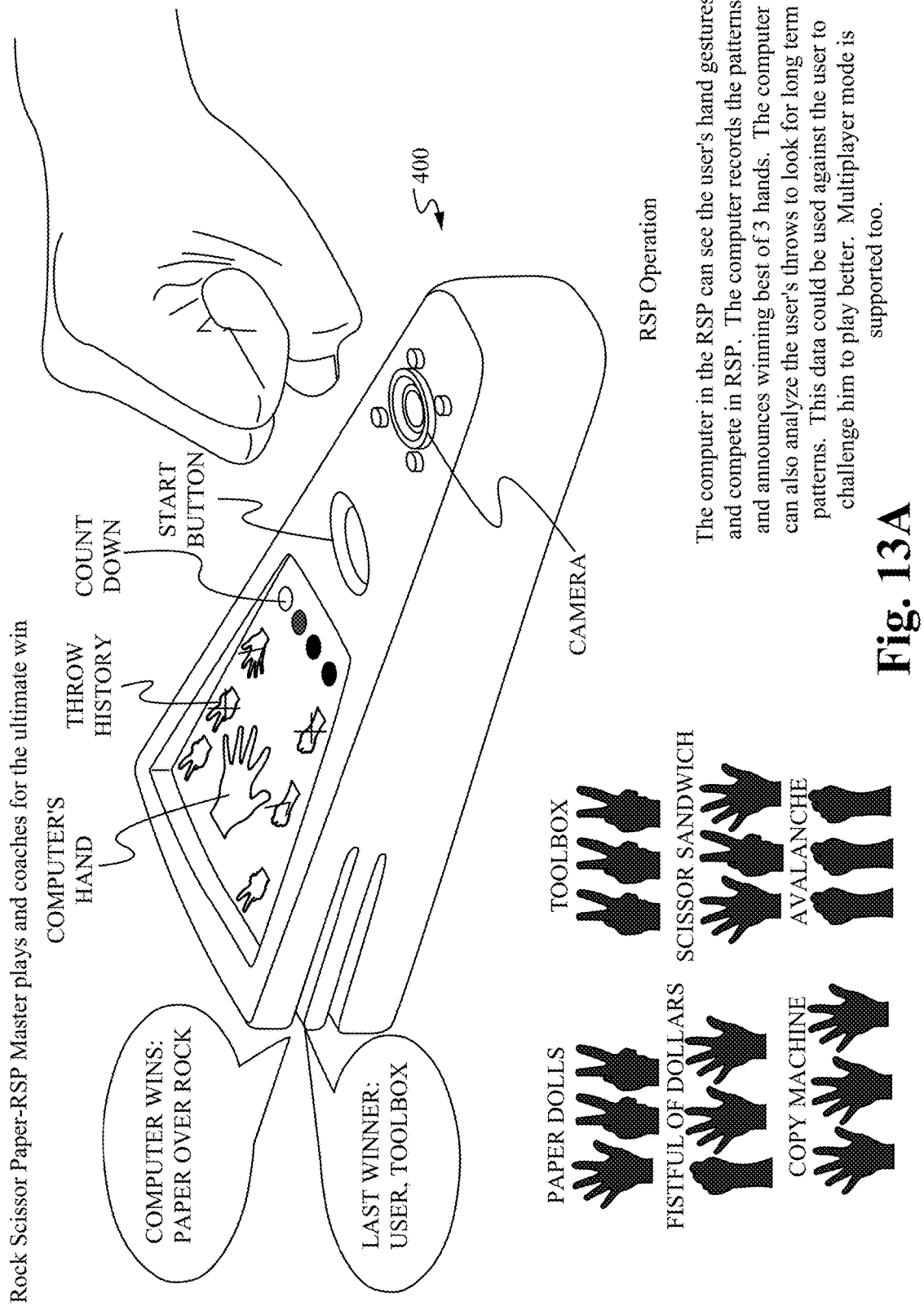
FIG. 13A shows an electronic device for playing "Rock, Paper, Scissors" according to one embodiment of the present invention.
Figure 13B:
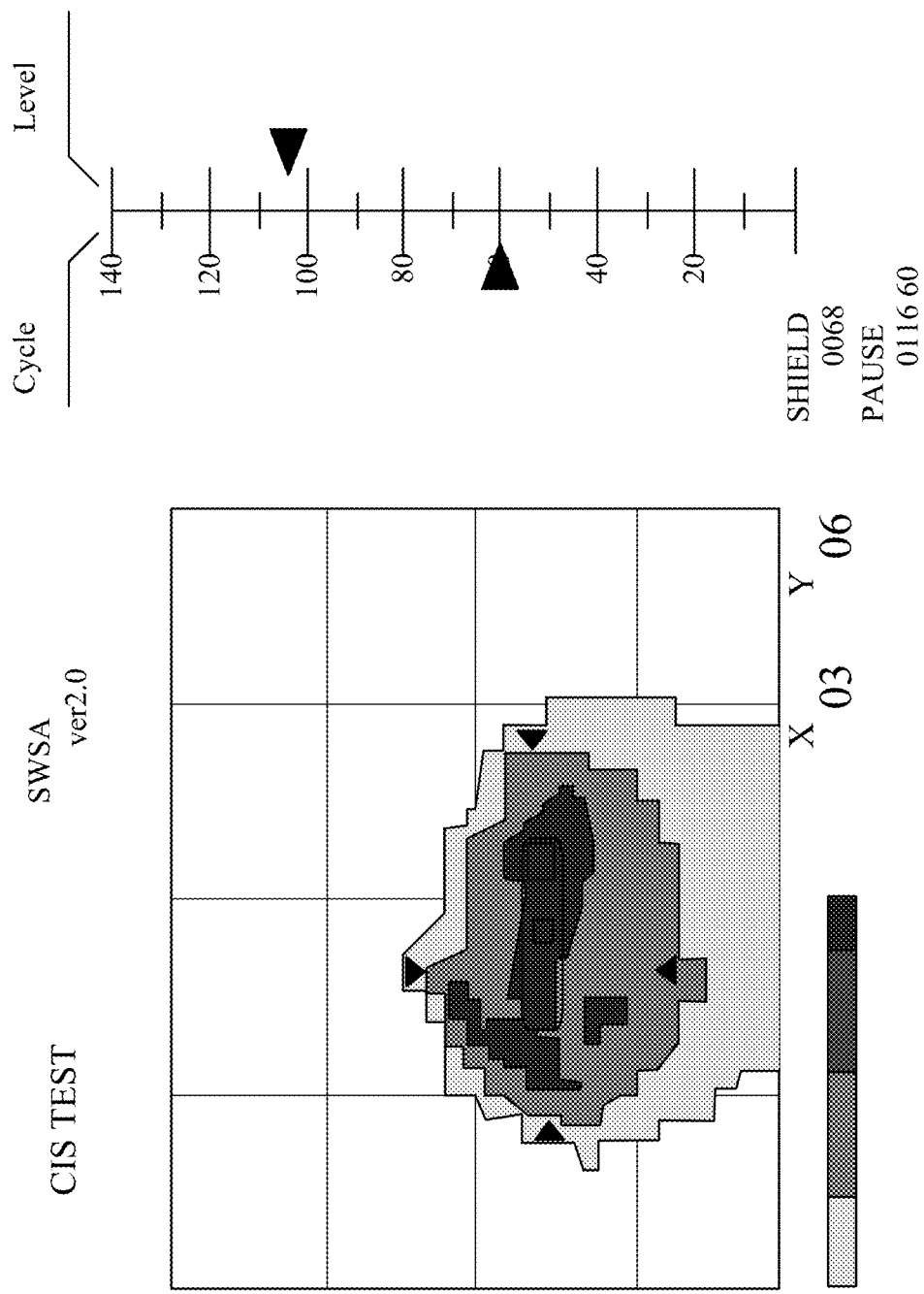
FIGS. 13B-13D show the results of a CIS test and corresponding cycle and level readings for "Rock," "Paper," "Scissors" gestures, respectively, according to embodiments of the present invention.
Figure 13C:
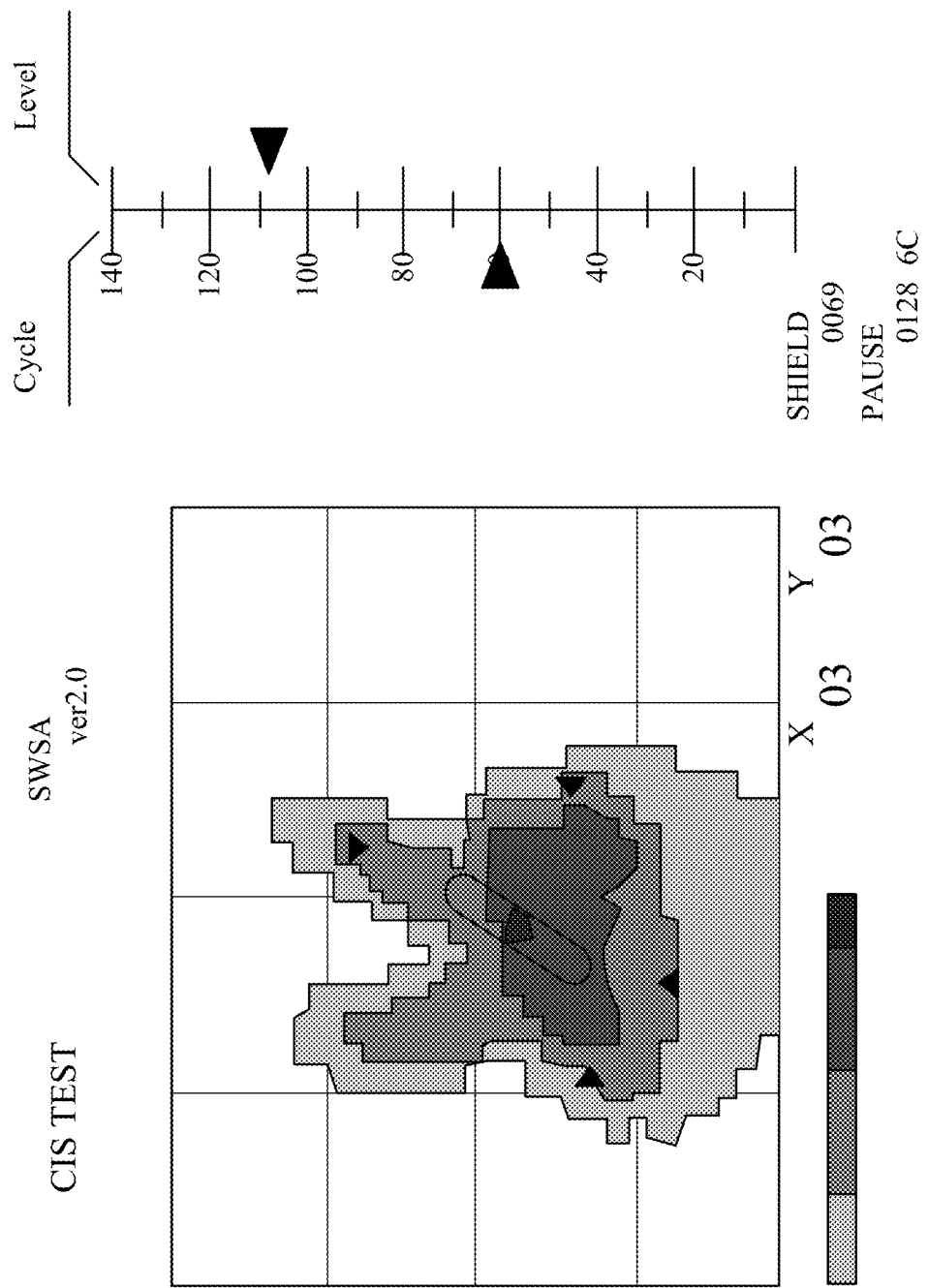
Figure 13D:
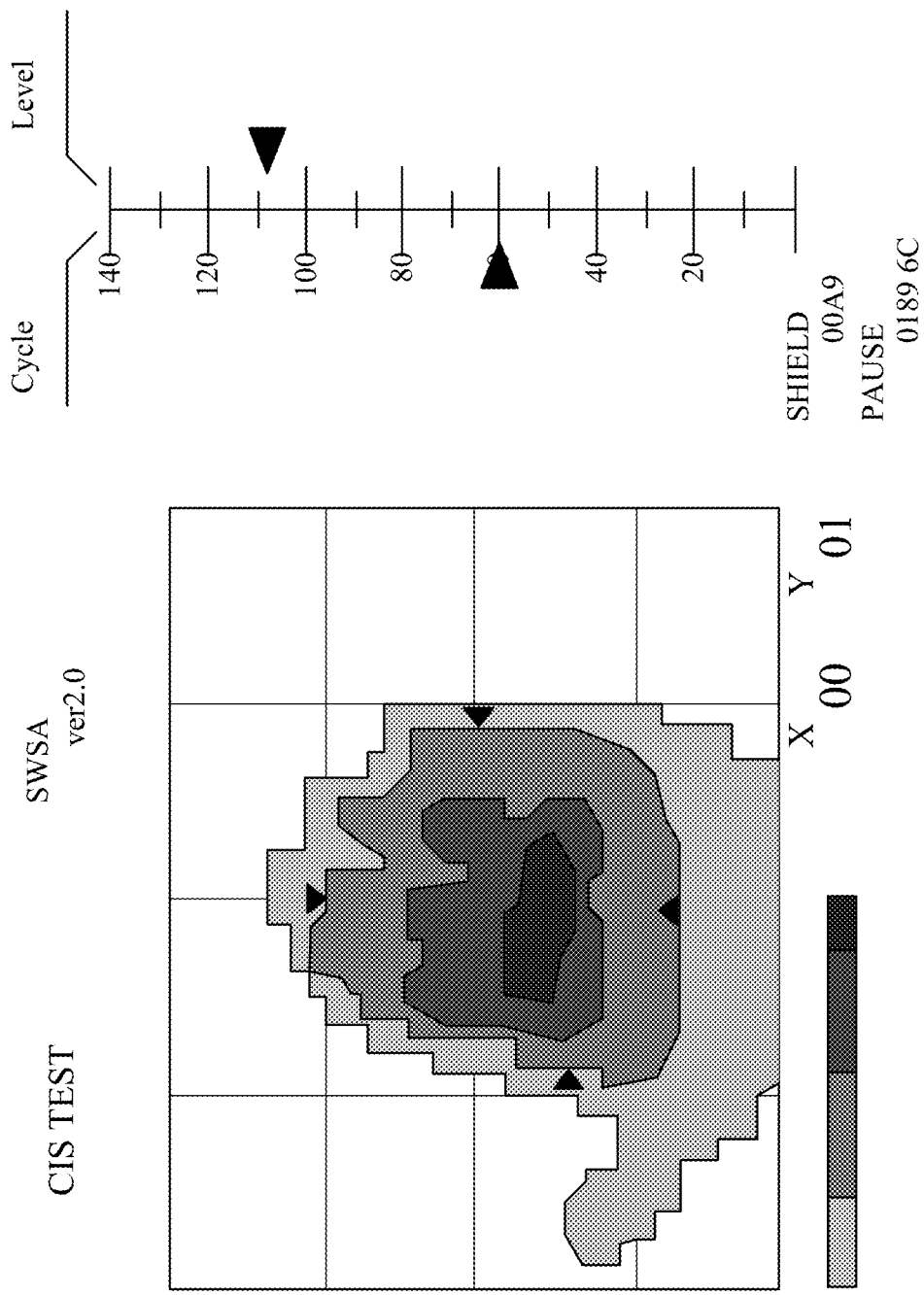

FIG. 13A shows an electronic device 400 for recognizing gestures in accordance with the invention to play an electronic version of "Rock, Scissors, Paper." In this embodiment, the hand is close enough to the receivers (here labeled "camera") to function as a retroreflector. FIG. 13B shows a result of a CIS test for a hand making a "Rock" gesture. FIG. 13B also shows, adjacent to the result, corresponding readings of cycle and level. FIG. 13C shows a result of a CIS test for a hand making a "Paper" gesture. FIG. 13C also shows, adjacent to the result, corresponding readings of cycle and level. FIG. 13D shows a result of a CIS test for a hand making a "Scissor" gesture. FIG. 13D also shows, adjacent to the result, corresponding readings of cycle and level. Together, FIGS. 13B-13D illustrate how the Rock, Paper, Scissors gestures can be distinguished from one another.

Although the electronic device 400 is shown as a handheld device without any optical transmitters, such as an infrared transmitter, it is contemplated that a handheld device can include one or more transmitters to facilitate detection of a user's motion or activity. For example, FIG. 14A shows an electronic device 1400 for identifying elements according to an embodiment of the invention. The device 1400 includes a camera 1405 and is coupled with and controls a transmitter 1410 of a specific frequency(ies) or color(s) that illuminates a field of view of the camera 1405 of the device 1400. The device 1400 can be a mobile device such as a smart phone or a tablet computer. The device 1400 can also be a special purpose apparatus configured solely for operation with the present invention.

The user can simply use her exposed hand to or can wear or hold a retroreflector 1415 that is able to return the emitted or colored signal. Both the user's hand and the retroreflector 1415 have retroreflective properties. The transmitter 1410 periodically blinks for a single video frame. The preceding frame (e.g., position A frame) is subtracted from the blink frame (e.g., position B frame) to leave the resulting image of the illuminated retroreflector 1415. Based on the retroreflector's position and size, its three dimensional position in front of the camera 1410 is determined.

A user can use one or more accessories, such as those shown in FIGS. 8A-11C, during game play. FIGS. 8A-11C show retroreflectors coupled with a hairbrush, a bat, a golf club, a tennis racket, a gun piece, boxing gloves, a bowling ball and a fishing rod. Other accessories include a toothbrush and a power band. As shown in FIG. 14B, a toothbrush 1420 and a power band 1425 can be read via retroreflectors for game play interaction. For example, the mobile device 1400 can be configured to interact with the smart toothbrush 1420 in order to induce a child to brush their teeth. As shown, the tip of the toothbrush 1420 is tracked using retroreflectors, although other areas of the toothbrush 1420 can include one or more retroreflectors. The exemplary tooth brushing application 1430 displays animation of progress, plays music and counts down the time left. For example, retroreflectors could be coupled with the exercise band 1425 to monitor their motion (e.g., to count repetitions and range of an exercising user). As shown, the handles of the exercise band 1425 are tracked using retroreflectors, although other areas of the exercise band 1425 can include one or more retroreflectors. An appropriate video and sound track to keep cadence could accompany the user. Other accessories include, but are not limited, to a shoe, a paddle and a medicine ball.

Figure 15A:
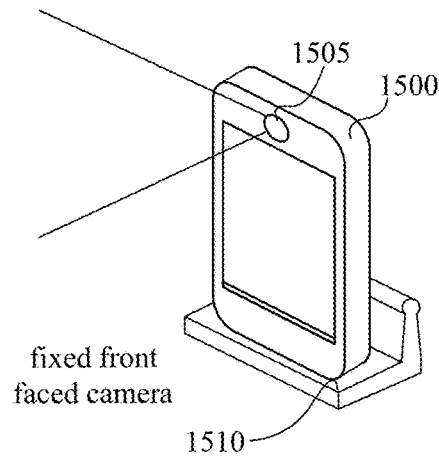
FIGS. 15A-15D show exemplary stands according to an embodiment of the invention.

There are two primary positions that a handheld device, such as a mobile device, can be in during a game play: a horizontal position (FIG. 13A) and a vertical position (FIG. 14). FIG. 15A shows an embodiment of a stand 1510 for positioning a mobile device 1500 in the vertical position according to an embodiment of the invention. The stand 1510 acts as a pedestal and support for the mobile device 1500. The stand 1510 can be integrated with the mobile device 1500 or provided separately. Preferably, the stand 1510 is configured to the specific size and configuration of the mobile device 1500.

Figure 15B:
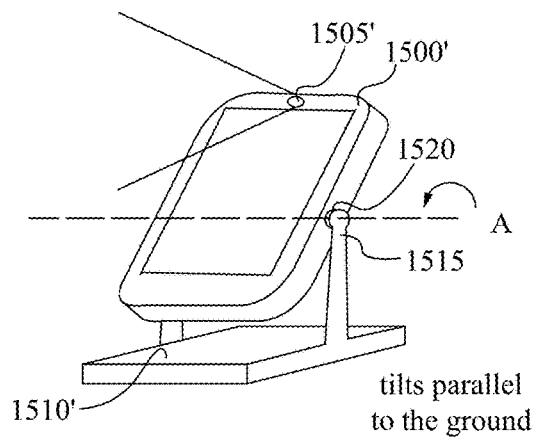

FIG. 15B shows an alternative embodiment of a stand 1510' for tilting a mobile device 1500' according to an embodiment of the invention. To accommodate the variations in handheld devices, the stand 1510' has a pivot mechanism 1515 to tilt a camera 1505' of the mobile device 1500' away from the ground along the axis A and to ease viewing. In some embodiments, the pivot mechanism 1515 allows a complete 360° rotation of the mobile device 1500'. In some embodiments, removable or semi-removable bosses 1520 are provided to mount on either side of the mobile device 1500'. The bosses 1520 fit into the stand 1510' to provide pivot along the axis A. The stand 1510' allows the mobile device 1500' to be in any position ranging from vertical to horizontal and/or from right side up to upside down.

Figure 15C:
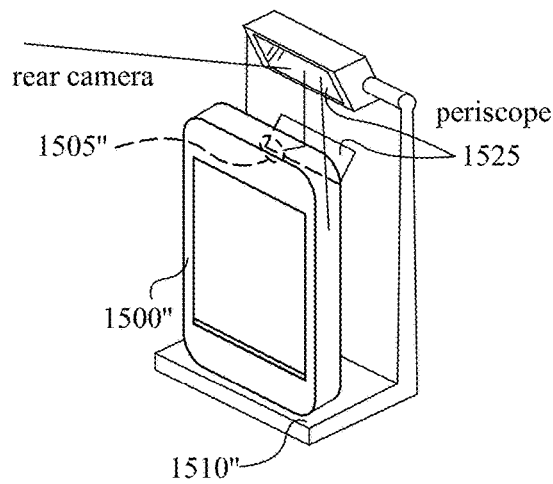

FIG. 15C shows an alternative embodiment of a stand 1510" for facilitating motion capture according to an embodiment of the invention. For a handheld device with a camera located on an opposite side of its display, the periscope stand 1510" can be used. The periscope stand 1510" has two mirrors 1525 that bend an image path of a camera 1505" to the same axis as an image path of the display of the mobile device 1500".

Figure 15D:
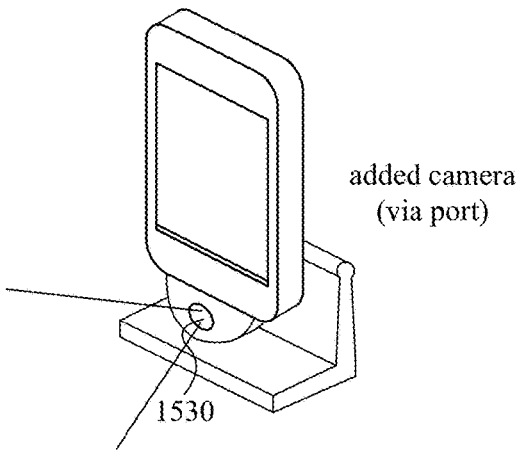

FIG. 15D shows an auxiliary or additional camera 1530 that can be used for or coupled with those handheld devices without a camera according to an embodiment of the invention. It is contemplated that the auxiliary camera 1530 can be used with any one of the stands 1510, 1510', 1510".

Figure 15E:
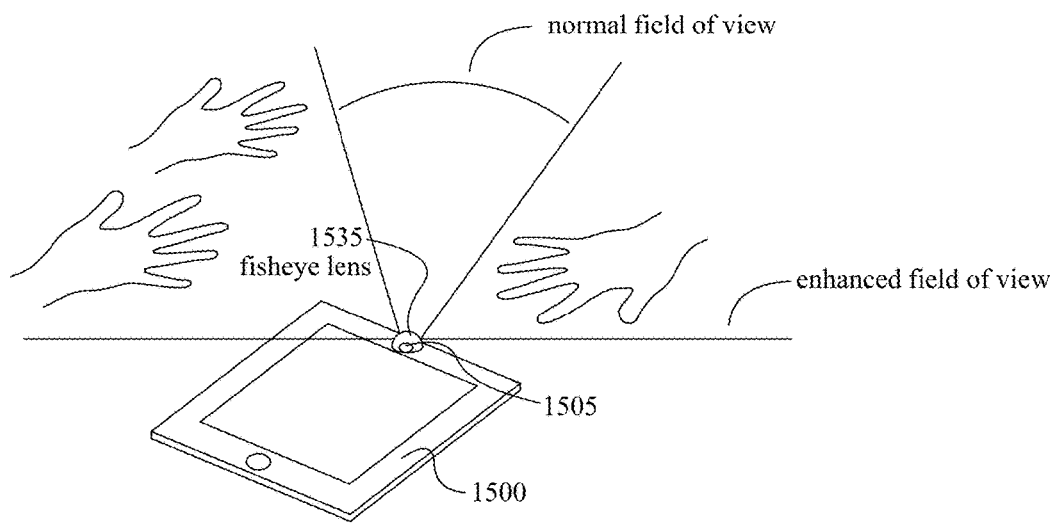
FIGS. 15E-15F show exemplary camera enhancements according to an embodiment of the invention
Figure 15F:
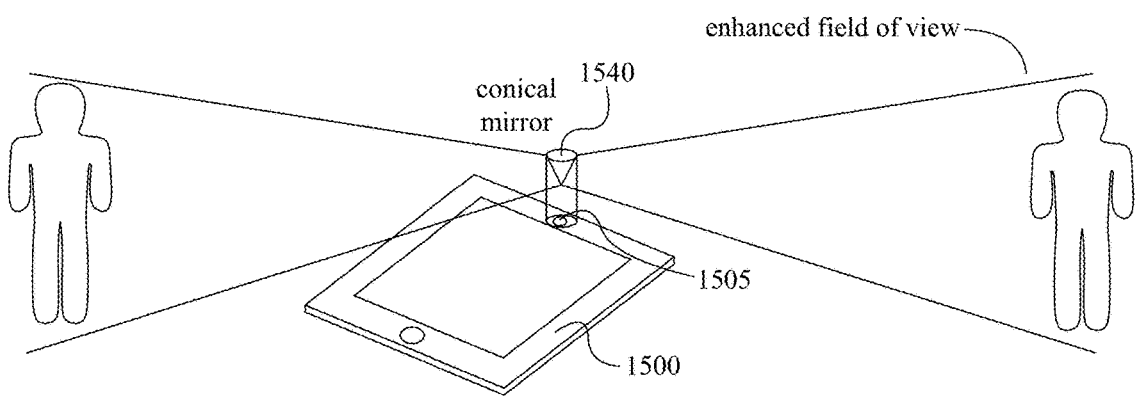

FIGS. 15E-15F each shows an exemplary camera enhancement according to an embodiment of the invention. For example, a fisheye lens 1535 or a conical mirror 1540 can be placed over or above the camera 1505 of the mobile device 1500 to enhance the field of view.

The fisheye lens 1535, which is a wide-angle lens, creates a wide panoramic image such that a tracked object need not be within the normal field of view. In some embodiments, the fisheye lens 1535 allows the camera 1535 to see object(s) within a hemispheric 360° field of view.

The conical mirror 1540 placed at a distance above the camera 1505 changes the field of view and allows the camera 1535 to see object(s) otherwise not within the normal field of view. It is contemplated that instead of using the stand 1510 in a game that allows a mobile device to be in a vertical (e.g., upright) position, the conical mirror 1540 can be used with the mobile device while the handheld device is in a horizontal position to detect a tracked object.

Figure 16:
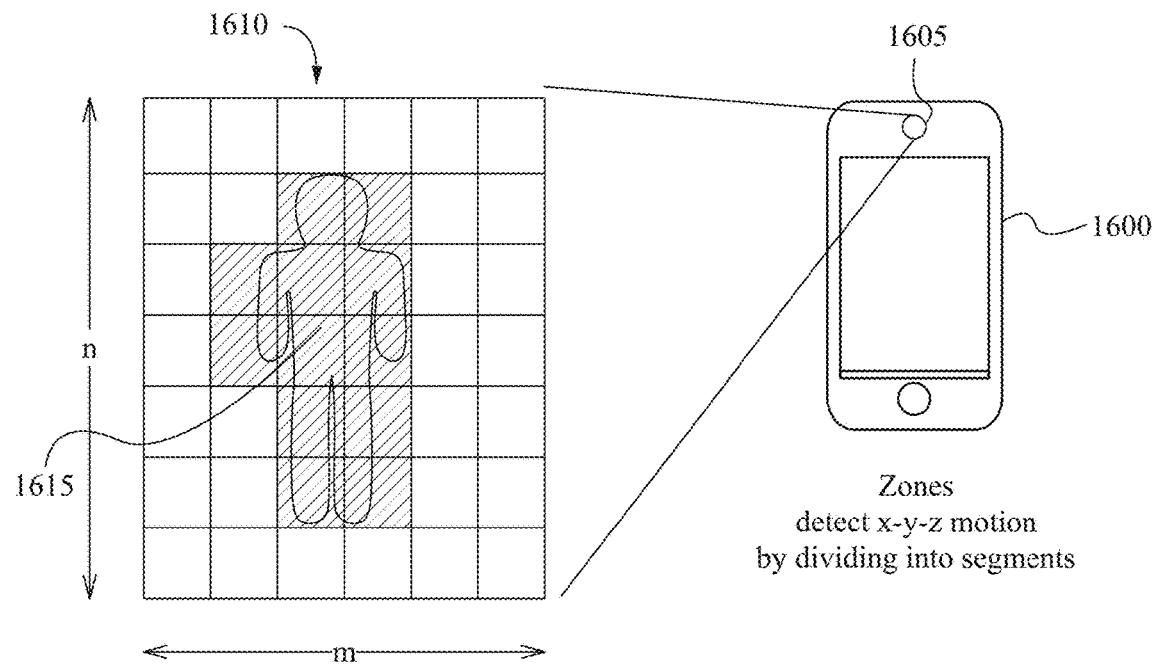
FIG. 16 shows an exemplary use of zones according to an embodiment of the invention.

Object tracking thus far has been described as by using retroreflectors. However, object tracking can also be performed in other ways, including using zones and motion detection. FIG. 16 shows an exemplary use of zones according to an embodiment of the invention. Zone is a method whereby a still or video image can be a single motion zone or subdivided motion zones. These zones can be arranged in either a one or two dimensional matrix array covering some or all of a video area 1610, comprising 1×N or M×N zones. Each region of the array is able to trigger a response to a detection of an object displayed in that region. The video area 1610 can be captured by a camera 1605 of a mobile device 1600. A region can be trigger by, for example, first being empty (nothing in the image or video for that particular zone) to being filled with an object, such as FIG. 1615. For example, the three dimensional motion of the FIG. 1615 is captured when the shaded zones corresponding to the location of the FIG. 1615 change.

Figure 17A:
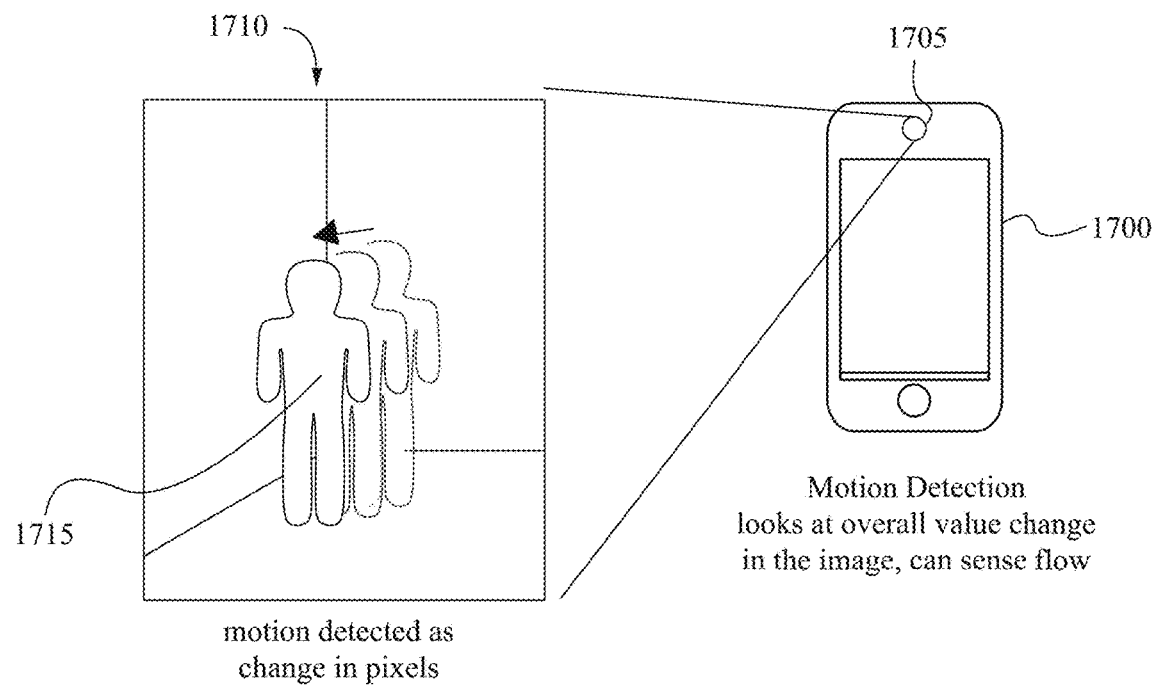
FIG. 17A shows an exemplary of motion detection according to an embodiment of the invention.

A more precise method is motion detection. Motion detection is a method that looks at a summation of all pixel values in a range and checks for sum changes over a timed interval. This technique can be used play games like Red Light Green Light (described below). FIG. 17A shows an exemplary of motion detection according to an embodiment of the invention. A processor on board a mobile device 1700 is able to discern changes in a field of view 1710 as seen by a camera 1705 coupled to provide image data to the processor. Generally, a majority of the background pixels will remain static. As such, the background will not change and will not cause false triggers of motion. Advantageously, the motion detection method can track actual movements of an object, such as FIG. 1715, as it sweeps across the field of view 1710 and predict future motion more easily, such as anticipated direction of the FIG. 1715.

Figure 17B:
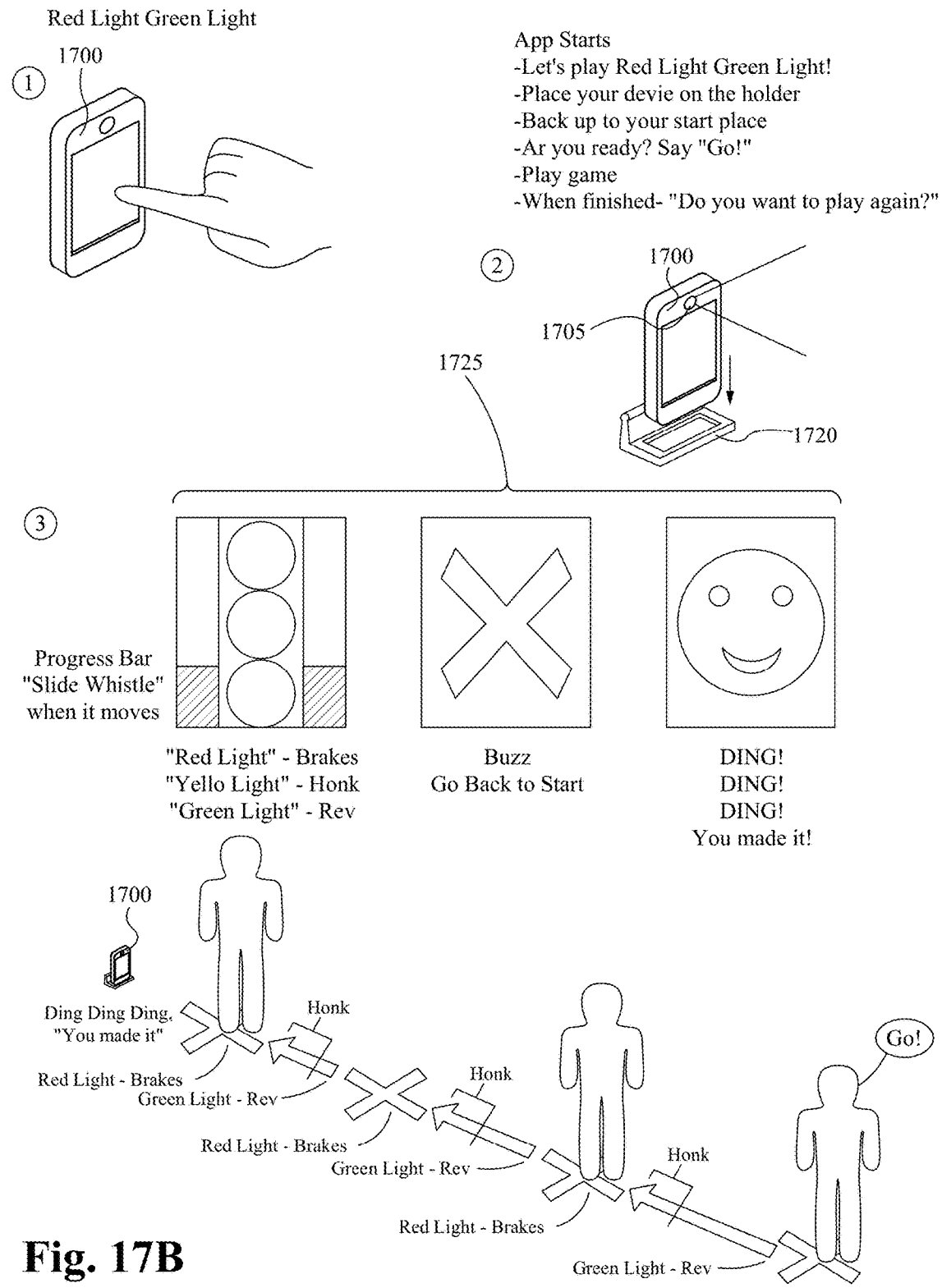
FIGS. 17B-17C show exemplary game plays of Red Light Green Light according to an embodiment of the invention.
Figure 17C:
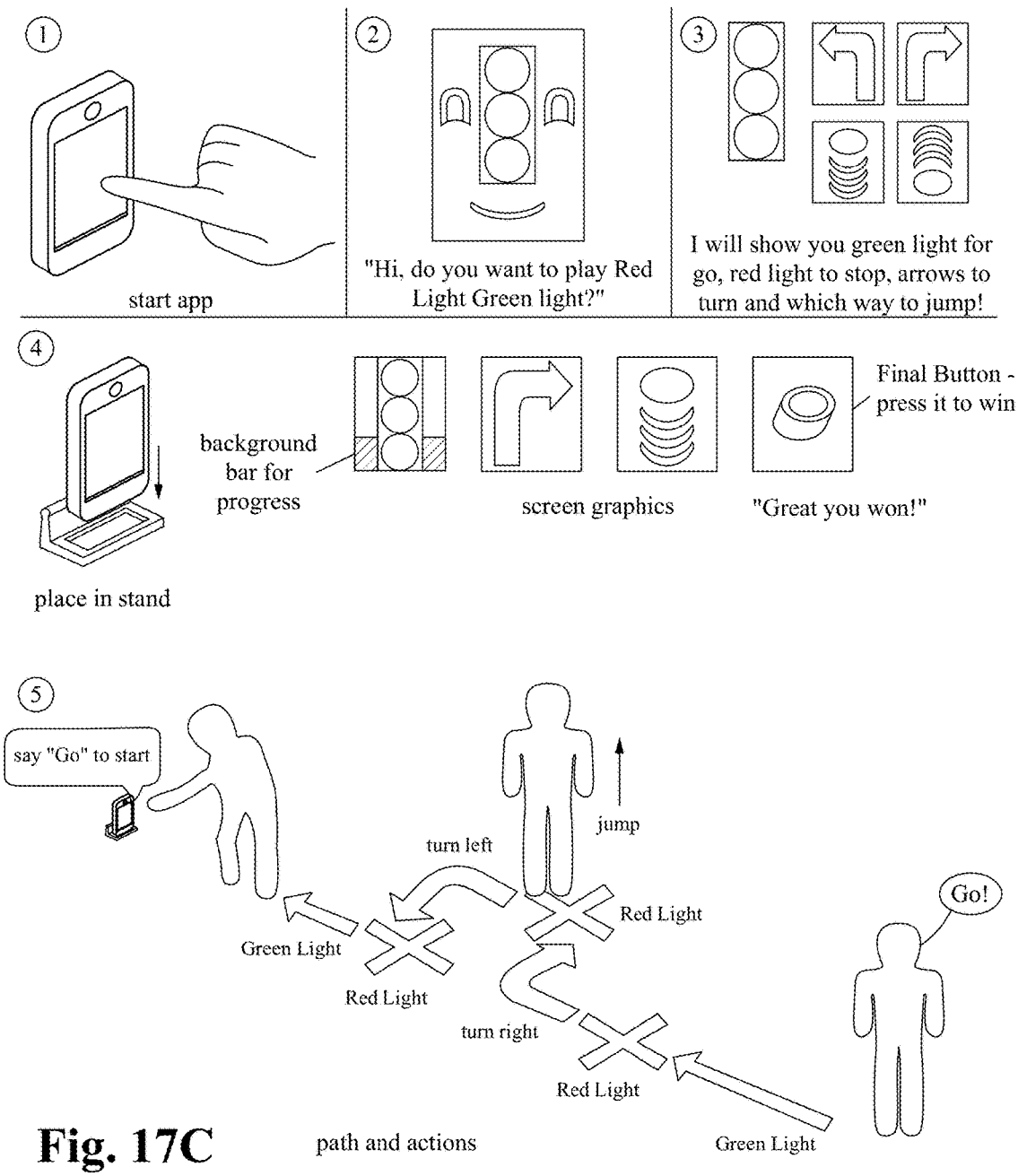

FIG. 17B shows an exemplary game play of Red Light Green Light and a method of use of a mobile device and stand/pedestal for games involving motion capture. The Red Light Green Light game requires a mobile device 1700, which acts as the head of the game, to be in the vertical position to capture movements of a user 1715. The mobile device 1700 can be mounted in a stand or pedestal 1720, such as any of those described in FIGS. 15A-15D. The game commands the user 1715 to move by saying green light and to stop by saying red light. In some embodiments, the game also projects appropriate commands on a screen 1725. During a red light, the mobile device 1700 allows little to no motion. If there is sufficient motion detected, the mobile device 1700 asks the user 1715 to return to a start position. The game can be further enhanced by adding other motions such as left and right and up and down, as shown in an exemplary story board illustrated in FIG. 17C. These added physical motions are key developmental milestones for young children that help in physical activity and mind and body cognition. In addition, motion voice commands can be added to further enhance the game play. For example, the mobile device 1700 can ask the user if they are ready to play since the user may be 10 or 12 feet away; voice command is thus a desirable way to start the game. In this example, the Red Light Green Light game allows a handheld device to be in a vertical (e.g., upright) position, while other games can allow a handheld device to be in a horizontal (e.g., laying flat) position. A handheld device can lie on a table or other such surface, or the swivel stand shown in FIG. 15B can be used to horizontally position the handheld device above a surface. If a handheld device lacks the appropriate camera, the periscope or the axillary camera shown in FIGS. 15C-15D can be used.

In table top games, as illustrated in FIG. 18, a camera 1805 of a mobile device 1800 in a ceiling staring position (e.g., looking up towards a user 1815) sees the user's hands 1820 and represents them as a moving game element(s) or icon(s). For example, in a boxing game, an image of a pair of boxing gloves is controlled by the left and right hands 1820 would be visible on the screen 1810 of the device 1800. In the boxing game, the opponent could be synthetic or a real distant player linked via WiFi or cellular service. The user's body position could be derived from centroid between the hands 1820 or by voice command. Furthermore, voice commands could be simultaneously transmitted to enhance game play.

Other exemplary games include a catch game, ping pong game, or RSP (Rock Scissors Paper) game. The user's hand motion determines the position of a paddle or catching/throwing/playing hand. In some embodiments, the mobile device does not recognize the reflections, but it determines game play using zones or motion detection or simply looking at the area of user's hand. For example, in a RSP game, the hand in the smallest form is associated with a rock being played; the hand in a middle-sized form is associated with scissors being played; and, the hand in the largest form is associated with paper being played.

Another form of passive tracking besides the above discussed infrared based tracking, is color based tracking. While infrared is suitable in any lighting condition, color is not suitable in low lit environments, in varying light conditions, or in a situation where the color is similar with background colors. Nonetheless, embodiments of the present invention allow an object to be tracked based on color or colors.

Figure 19A:
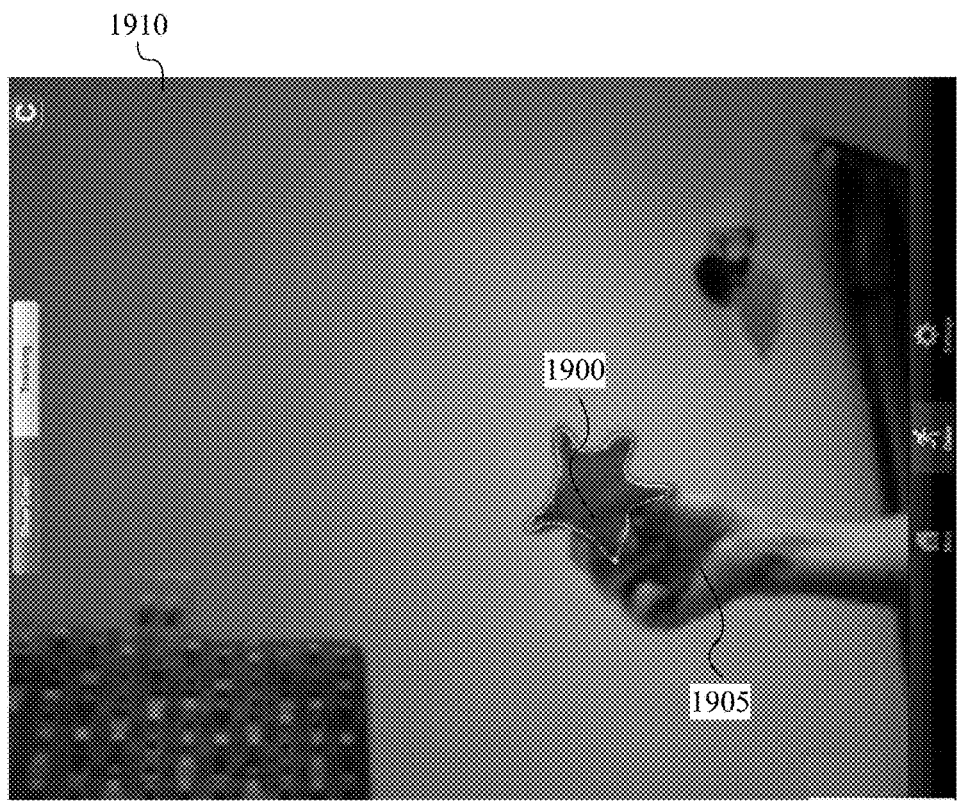
FIGS. 19A-19B show an exemplary method of identifying elements according to an embodiment of the invention.
Figure 19B:
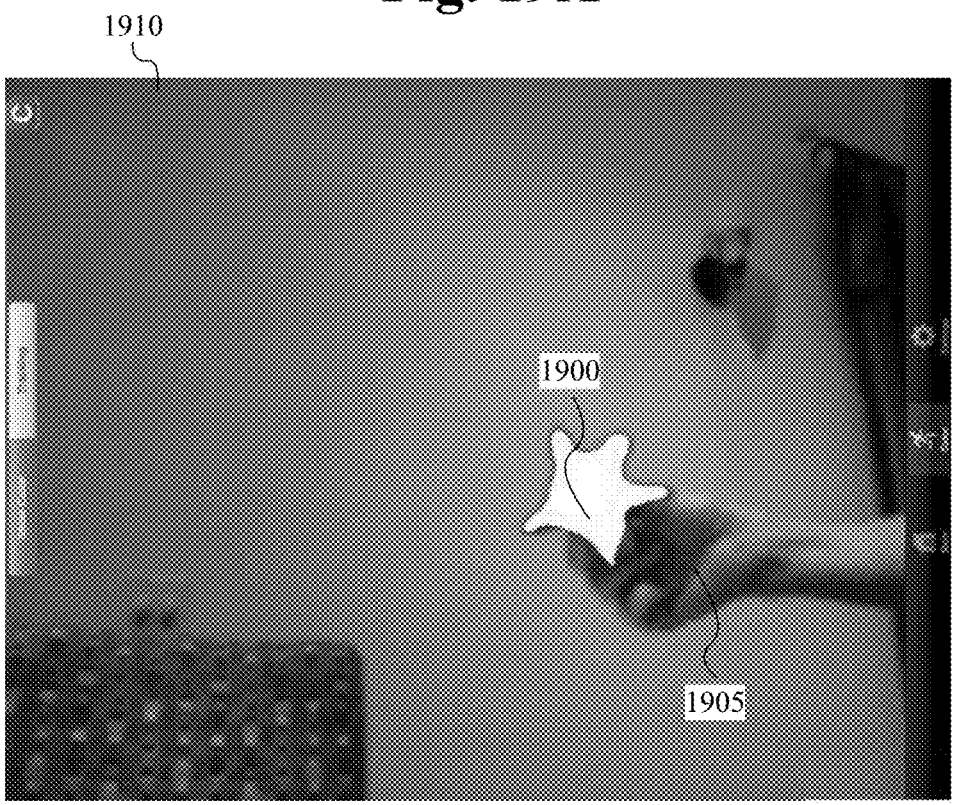

Assume the color pink is to be tracked. FIG. 19A shows a pink star 1900 in a field of view of a camera. The pink star 1900 held by a user's hand 1905. In some embodiments, the user is able to touch the pink star 1900 in the image displayed on the screen 1910 to indicate that the color pink is to be recognized and to thereby track the pink star 1900. The color pink is recognized and the detected star 1900 in the field of view, illustrated in FIG. 19B, is outlined or otherwise indicated to show that the pink star 1900 has been "locked." The pink star 1900 is tracked no matter where the user moves the pink star 1900 to within the field of view of the camera. It is contemplated that color(s) can also be automatically detected for object detection and/or further game play. Automatic color detection is discussed below.

The portion of an object having a particular color or a group of colors is typically "locked" upon detection of those colors. If the entire object possesses the color or the group of colors, then the entire object, such as the pink star 1900, is "locked." The colors can be clustered or separate. Typically, the object is locked as long as lighting conditions under which the object is detected do not change dramatically during the period that the object is being tracked. The lighting conditions can include mixed light spectrums. Once the object is locked, the location of the object is determined. The user is thereafter able to control elements of an application based on the location of the object. For example, when the Tiffany® store's signature blue color is detected, the user can be provided with a discount or a coupon on the next purchase.

Sometimes the constancy of lighting conditions is out of the user's control. For example, if an object is being tracked outside, natural lighting inevitably changes based on, such as, time of day, the position of the clouds, color of surrounding objects, or adjacent structures such as building or trees. Even if an object is being tracked inside, the lighting may change, for example, when the shades in the room are drawn or when the object moves from one room having flourescent lighting to another room having incandescent or LED lighting. Once the illumination on the object changes, the object can become "unlocked" or lost. To "lock" onto the object again, the user will need to return to old (previous) lighting conditions or re-calibrate under new (current) lighting conditions.

Figure 20:
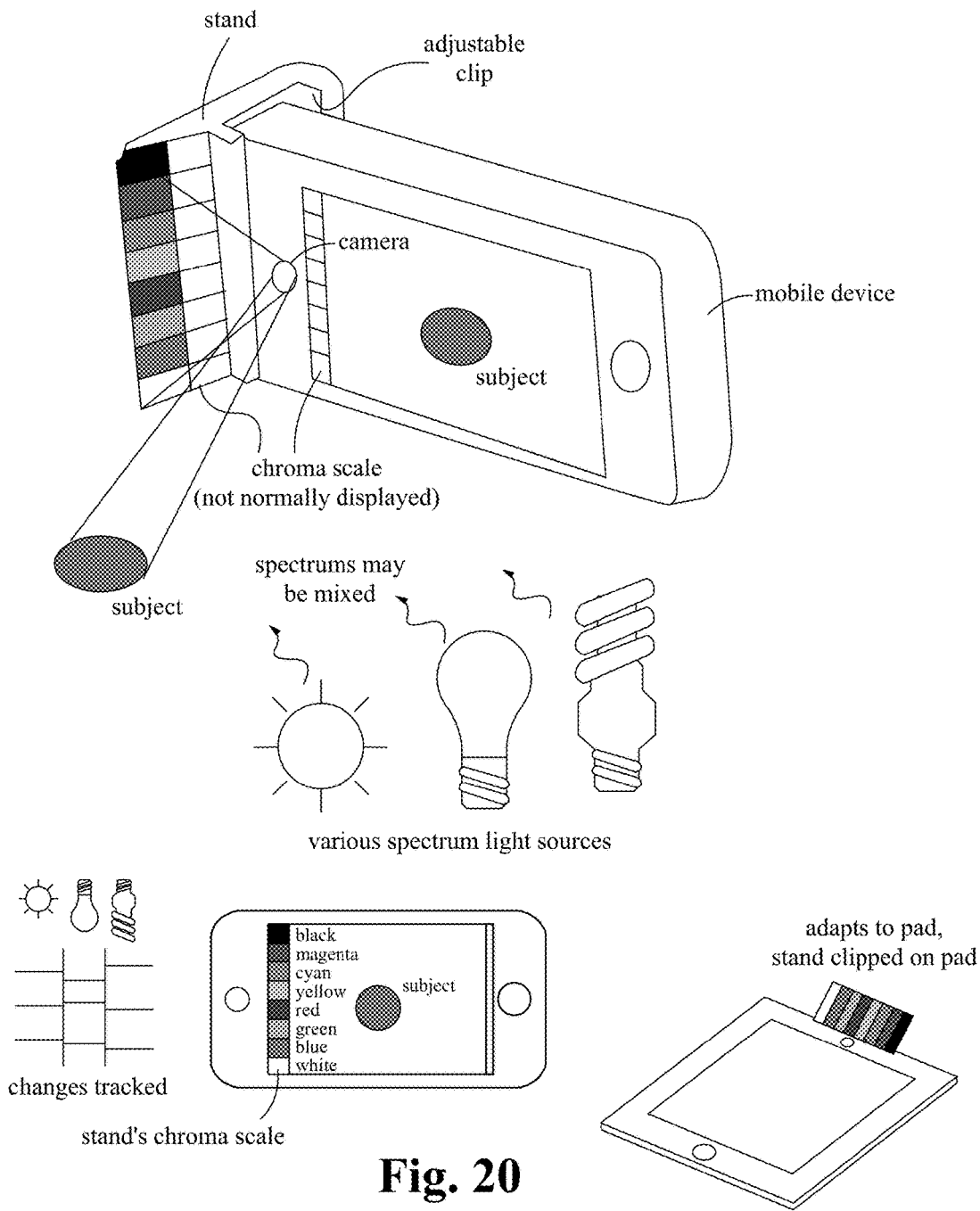
FIG. 20 shows an exemplary chroma scale strip according to an embodiment of the invention.

A chroma scale is a strip of one or more predetermined colors that can be placed in a field of view of an image capturing device, such as a camera of a mobile device. The image capturing device capturing an image of the strip is typically the same image capturing device capturing an image of an object to be tracked. However, the image capturing devices can be separate devices as long as the image capturing device capturing the image of the strip is subject to the same lighting conditions in which the image capturing device capturing the object is in, or responsive to changes in these lighting conditions. FIG. 20 shows an exemplary chroma scale strip according to an embodiment of the invention.

The strip can include colors black, magenta, cyan, yellow, red, green, blue and white, although the strip can include only a subset of these colors such as cyan, magenta, yellow and black. The strip allows for auto-calibration since illumination is always on known references (e.g., colors on the strip) regardless of the current or changes in lighting conditions. The plurality of colors can be in a row or in a matrix or randomly dispersed on the strip.

This strip is typically large enough so that the image capturing device is able to see all the colors on the strip but not necessarily the entire strip. Typically, the strip takes up a small percentage of the landscape within an image. In some embodiments, the strip displayed on the screen is visually masked so that it is not seen by the user. Thus, the strip is in the field of view of the camera but not in the displayed image The strip is typically in a fixed location relative to the lens of the image capturing device, on a tracked object, or incorporated into a logo or product decoration. This allows continuous calibration to changing conditions. For example, the strip is adhered to a protector case for the image capturing device such that the strip is in the field of view of the image capturing device. For another example, the strip is adhered to a stand (e.g., FIGS. 15A-15D) for the image capturing device such that the strip is in the field of view of the image capturing device. For yet another example, the strip is adhered to a clip coupled with the image capturing device such that the strip is in the field of view of the image capturing device. For yet another example, the strip is adhered around the lens of the image capturing device. For yet another example, the strip is adhered to a toothbrush or to an exercising band. It is contemplated that the strip can also be used in photography and videography to calibrate colors.

Figure 21:
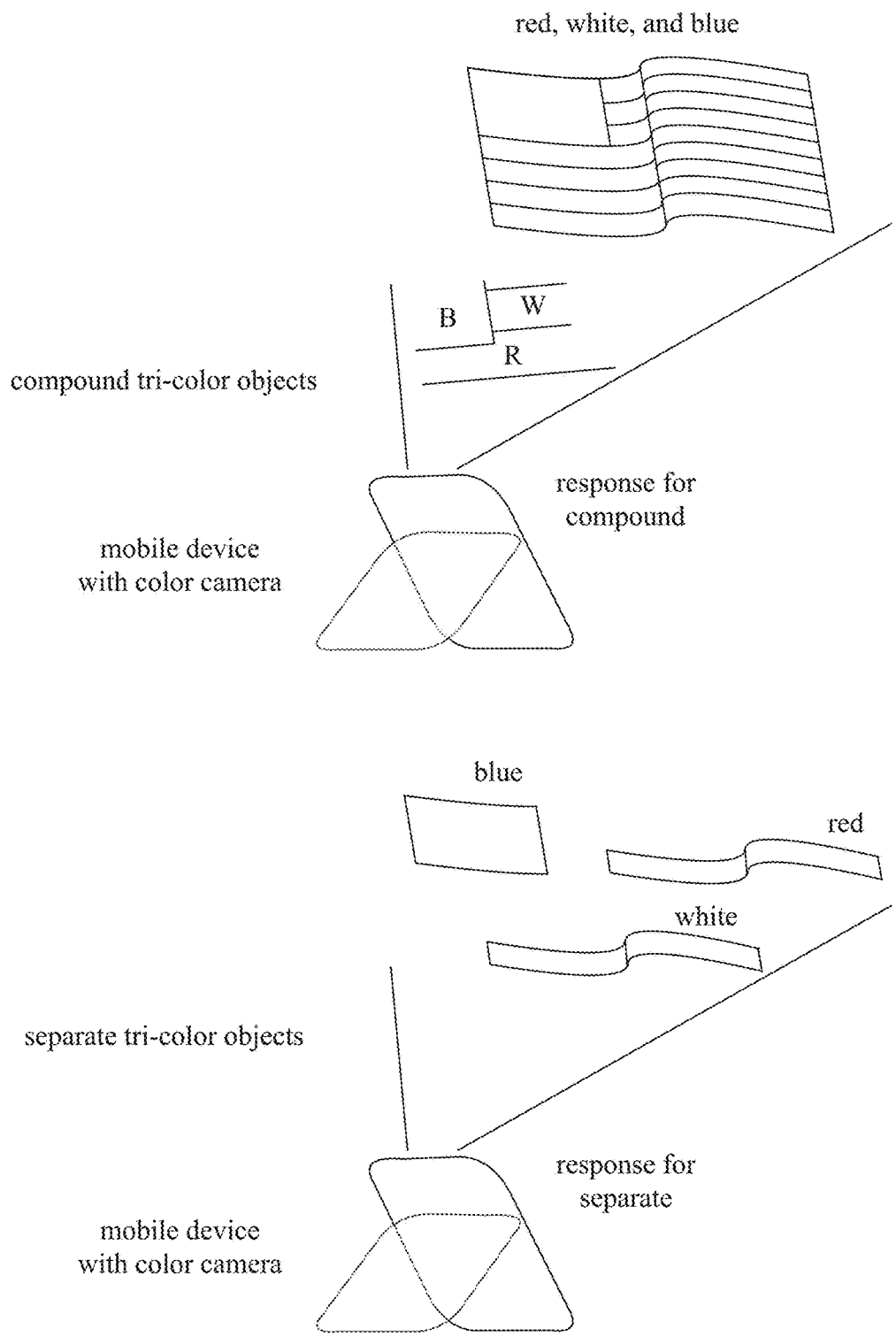
FIG. 21 shows exemplary game plays using color recognition according to an embodiment of the invention.

FIG. 21 shows exemplary game plays using color recognition according to an embodiment of the invention. Multiple colors can be automatically recognized to trigger one or more events in an application. The colors can be detected together or individually. For example, when the colors red, white and blue are detected together at once within a field of view of a camera of a mobile device, a user is directed to (e.g., auto-navigation to) a political campaign site or a government site. Similarly, when a first of the three colors is detected, a first portion of an American flag is colored; when a second of the three colors is detected, a second portion of the American flag is colored; when a third/last of the three colors is detected, a third portion of the American flag is colored. Upon coloring the entire American flag, the national anthem is played for the user.

For another example, when the colors teal, black, orange and white are automatically detected within a field of view, a user is provided with the San Jose Sharks season schedule.

For yet another example, when Regnart Elementary School's colors are automatically detected within a field of view, a user is awarded for embracing school spirit.

Figure 22A:
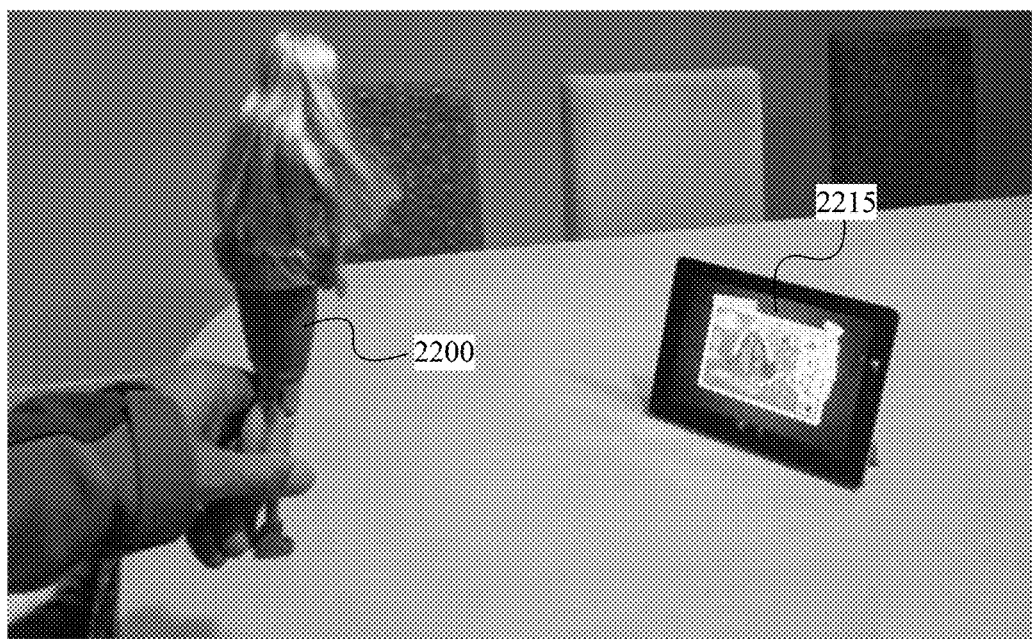
FIGS. 22A-22B show another exemplary interactive game using a doll according to an embodiment of the invention.
Figure 22B:

For yet another example, when a doll's signature color is detected within a field of view, the user is able to play a game, perhaps remotely with other users or purchase doll accessories. FIGS. 22A-22B show another exemplary interactive game using a doll 2200 according to an embodiment of the invention. Once the doll 2200 is detected based on the doll's signature color, the user is able to move a cursor, which is represented by fairy doll 2205, on the display of the mobile device 2215, for example, by moving the doll 2200. By parking the cursor on selectable icons 2210, the user is able to direct one or more interactions during game play. It is contemplated that the interactive game is able to recognize more than one object to manipulate the same or different elements in the game. For example, if the user can only find a wand, one of many of the doll's accessories, but can not find the doll 2200, the user is able to use the wand to direct one or more interactions during game play.

FIG. 23 shows exemplary interactive game using other common colored toys or objects according to an embodiment of the invention. A display of a handheld device shows a circle representing a face. A user is able to use colored playdough (or other objects such as colored blocks) to create a shape, such as a "U." Once the object is detected within at least an area of the field of view (and thereafter shown on the display as user feedback), the user is able to manipulate the object's shape and/or move the object with respect to the circle. The game recognizes the object as a smile and adds other facial features, such as eyes, to the circle, and further interacts with the user.

Figure 24A:
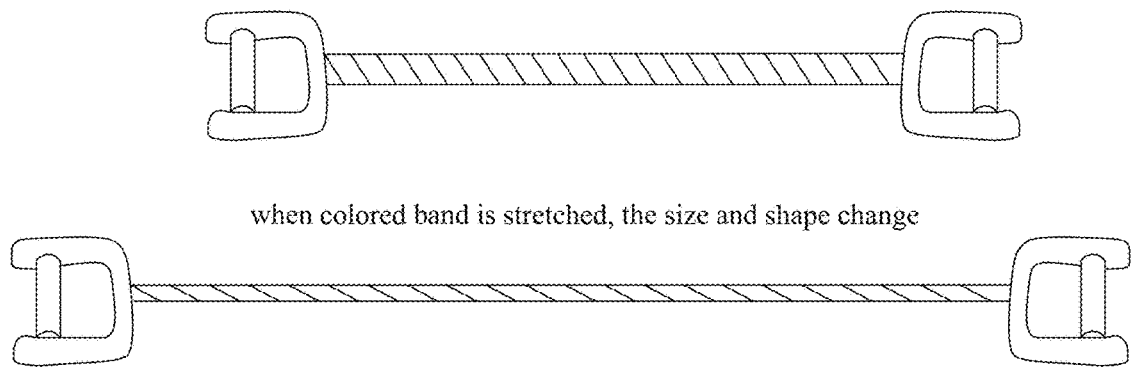
FIG. 24A shows exemplary a colored band according to an embodiment of the invention.

Other interactive applications are contemplated, including exercising games and learning games. An example of an exercising game is a strength training program that requires the use of exercising bands. Instead of retroreflectors coupling therewith, such as that in FIG. 14B, an exercising band is colored. Each unique color represents or is associated with a predetermined resistance. The strength training program teaches the user different exercises using the different colored bands, calculates characteristics of a movement by the user, and/or determines changes in size/shape of a band for training purposes or for further game play interaction. FIG. 24A shows exemplary a colored band according to an embodiment of the invention. In FIG. 24A, an elastic portion of the exercising band is colored and is therefore trackable. When the colored elastic portion is stretched, the colored elastic portion becomes thinner and longer. The strength training program is able to detect these changes in characteristics and is able to use this information for further training.

Figure 24B:
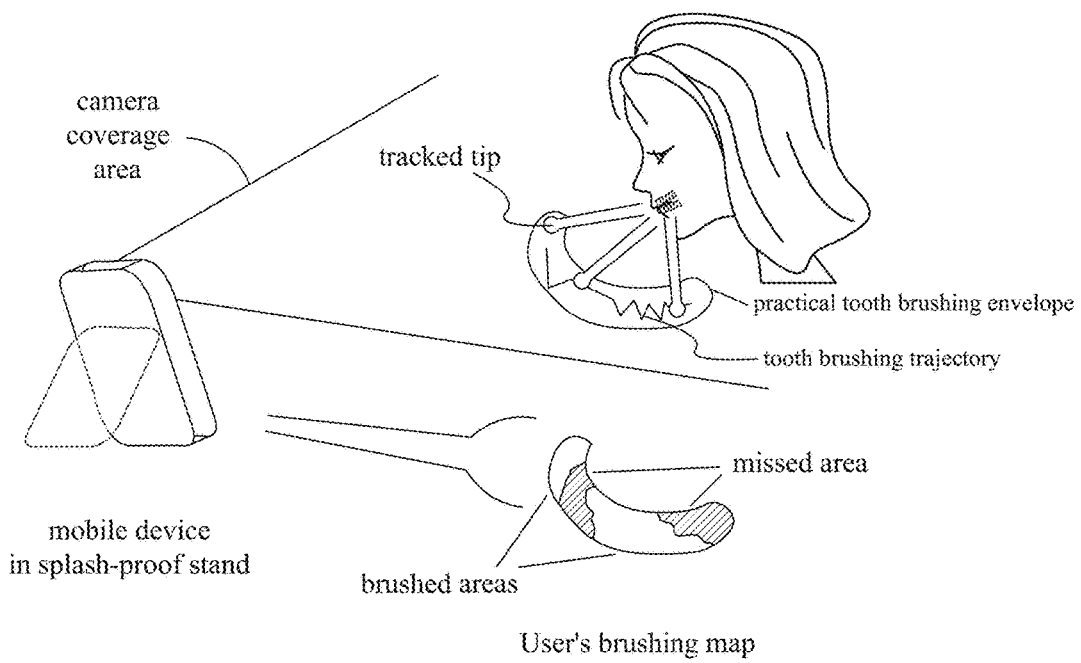
FIG. 24B shows an exemplary interactive toothbrush and how its colored brush tip can be tracked according to an embodiment of the invention.

An example of a learning game is a teeth brushing game. Instead of retroreflectors coupling therewith, such as that in FIG. 14B, each side of the tip of the toothbrush stem is colored with predetermined colors indicating the different sides of the toothbrush. The teeth brushing game is able to detect and track the toothbrush and indicate to a user whether the user is brushing thoroughly. FIG. 24B shows an exemplary interactive toothbrush and how its colored brush tip can be tracked according to an embodiment of the invention. The brushing user and the toothbrush are in a field of view of a mobile device. The teeth brushing game tracks the tip of the toothbrush and is able to determine any unbrushed areas. Due to the natural limitations of the geometry of the human mouth and actions of the user's arm, the trajectory of the moving colored tip falls within an envelope that describes the motion and completeness of brushing. Based on the completion of this map, the user is advised and rewarded for good hygiene. A brushing map and/or meter can be shown to indicate the areas thoroughly brushed, areas lightly brushed and areas unbrushed, and/or a percentage of the teeth that have been cleaned.

Figure 25:
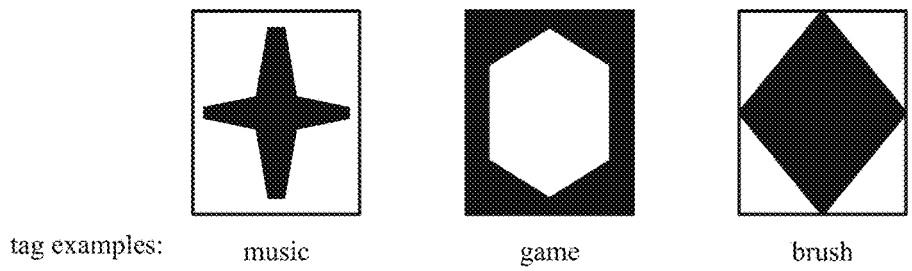
FIG. 25 show exemplary tags according to an embodiment of the invention.

In addition to the above tracking methods, an object can also be tracked using a tag or tags, including detectable color zones, bar codes, quick response (QR) codes, radio frequency identification (RFID) tags and augmented or assisted reality (AR) markers. One or more tags can be coupled or integral with an object being tracked. Each tag is unique and includes an image, a pattern or a combination thereof. The exemplary tags shown in FIG. 25 are AR markers, each associated with a different application. A user is able to switch out a tag for another tag to invoke a different application.

When a tag is recognized in a field of view of a camera, a specific event thereafter is triggered. In some embodiments, the event is a virtual reality aspect of an application. The virtual reality aspect of the application can be a live view of the physical real-world environment whose elements are/can be augmented or can be a view of a virtual environment (e.g., a game) whose elements are/can be augmented.

Typically, once a tag is recognized, it is "locked." Once the tag is locked, the location of the tag is determined and tracked. The angle, orientation and/or location of the tag can be detected. The user is thereafter able to control elements of an application based on the angle, orientation and/or location of the tag. In some embodiments, an application is able to lock onto more than one tag on the same object or different objects.

Figure 26A:
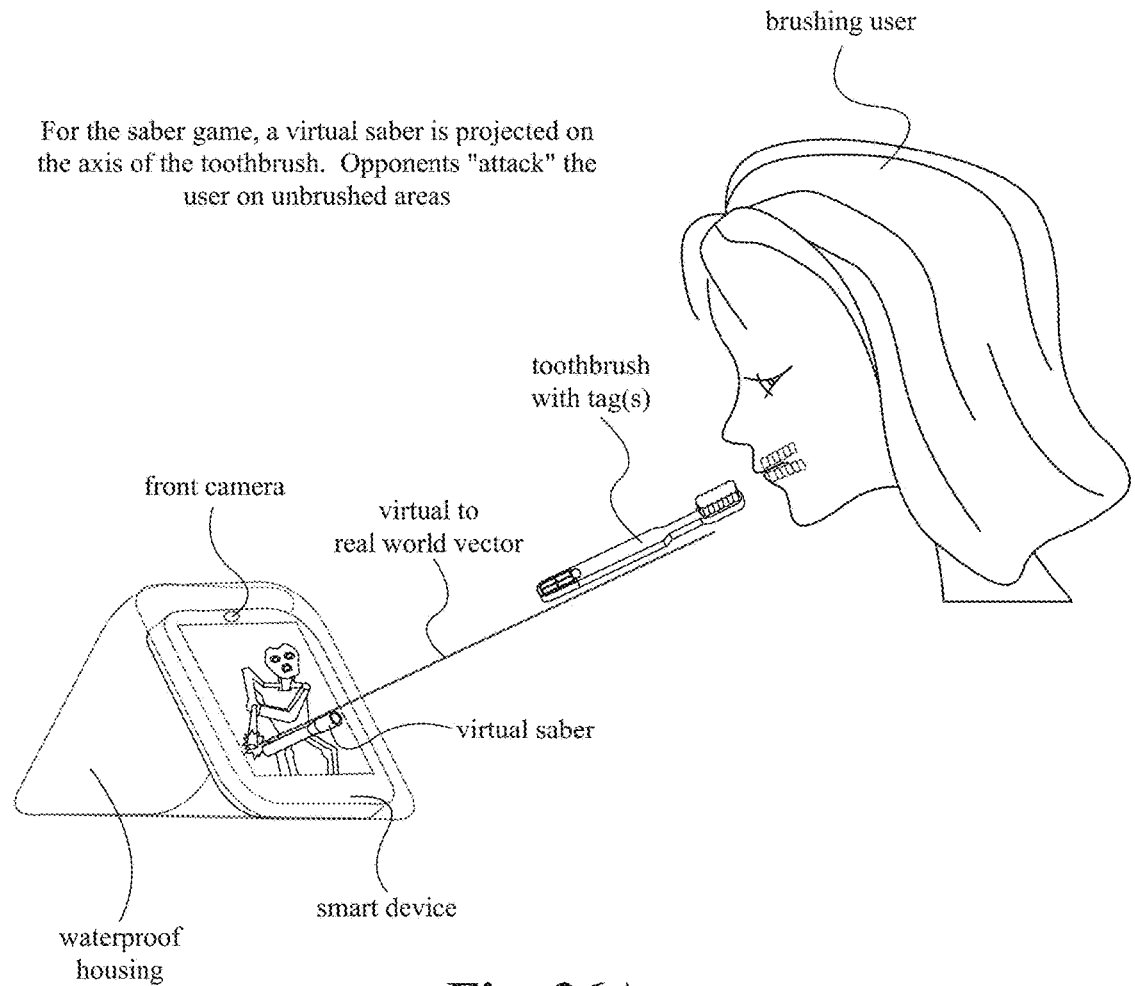
FIGS. 26A-26B show an exemplary tooth brushing application according to an embodiment of the invention.
Figure 26B:
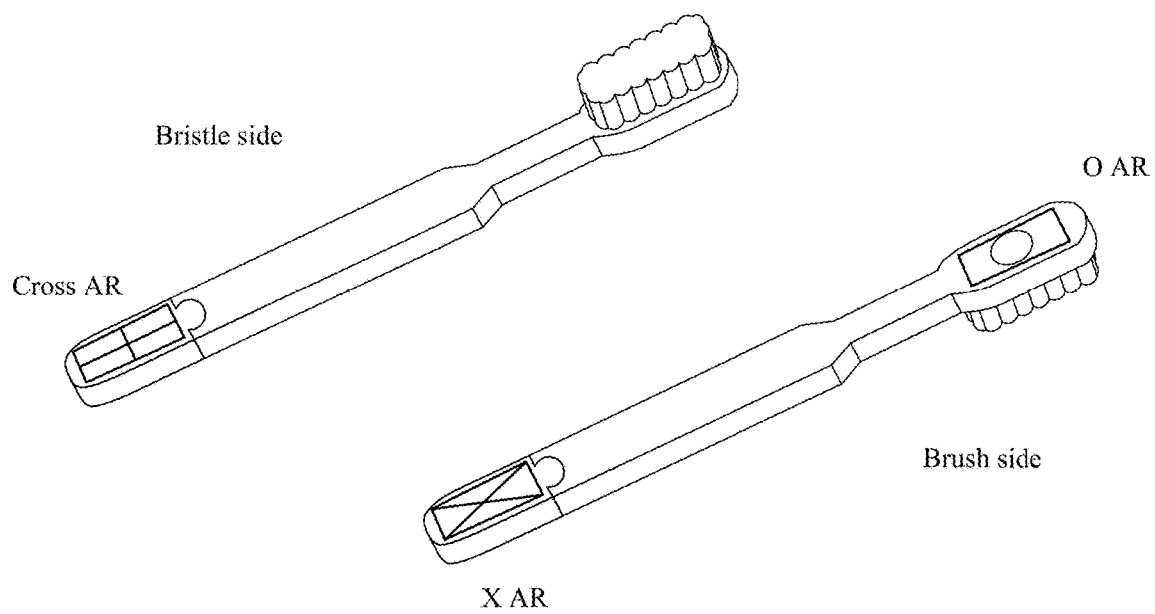

FIG. 26A shows an exemplary tooth brushing application according to an embodiment of the invention. The tooth brushing application uses at least one tag, each associated with a 180° hemisphere. In some embodiments, two tags are placed back to back at the tip of a toothbrush to cover 360°, as illustrated in FIG. 26B. For example, the backbone side includes an "X" design indicating the backbone side, while the brush side includes a "+" design indicating the brush side. The motion (e.g., angle, orientation) and/or location of these tags are captured by a camera and tracked by the application to ensure that a brushing user has brushed all surfaces of their teeth. Likewise, a tag "O" at the brush end of the toothbrush can be used. When the "O" tag is detected by the camera, it is determined that the toothbrush is outside the user's mouth. When the "O" tag disappears, such as upon entering the user's mouth for use, that change is detected.

In some embodiments, the brushing actions are used to monitor the progress of brushing and drive the action of a game or play music. In FIG. 26A, the brushing user is playing a saber dueling game. The application recognizes the tags captured by the camera. A virtual saber is projected on the axis of the toothbrush. The saber game directs the brushing user to brush all surfaces of their teeth by fighting an evil empire robot. In particular, the evil empire robot "attacks" the brushing user on unbrushed areas of the teeth.

In some embodiments, to prevent cheating or to make sure that the brushing user is indeed brushing, the tooth brushing application is also able to detect and recognize the brushing user's facial features/expressions to determine whether the facial patterns "match" a particular motion and/or location of the toothbrush. If the application fails to detect any facial pattern or fails to match the facial patterns with the current motion and/or location of the toothbrush, then the brushing user has not defended him/herself from the evil empire robot. In some embodiments, the facial patterns need to match the current motion and/or location of the toothbrush in order to effectively defend him/herself from the evil empire robot.

In some embodiments, tags can be integrally formed with or clipped to or otherwise coupled with a toothbrush. In some embodiments, tags are sized to fit on or within receptacles of the toothbrush without them being hindrances during brushing. In some embodiments, tags are water proof. In some embodiments, tags are removable such that the brushing user can remove a first set of tag(s) from the toothbrush and place on another set of tag(s) to change the nature of the brushing activity, such as to play music or to see how well the brushing user brushes.

Returning to FIG. 25, three different tags are shown: a first for music, a second for game, and a third for brush. Other types of tags are contemplated. For example, the tags can be seasonally themed. Each tag is associated with an application. For example, the music tag triggers an application that plays music as the user brushes, as illustrated in FIG. 27A. For yet another example, the game tag triggers an application that draws different facial features of a character until brushing is completed, as illustrated in FIG. 27B.

It is contemplated that some tooth brushing applications allow a user, such as a child, to share her progress with others, such as a grandparent or a healthcare specialist, who belongs to the same social network as the child. The progress can also be shared using any of a plurality of communication methods, including video chatting, instant messaging and emailing. The progress can shared in real time and/or be saved and shared at a later time. For example, the healthcare specialist is able to monitor the child's brushing activities and to provide feedback during the next dental visit.

It is also contemplated that some tooth brushing applications reward a user for brushing teeth. For example, a child is able to accrue points or tokens every time the child brushes thoroughly or completes a brushing game. The number of points or tokens awarded can vary depending on the amount of time the child spends brushing or the game level completed. For another example, the child is able to compete for points or tokens with another brusher. Depending on who had the better oral hygiene, that person would get all the points or tokens for the day, week or a predetermined time period. The points or tokens can thereafter be used as an online payment of goods and/or services from an online marketplace, or donated to a good cause.

Figure 28A:
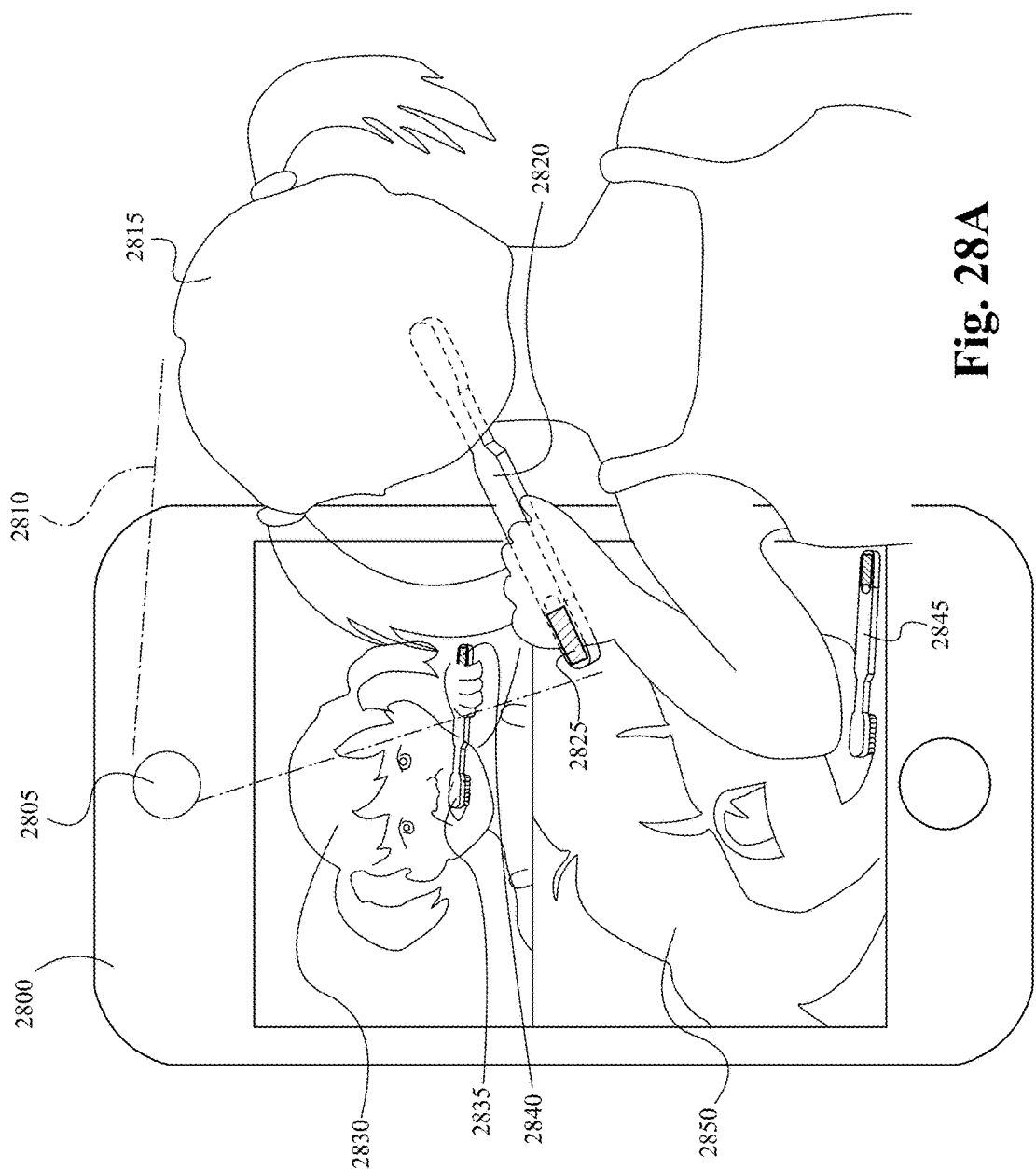
FIGS. 28A-28D show an exemplary tooth brushing system in use according to an embodiment of the invention

FIGS. 28A-28D show an exemplary tooth brushing system in use according to an embodiment of the invention. In FIG. 28A, a user 2815 is brushing her teeth with a toothbrush. The toothbrush includes a brush body 2820 and a brush end 2825. A target, in the form of a retroreflector, a tag, color or a combination thereof, can be coupled or integral with the brush body 2820 and/or the brush end 2825 such that the brush body 2820 and/or the brush end 2825 can be tracked. The brush body 2820 has a different target from that of the brush end 2825.

A camera 2805 of a mobile device 2800 captures the user 2815 in the camera's field of view 2810. The user image 2830 is displayed and analyzed in real time by a tooth brushing application executing on the mobile device 2800. Image information extracted from the brush body image 2835 and the brush end image 2840 are used by the tooth brushing application to then drive entertainment and encouragement in the form of an animated toothbrush image 2845 and an animated figure image 2850.

Figure 28B:
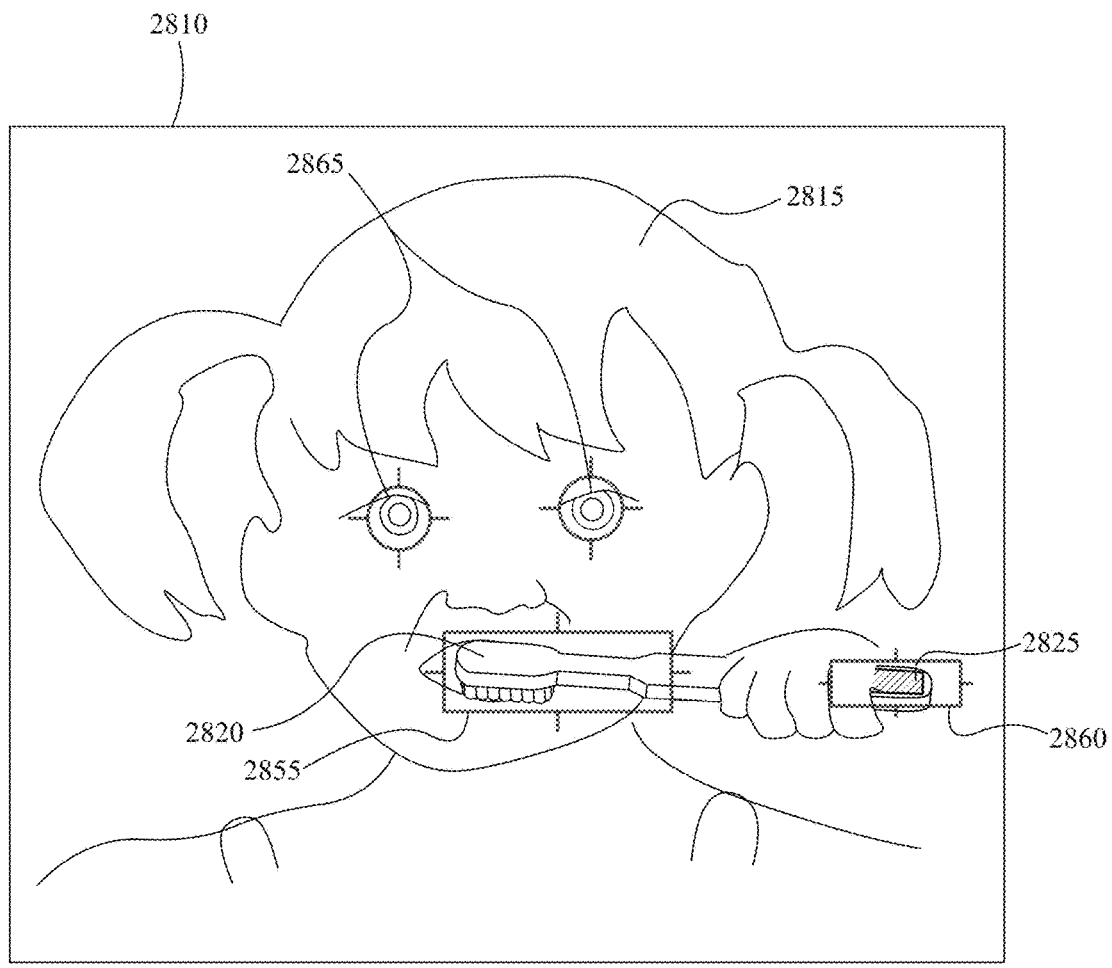

FIG. 28B shows an exemplary method of extracting information. The camera's field of view 2810 captures the user 2815. By identifying unique colors, markings (e.g., retroreflectors, tags) or geometry of the brush body 2820 and the brush end 2825, the tooth brushing application constrains the image using a brush end box 2860 and a brush body box 2855, describing their relative size and position. In addition, the user's eyes 2865 and/or other facial features can also be tracked to supplement this brush tracking.

Figure 28C:
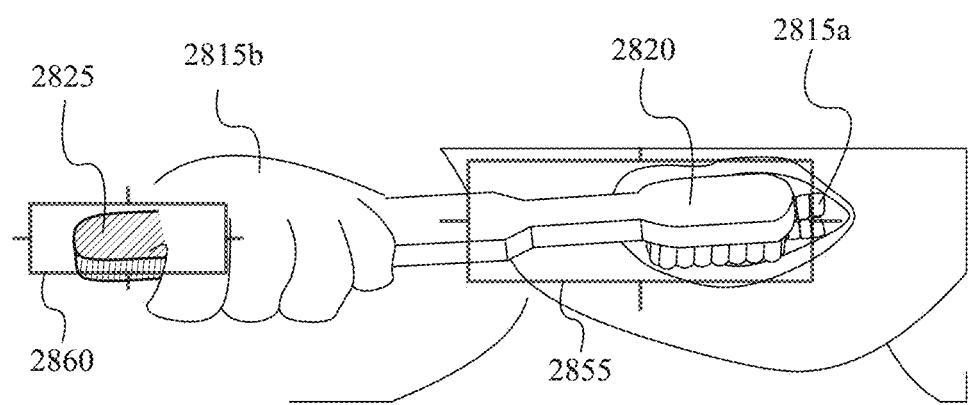
Figure 28D:
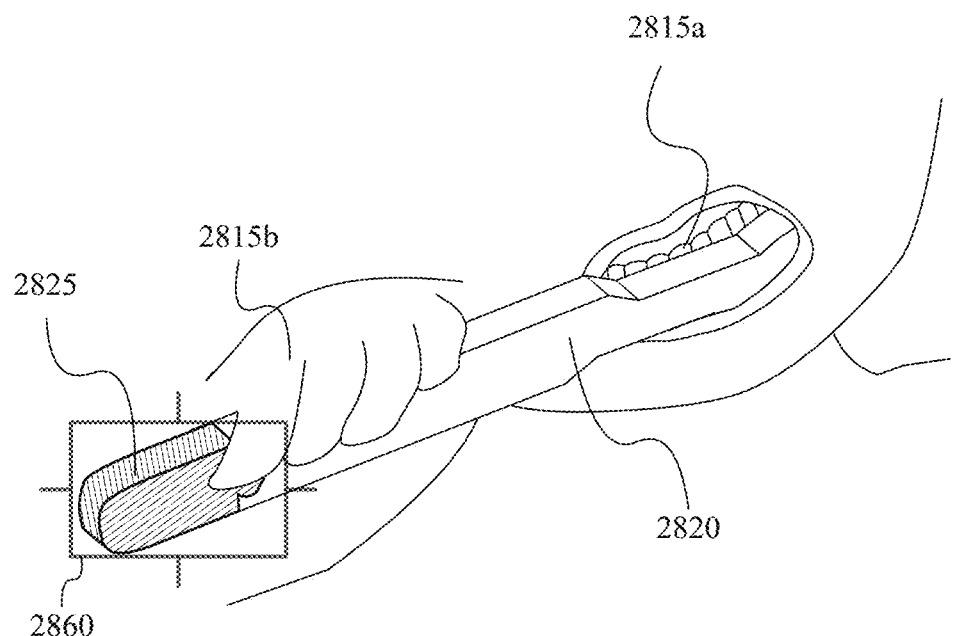

FIGS. 28C-28D show how the tracking is augmented by the user's brushing. In FIG. 28C, when brushing the front teeth 2815a, the user's mouth is open, revealing a portion of brush body 2820, which allows the brush body box 2855 to be generated. The user's hand 2815b obscures the rest of the brush body 2820. The brush end 2825 is plainly visible, which allows the brush end box 2860 to be generated.

In FIG. 28D, when brushing the back teeth 2815a, the user's mouth is closed, obscuring the entire brush body 2850, preventing the brush box 2855 from being generated. The portion of the brush body 2820 is inside the mouth, while the user's hand 2815b obscures the rest of the brush body 2820. The brush end 2825 is plainly visible, which allows the target box 2860 to be generated.

In some embodiments, a series of tags near the toothbrush head can be used to determine how far into a user's mouth the toothbrush is inserted. The fewer tags visible to the camera, the further into the user's mouth is the toothbrush. This can be used to determine which teeth are being brushed.

Figure 29A:
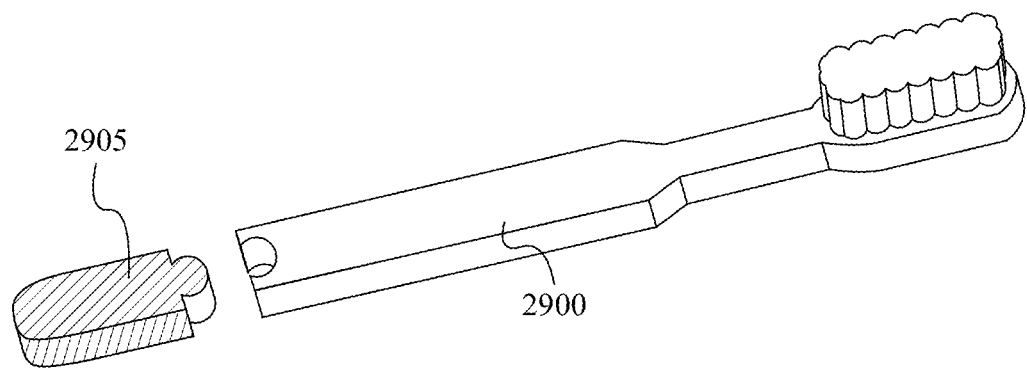
FIGS. 29A-29B 29A-29C show exemplary tooth brushes according to an embodiment of the invention.
Figure 29B:
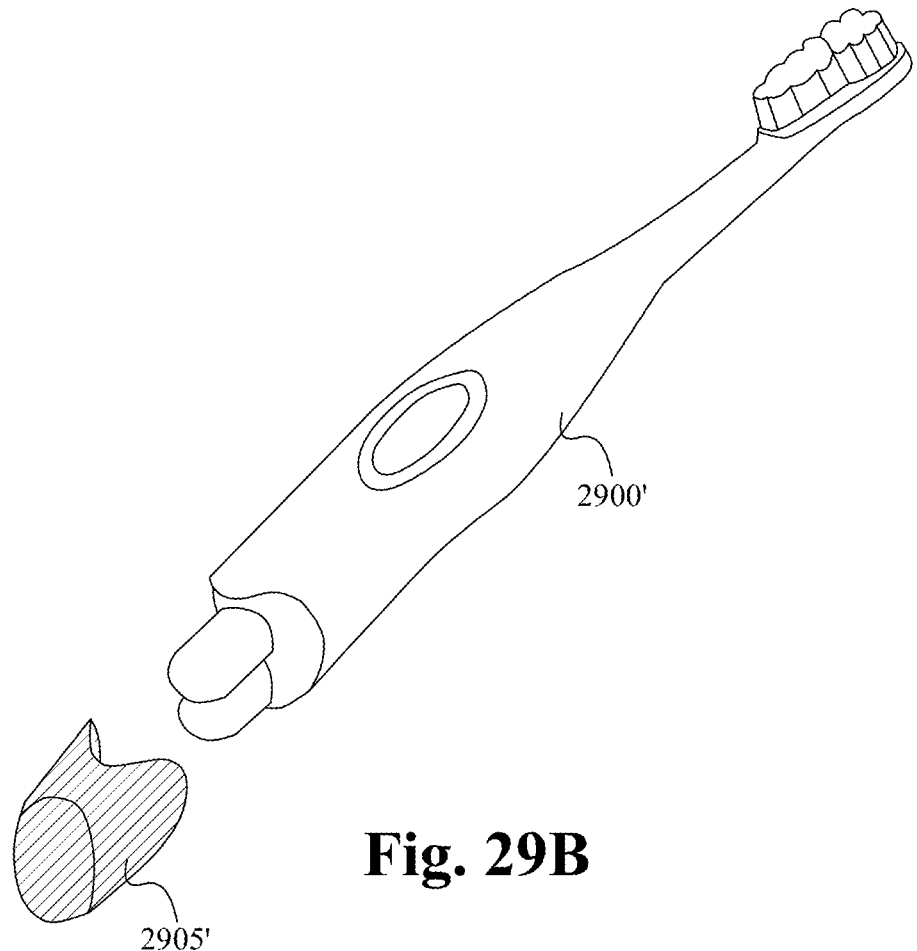
Figure 29C:
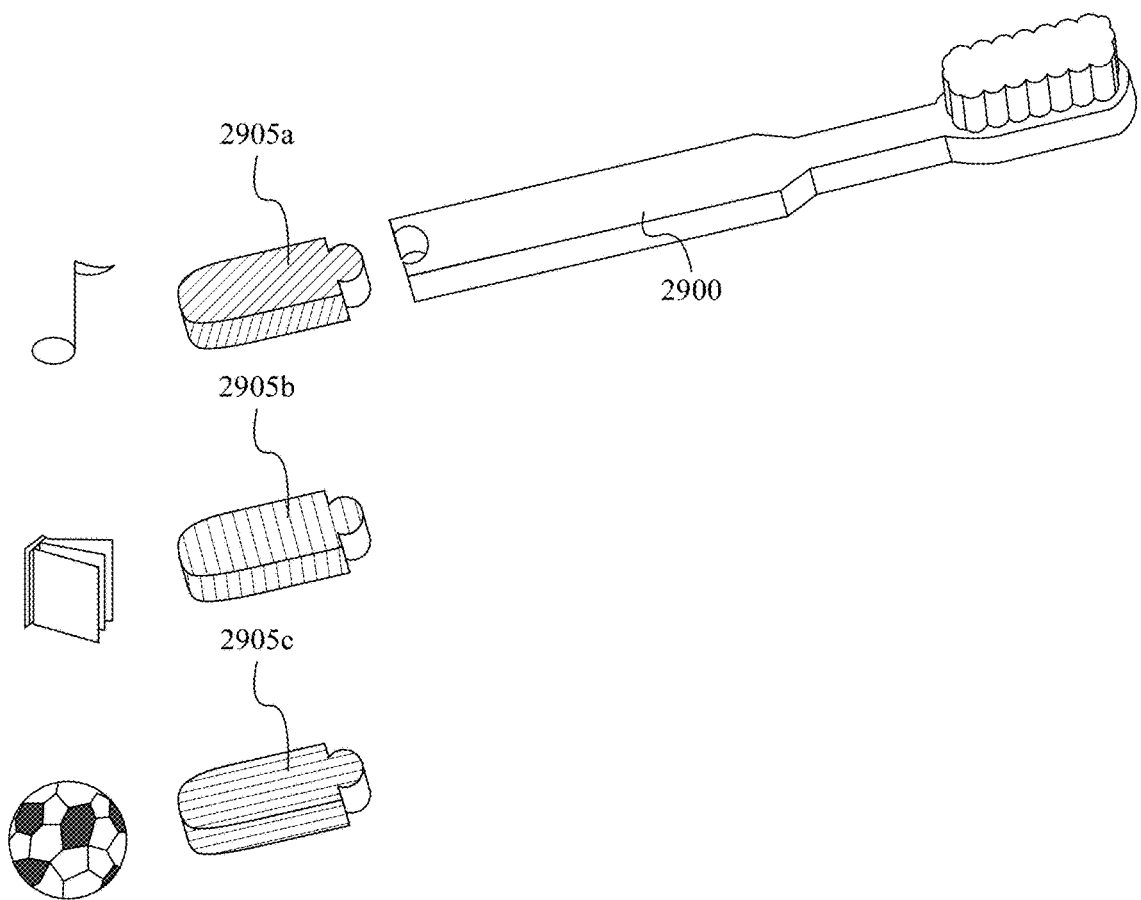

A target, such as those illustrated in FIGS. 25 and 26B, can be removably coupled with an object to be track, a target can be integral with an object or with a part of an object. For example, FIG. 29A shows targets 2900, 2905 that when pieced together, form a manual toothbrush that can be used with a tooth brushing application. Similarly configured as the toothbrush in FIG. 29A, FIG. 29B shows targets 2900', 2905' that when pieced together, form an electric toothbrush that can also be used with a tooth brushing application. Different target pieces can be used as they trigger different applications. For example, as illustrated in FIG. 29C, the target 2905a triggers a music application, the target 2905b triggers a story application, and the target 2905c triggers a soccer game application.

Figure 30:
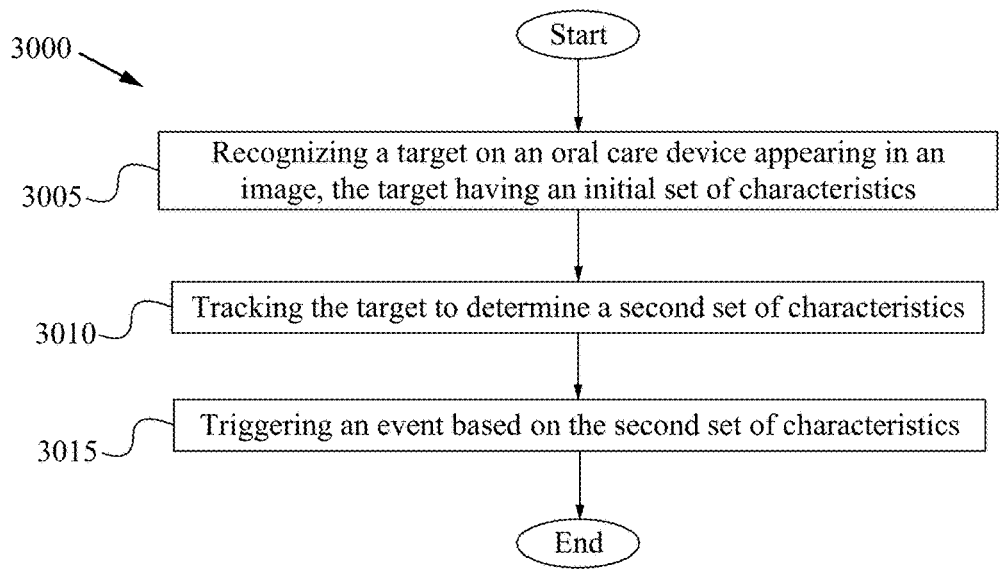
FIG. 30 shows an exemplary method of wireless gaming according to an embodiment of the invention.

FIG. 30 shows an exemplary method of wireless gaming 3000 according to an embodiment of the invention. The method 3000 begins at a step 3005, wherein a target on an oral care device, such as a toothbrush, appearing in an image is recognized. Typically, the target has an initial set of characteristics, including angle, orientation, location and/or dimensions of the target. In some embodiments, the target is a color. Alternatively, the target is a tag.

At a step 3010, the target is tracked to determine a second set of characteristics.

At a step 3015, an event is triggered based on the second set of characteristics. The event can be an element in an application that is controlled. For example, a teeth brushing application is able track the target on the toothbrush and to thereby indicate to the user the next trajectory of the toothbrush for thorough cleaning. After the step 3015, the method 3000 ends.

Figure 31:
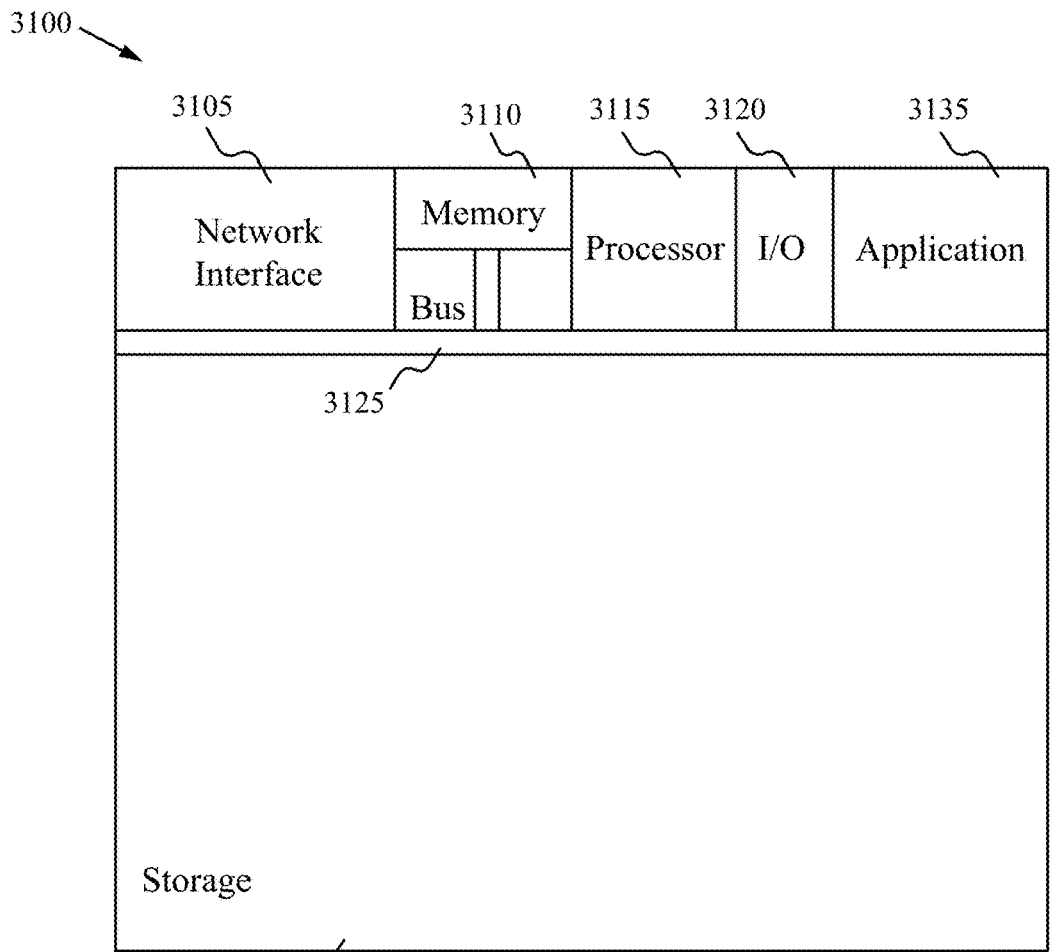
FIG. 31 shows a block diagram of a self-contained electronic device in accordance with the present invention.

FIG. 31 shows a block diagram of a self-contained electronic device 3100 in accordance with the present invention. The electronic device 3100 is able to be used to intercept, acquire, store, compute, process, communicate and/or display information. The electronic device 3100 is also able to provide interactive game play with a user.

In general, a hardware structure suitable for implementing the electronic device 3100 includes a network interface 3105, a memory 3110, a processor 3115, I/O device(s) 3120, a bus 3125 and a storage device 3130 The choice of processor is not critical as long as a suitable processor with sufficient speed is chosen. The memory 3110 is able to be any conventional computer memory known in the art. The storage device 3130 is able to include a hard drive, CDROM, CDRW, DVD, DVDRW, Blue-Ray®, flash memory card or any other storage device. The electronic device 3100 is able to include one or more network interfaces 3105 to connect to a cellular network, an Ethernet and/or other type of LAN. The I/O device(s) 3120 are able to include one or more of the following: keyboard, mouse, monitor, display, printer, modem, touchscreen, button interface and other devices. In some embodiments, the hardware structure includes multiple processors and other hardware to perform parallel processing. Application(s) 3135 are likely to be stored in the storage device 3130 and memory 3110 and processed as applications are typically processed. More or fewer components shown in FIG. 31 are able to be included in the electronic device 3100. An example of an electronic device is a desktop device, a laptop device or a handheld device, such as a mobile device. The mobile device can be a smart phone, a table computer or a personal digital assistant (PDA).

Figure 32:
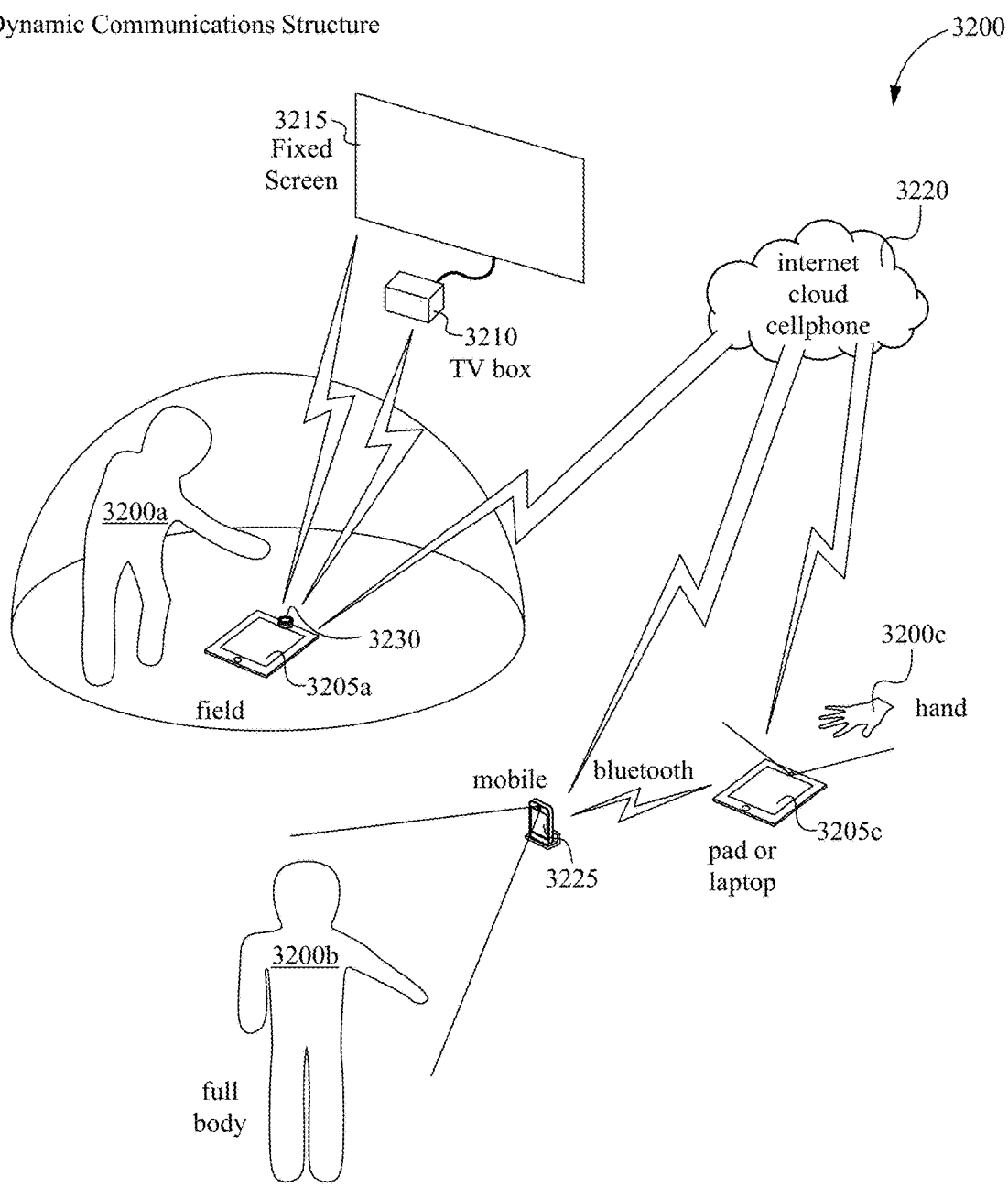
FIG. 32 shows an exemplary dynamic communications system in accordance with the present invention.

FIG. 32 shows an exemplary dynamic communications system 3200 in accordance with the present invention. User A 3200a uses a mobile device 3205a to communicate directly with a smart appliance, such as a smart TV 3215, or indirectly with the smart TV 3215 via a TV box 3210, such as an Apple TV® or a digital video recorder (DVR). The mobile device 3205a can also be used to control the TV box 3210 by motion detected by the mobile device 3205a. The mobile device 3205a can be communicatively coupled with other mobile devices 3205b, 3205c via a network(s) 3320, such as for remote gaming. The network 3320 can be an ethernet network or a cellular network. The mobile devices, such as the mobile device 3205b and the mobile device 3205c, can also be communicatively coupled via local communication protocols, including Bluetooth® and WiFi. As discussed above, applications allow a mobile device to be in a horizontal position or a vertical position. In FIG. 32, mobile devices 3205a and 3205c are both in the horizontal position, while mobile device 3205b is in a vertical position. A stand 3225, such as any of those described in FIGS. 15A-15D, or a camera enhancement 3230, such as any of those described in FIGS. 15E-15F, can be used to capture motion. For example, the fisheye lens 3230 provides a hemispheric 360° field of view. For another example, the stand 3225 enables the mobile device 3205b to capture the entire body of User B 3200b. In FIG. 32, User C 3200c simply moves his hand within the normal field of view of the camera of the mobile device 3205c without aid of any camera enhancements.

While the examples illustrate using embodiments of the invention in various games and activities, it will be appreciated that embodiments can also be used in other games, including, but not limited to, sword games, ping pong, billiards, archery, rifle shooting, aviation (e.g., flight simulation), race car driving, grooming and teeth brushing, to name only a few. Further, while some embodiments describe transmitting and receiving light energy for tracking objects, other types of radiant energy can be used. Further, while the examples discussed are generally directed to video games, it will be appreciated that the invention finds use in other applications other than games. One other embodiment, for example, includes a self-contained electronic device that tracks motion as described above and provides audio feedback. A self-contained electronic device can be a mobile device, a tablet, a PDA or any suitable handheld device.

While the invention has been described with reference to numerous specific details, one of ordinary skill in the art will recognize that the invention can be embodied in other specific forms without departing from the spirit of the invention. Thus, one of ordinary skill in the art will understand that the invention is not to be limited by the foregoing illustrative details, but rather is to be defined by the appended claims.

We claim:

1. A non-transitory computer-readable medium storing instructions that, when executed by a computing device, cause the computing device to perform a method comprising:
   presenting on a display interface a view captured by a camera;
   using the camera to automatically recognize an identity of a particular object from among a plurality of identified objects and in the view presented on the display interface;
   using the identity of the particular object to automatically access a video game application that is associated with the identity the particular object;
   presenting on the display interface a game environment associated with the video game application, wherein the object is embedded in the game environment;
   starting a game play for the video game application, wherein the video game application involves a task to be fulfilled during the game play;
   using the camera to lock onto the object during the game play, thereby tracking the object as at least one characteristic of the object is being changed in a view of the camera;
   determining whether a characteristic of the object satisfies at least a portion of the task; and
   based on the determination, designating the portion of the task as being completed.

2. The non-transitory computer-readable medium of claim 1, wherein the computing device includes at least one of the display interface and the camera.

3. The non-transitory computer-readable medium of claim 1, wherein the task includes an educational problem.

4. The non-transitory computer-readable medium of claim 1, wherein the task includes a "fill-in-the-blank" problem.

5. The non-transitory computer-readable medium of claim 1, wherein the task includes a "matching" problem.

6. The non-transitory computer-readable medium of claim 1, wherein the task includes a "name-the-object" problem.

7. The non-transitory computer-readable medium of claim 1, wherein the task includes a skills training routine.

8. The non-transitory computer-readable medium of claim 1, wherein the method further comprises keeping an accuracy meter of the game play.

9. The non-transitory computer-readable medium of claim 1, wherein the method further comprises repeating the tracking step, the determining step and the designating step until all portions of the task are completed.

10. The non-transitory computer-readable medium of claim 1, wherein the tracking an object comprises using a detection algorithm.

11. The non-transitory computer-readable medium of claim 10, wherein the detection algorithm is configured to determine at least one physical attribute of the object.

12. The non-transitory computer-readable medium of claim 10, wherein the detection algorithm is configured to determine a pattern in which the object moves.

13. The non-transitory computer-readable medium of claim 12, wherein the pattern indicates which portions of the task have been completed.

14. The non-transitory computer-readable medium of claim 1, wherein the detection algorithm is configured to track the object using one or more targets coupled with the object.

15. The non-transitory computer-readable medium of claim 14, wherein the one or more targets comprise a retroreflector, a tag, a color, or any combination thereof.

16. The non-transitory computer-readable medium of claim 1, further comprising tracking a user's eyes, facial features, or both to determine which portions of the task have been completed.

17. A non-transitory computer-readable medium storing instructions that, when executed by a computing device, cause the computing device to perform a method comprising:
   presenting on a display interface a view captured by a camera;
   using the camera to automatically recognize an identity of a particular object from among a plurality of identified objects and in the view presented on the display interface;
   using the identity of the particular object to automatically access a video game application that is associated with the identity of the particular object;
   presenting on the display interface a game environment associated with the video game application, wherein the object is embedded in the game environment;
   starting a game play for the video game application;
   using the camera to lock onto the object during the game play; and
   controlling at least one element in the video game application based on a location of the locked object in the game play.

18. The non-transitory computer-readable medium of claim 17, wherein the object is locked even when external visible lighting conditions change during the game play.

19. The non-transitory computer-readable medium of claim 18, wherein locking the object comprises continuously performing calibration according to the changing external lighting conditions, wherein continuously performing calibration comprises capturing known color references in the view of the camera, wherein the known color references are subject to the same lighting conditions in which the object is in.

20. A non-transitory computer-readable medium storing instructions that, when executed by a computing device, cause the computing device to perform a method comprising:

presenting on a display interface a field of view captured by a camera;

detecting a particular object in the field of view presented on the display interface;

using the camera to identify the particular object that is detected from among a plurality of identified objects;

using the identification of the particular object to automatically access a video game application that corresponds with the identification;

presenting on the display interface a game environment associated with the video game application, wherein the object is embedded in the game environment;

starting a game play for the video game application;

ensuring that the object is continuously locked onto by the camera during the entirety of the game play; and controlling at least one element in the video game application based on a location of the locked object in the game play.

21. A non-transitory computer-readable medium storing instructions that, when executed by a computing device, cause the computing device to perform a method comprising:

presenting on a display interface a view captured by a camera;

using the camera to automatically recognize an identity of a particular object from among a plurality of identified objects and in the view presented on the display interface;

using the identification of the particular object to automatically access a video game application that corresponds with the identification;

replacing the view presented on the display interface with a game environment associated with the video game application, wherein the object is embedded in the game environment;

starting a game play for the video game application;

ensuring that the object is continuously locked onto by the camera during the entirety of the game play, thereby tracking the object; and controlling at least one element in the video game application based on the tracking of the object.

* * * * *